United States Patent
Colson et al.

(10) Patent No.: US 6,382,128 B1
(45) Date of Patent: May 7, 2002

(54) APPARATUS FOR MANUFACTURING AN ADJUSTABLE COVERING FOR ARCHITECTURAL OPENINGS

(75) Inventors: Wendell B. Colson, Weston; David Hartman, Framingham, both of MA (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 0 days.

(21) Appl. No.: 09/680,769

(22) Filed: Oct. 6, 2000

Related U.S. Application Data

(62) Division of application No. 09/102,975, filed on Jun. 22, 1998, now Pat. No. 6,152,068.

(51) Int. Cl.$^7$ .............................................. B05C 11/00
(52) U.S. Cl. ........................... 118/35; 118/38; 118/66; 118/67; 118/69; 118/315; 118/316; 118/411; 118/412; 118/419
(58) Field of Search ................................ 118/35, 38, 66, 118/67, 69, 315, 316, 411, 412, 419; 427/207.1, 208, 208.2, 208.4, 208.6, 209; 156/197, 292, 291

(56) References Cited

U.S. PATENT DOCUMENTS

| | | | |
|---|---|---|---|
| 3,094,066 A | 6/1963 | Kendrick | 101/216 |
| 3,232,227 A | 2/1966 | Zernov et al. | 101/216 |
| 3,861,351 A | 1/1975 | Bonwit et al. | 118/262 |
| 4,137,843 A | 2/1979 | Ottenhue | 101/153 |
| 4,450,027 A | * 5/1984 | Colson | 156/197 |
| 4,938,473 A | 7/1990 | Lee et al. | 482/54 |
| 4,997,507 A | 3/1991 | Meyer | 156/286 |
| 5,015,317 A | * 5/1991 | Corey et al. | 156/197 |
| 5,228,936 A | 7/1993 | Goodhue | 156/260 |
| 5,313,999 A | 5/1994 | Colson et al. | 160/121.1 |
| 5,425,809 A | 6/1995 | Person | 118/46 |
| 5,447,566 A | 9/1995 | Loiacono | 118/249 |
| 5,503,210 A | * 4/1996 | Colson et al. | 160/84.05 |
| 6,146,484 A | * 11/2000 | Alam et al. | 156/197 |

FOREIGN PATENT DOCUMENTS

| | | |
|---|---|---|
| DE | 3032747 | 3/1982 |
| WO | 94/18007 | 8/1994 |
| WO | 97/23351 | 3/1997 |

\* cited by examiner

*Primary Examiner*—Laura Edwards
(74) *Attorney, Agent, or Firm*—Dorsey & Whitney LLP

(57) ABSTRACT

An apparatus is disclosed for fabricating a laminate product having a pair of sheet materials spaced by a plurality of flexible parallel vanes which are secured to the sheet material so that planar movement of the sheet materials in opposite directions cause the vanes to shift between open and closed positions. The vane material is formed from a web of material by dyeing the material, drying the dyed material, applying spaced longitudinally extending lines of adhesive on opposite faces of the material, and cutting the material into a plurality of side-by-side strips with each strip having a bead of adhesive on each face and along opposite side edges. The cut material with adhesive applied thereto is taken up on a transfer roll and moved to a vane/strip handling station where the strips of material are processed and delivered to a laminating station in parallel overlapping relationship with each other. The laminating station feeds the sheets of material above and below the strips to form the laminate before passing it through the laminating station where the adhesive is first heat activated to bond the component parts of the covering product together, and subsequently cooled to cure the adhesive. The resultant product is wrapped around a take-up roller for delivery to a remote location where the product can be cut to size and operably connected to a control system to form the final covering product for an architectural opening.

11 Claims, 40 Drawing Sheets

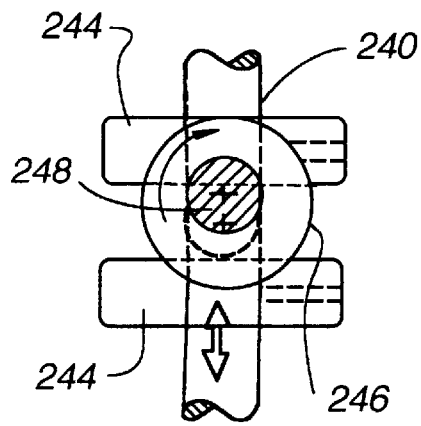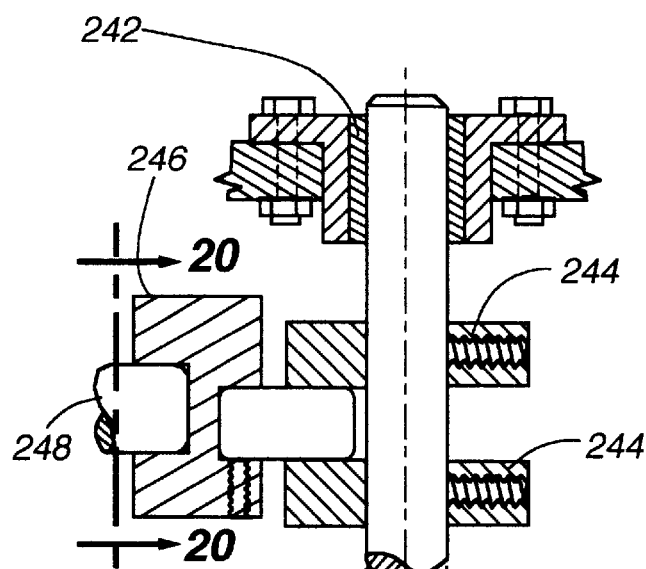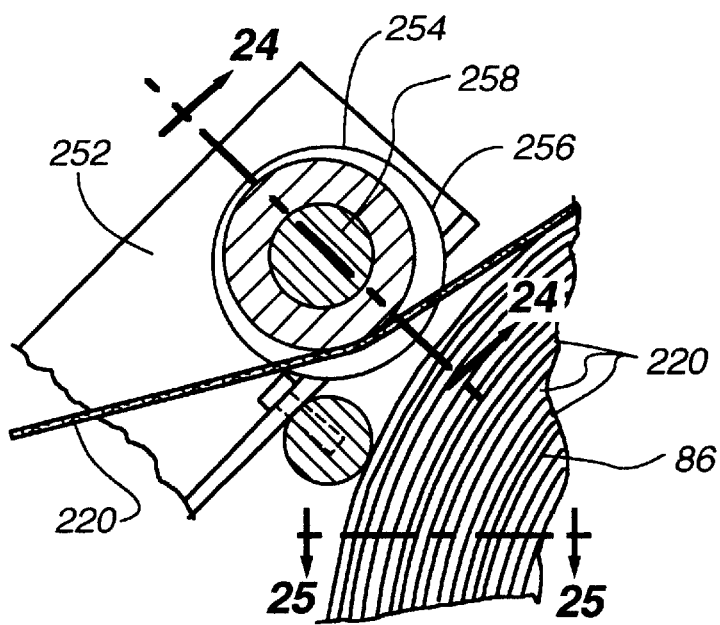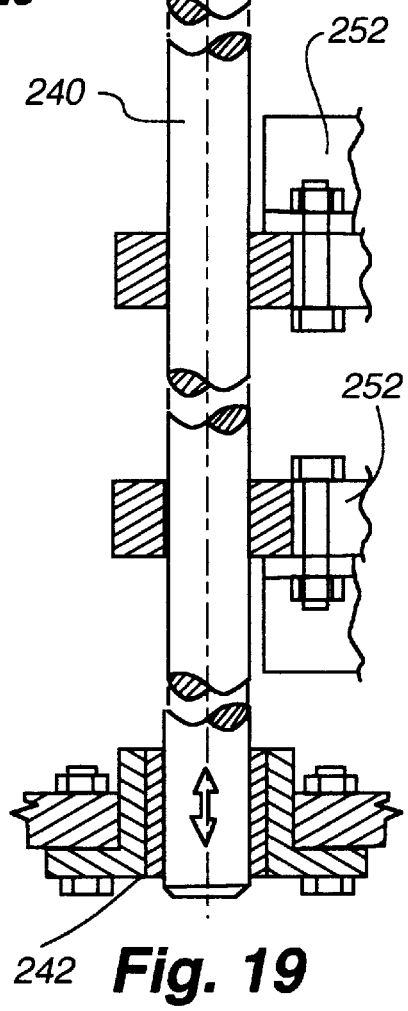
Fig. 20
Fig. 23
Fig. 19

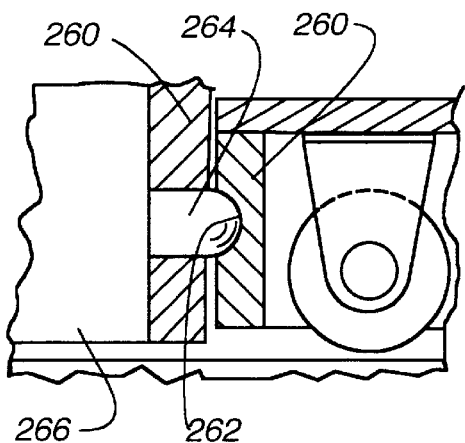
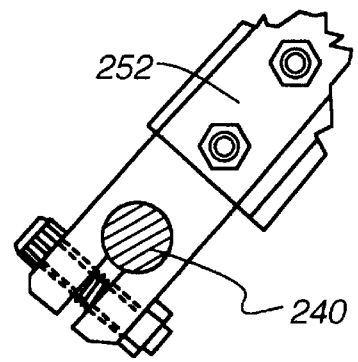
Fig. 21  Fig. 22
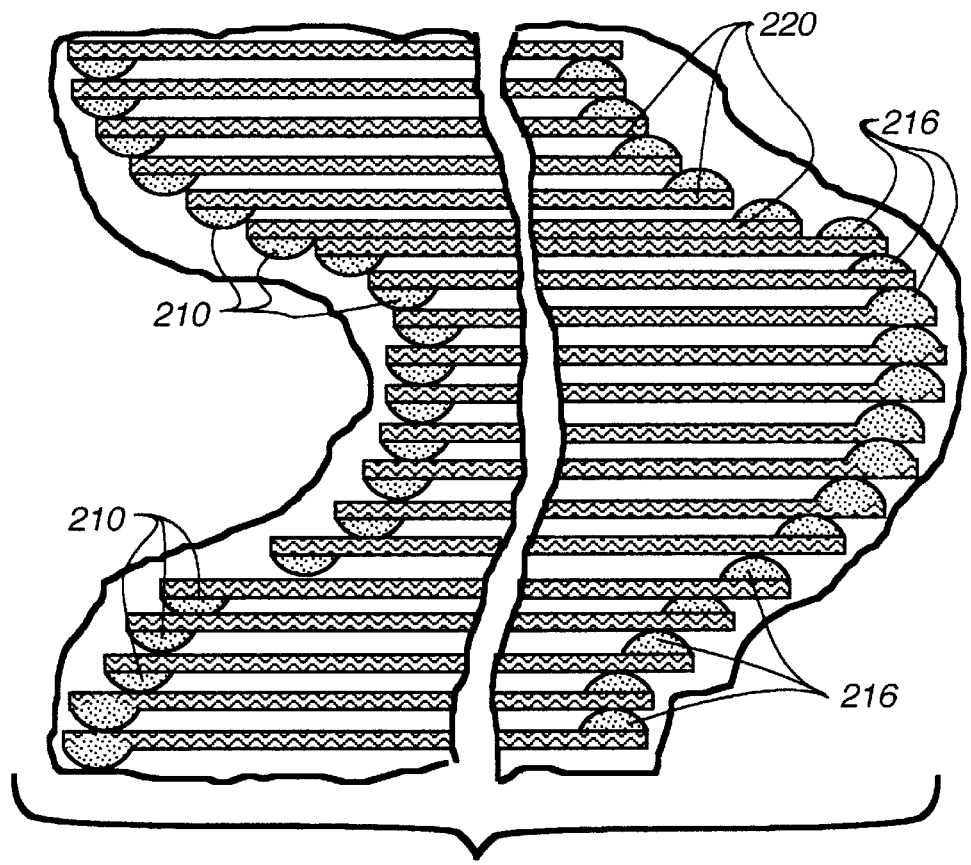
Fig. 25

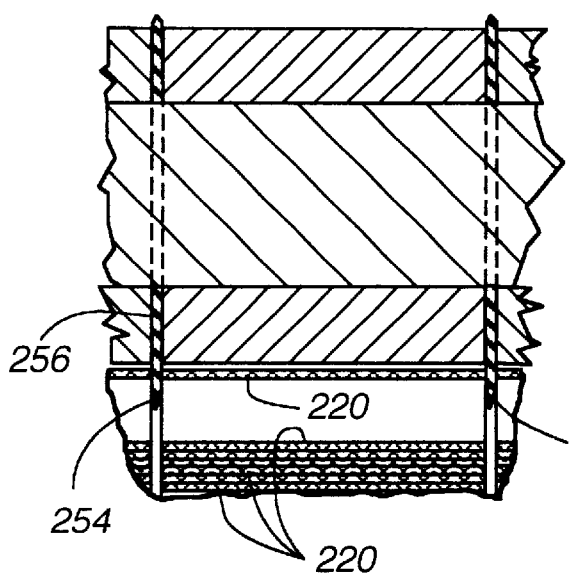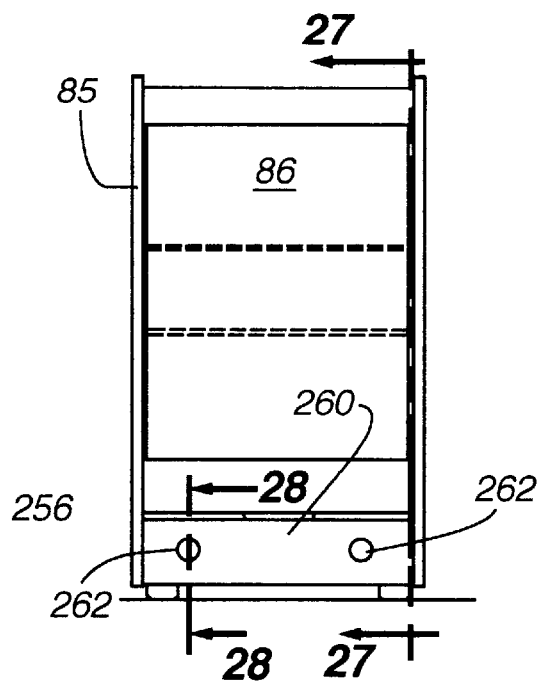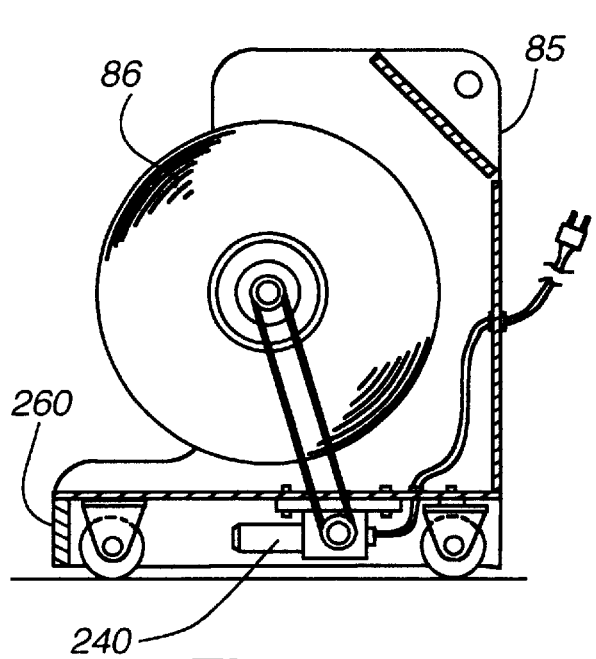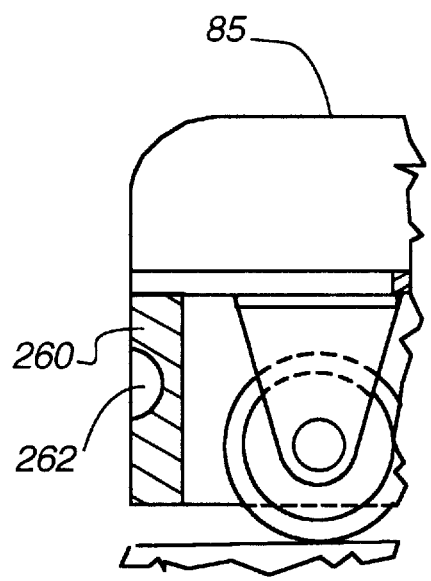
Fig. 24
Fig. 26
Fig. 27
Fig. 28

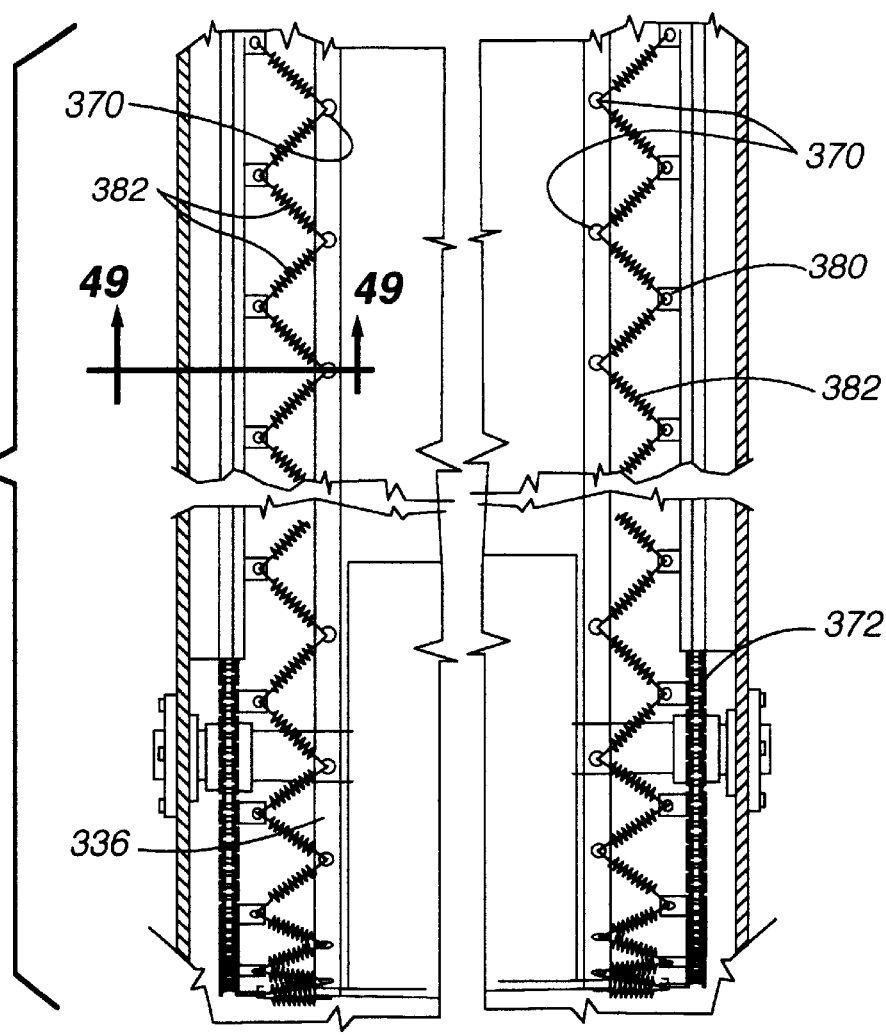
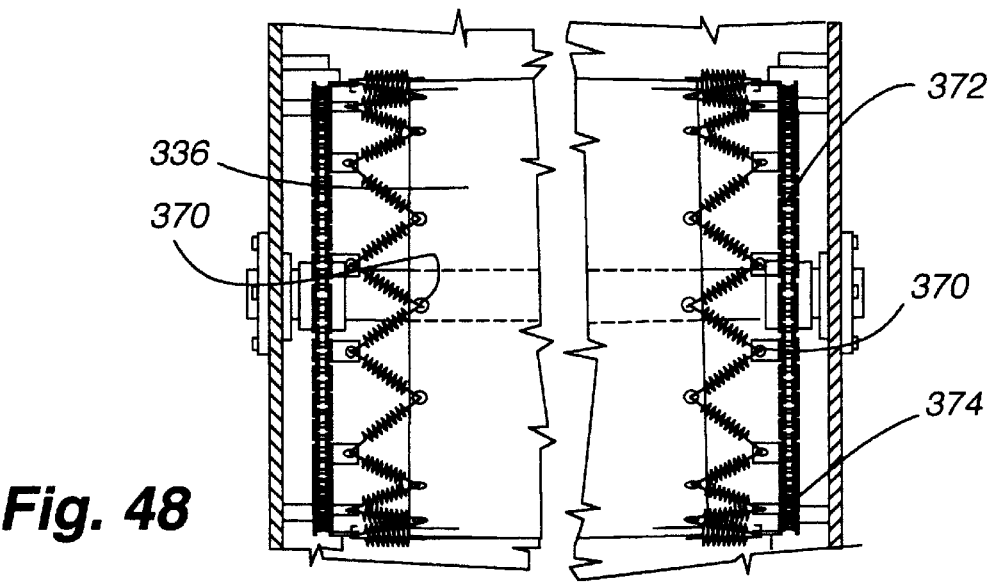

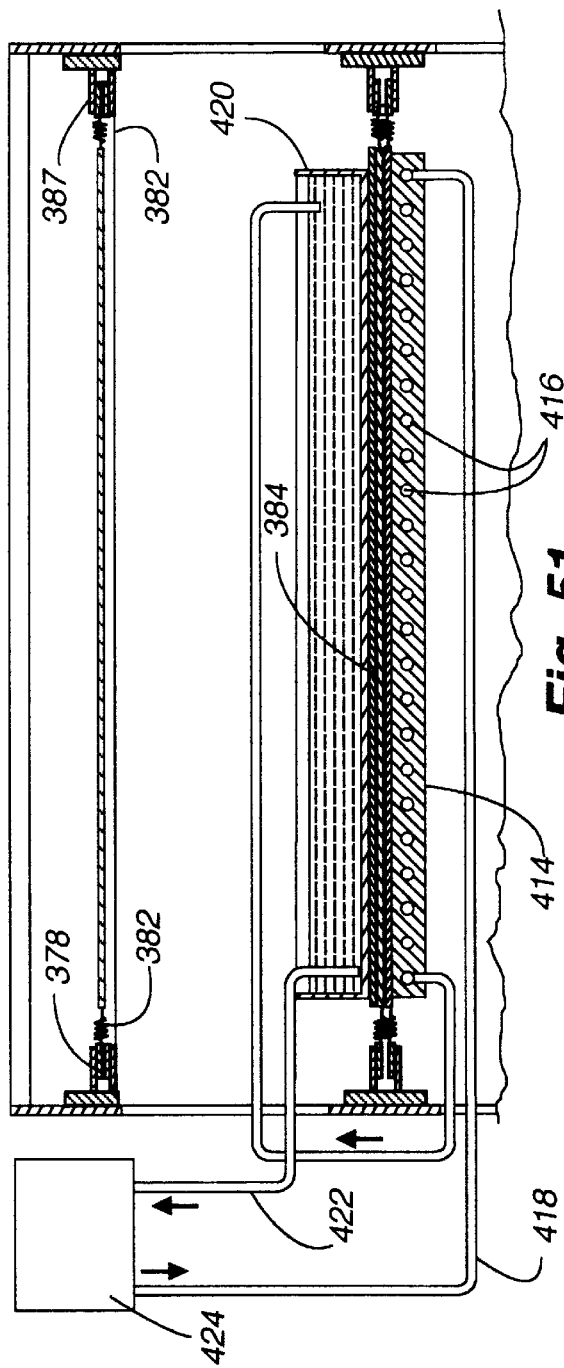
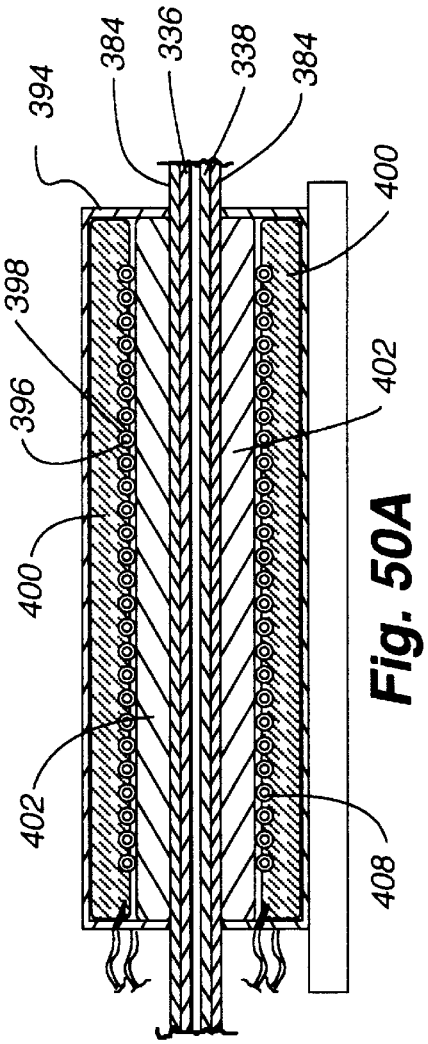
Fig. 51
Fig. 50A

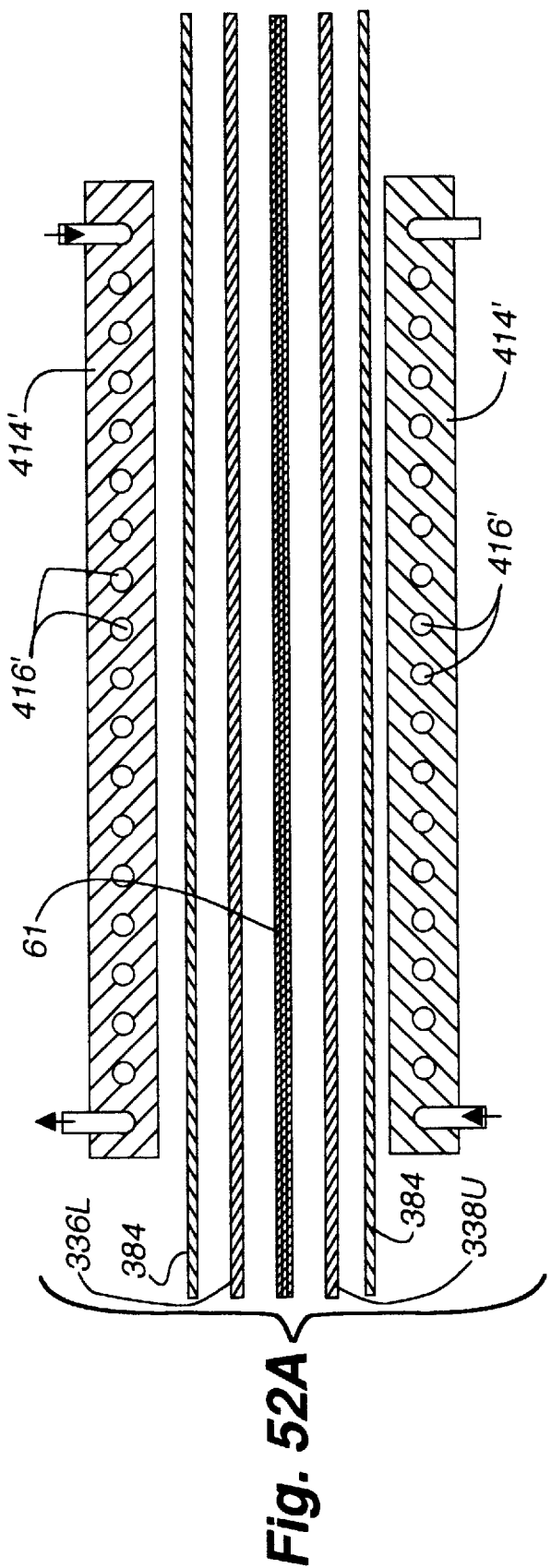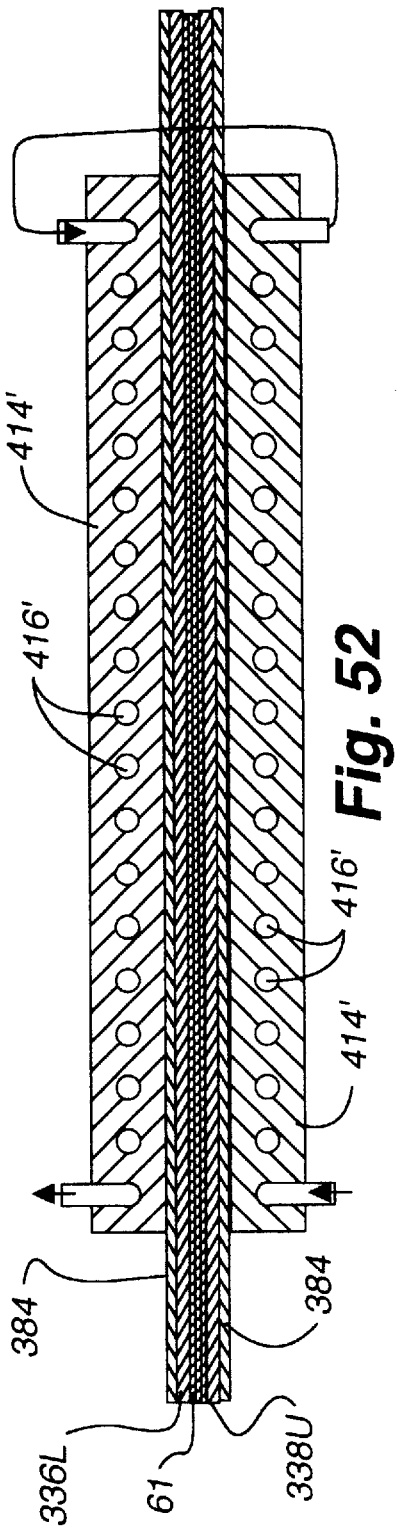

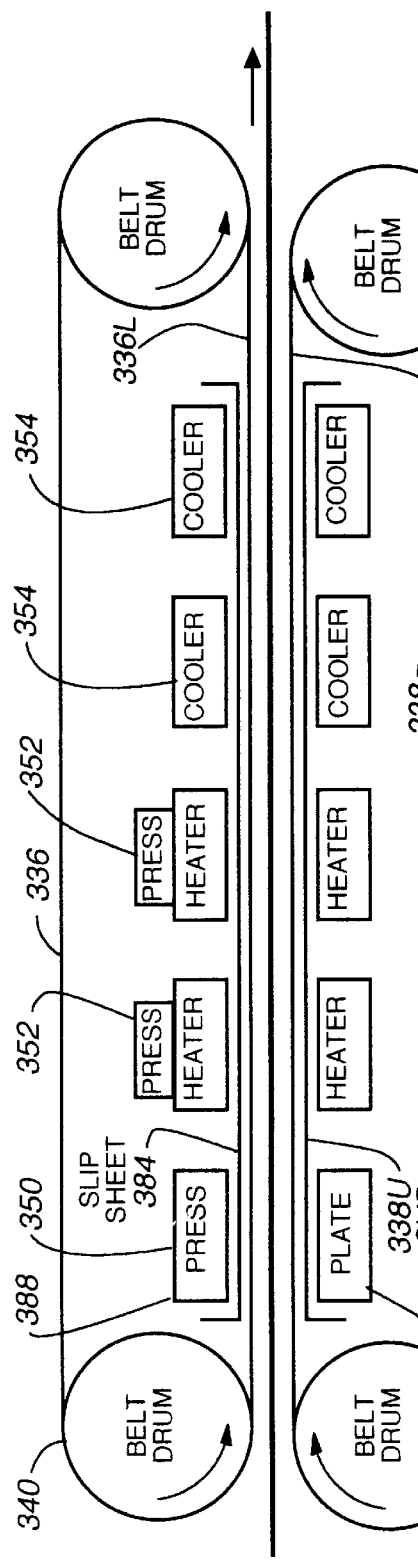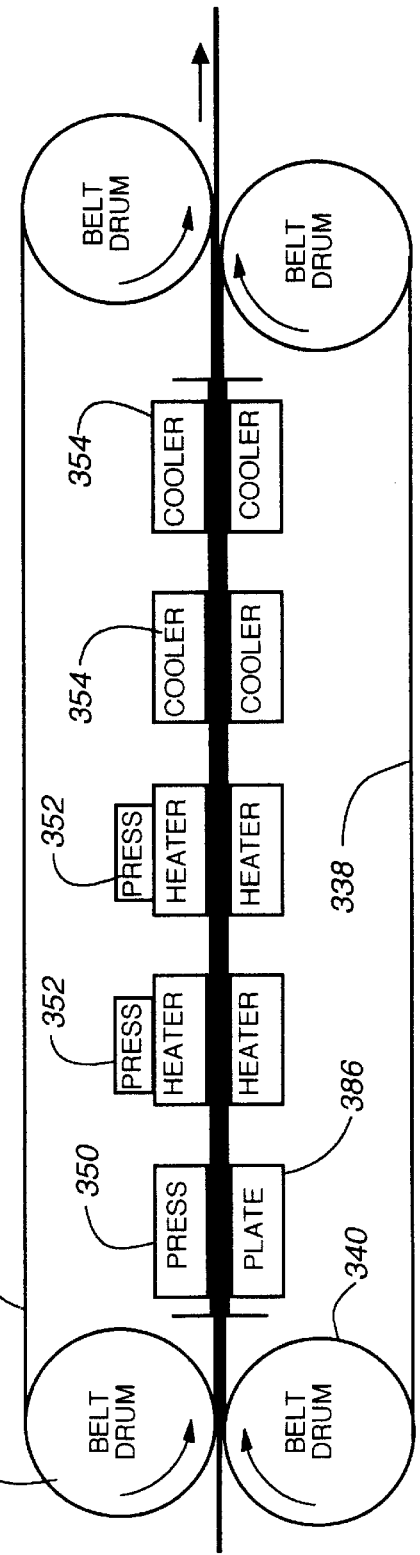

APPARATUS FOR MANUFACTURING AN ADJUSTABLE COVERING FOR ARCHITECTURAL OPENINGS

CROSS-REFERENCE TO RELATED APPLICATION

This application is a divisional of U.S. application Ser. No. 09/102,975, filed Jun. 22, 1998 now U.S. Pat. No. 6,152,068. The '975 application is hereby incorporated by reference as if fully disclosed herein.

BACKGROUND OF THE INVENTION

1. Field of the Invention

The present invention relates generally to coverings for architectural openings such as windows, doors, archways and the like and, more particularly, to a new and improved apparatus for producing a known product for use in a retractable covering. The product includes a plurality of flexible vanes that are mounted in parallel relation between parallel sheets of flexible material with the vanes being connected along opposite edges to the opposed sheets of material. The product, after manufacture, is incorporated into a control system so that it can be rolled onto a roller or otherwise gathered adjacent a top or side edge of the architectural opening, or allowed to extend across the opening. The vanes are pivotal about their longitudinal axes so that the vanes can be disposed in a closed overlapping coplanar relationship with each other or an open relationship with each other with gaps therebetween that permit the passage of vision and light.

2. Description of the Relevant Art

Coverings for architectural openings have taken numerous forms for many years with some coverings simply consisting of fabric that is draped or otherwise disposed across the architectural opening and usually in an aesthetically attractive manner and also so that the passage of vision and light through the opening can be altered.

Another popular form of covering for architectural openings is the "Venetian blind" which includes a plurality of parallel horizontally disposed rigid slats that are interconnected at spaced locations along their length so that the slats can be retained in a vertically spaced relationship across the architectural opening or can be gathered in a stack at the top of the opening. The slats, which are supported by ladders, can also be simultaneously pivoted about their longitudinal axes so that in a closed position the slats extend in a substantially coplanar relationship while overlapping slightly to block the passage of vision or light through the opening. The slats can also be rotated into an open condition wherein they extend parallel to each other and perpendicular to the opening so that vision and light are allowed to pass between the slats. Slats for Venetian blinds can be made of wood, plastic, metal, or any other suitable material, but the slats are rigid enough along their length so as not to droop or otherwise collapse along their length.

Still another common covering for architectural openings is the vertical blind which is very similar to a Venetian blind except that the slats extend vertically and can be gathered adjacent one or both sides of the opening. The covering can also be extended across the opening with the slats being pivotal about their vertical longitudinal axes between open and closed positions similar to the Venetian blind.

A more recent covering for architectural openings which has received considerable popularity consists of a pair of parallel flexible panels or sheets, which are preferably sheer, that can be extended vertically across the opening in parallel spaced relationship to each other and wherein a plurality of parallel vanes are secured along opposite edges to the opposing panels or sheets of material. The vanes are preferably made of a flexible material that is opaque or translucent. The vanes are supported by the panels of material and can be pivoted about their longitudinal axes by shifting the panels of material in opposite planar directions perpendicular to the length of the vanes so that the vanes move between an open condition wherein they lie parallel to each other and substantially perpendicular to the architectural opening and a coplanar closed condition wherein they block the passage of light and vision. It will, therefore, be appreciated with a product of this type there are numerous options for the user of the product. One option is having the panels or sheets of material suspended vertically across the window with the vanes in their open condition, or a second option with the vanes in the closed position. In still a third option, the entire assembly of panels and vanes can be rolled or otherwise gathered along an edge of the architectural opening. Typically, the panels or sheets and vanes are rolled about a roller across the top edge of the opening even though systems could be employed for gathering or rolling the assemblage of panels and vanes adjacent a side edge of the opening, in which case the vanes would extend vertically rather than horizontally across the opening.

Apparatus currently exists for mass-producing window coverings of the latter type with one example of an apparatus being disclosed in U.S. Pat. No. 5,228,936 which has a Reexamination Certificate No. B1 5,228,936. This patent is of common ownership with the present application and discloses a method for making a product of the above-identified type by feeding converging webs of material, such as sheer, toward a juncture location and simultaneously feeding a plurality of side-by-side contiguous strips of vane material longitudinally between the two webs of material so that the webs and the vanes converge at the juncture location. The strips have been pre-treated with longitudinally extending beads of adhesive with one bead extending along one side edge on one face of the strip and another bead of adhesive extending along the opposite side edge and on the opposite face. When the two webs of material and strips with pre-applied beads of adhesive are received at the juncture location they are compressed and retained in a fixed relationship with each other with the strips being disposed between the two webs of material and subsequently passed through a heater where the adhesive melts and bonds the strips to the sheets of material. The laminate is then cooled to set or cure the adhesive. The resultant product has the two panels or sheets, which can be suspended in parallel spaced relationship across an architectural opening with the vanes disposed in parallel relationship and extending between the two sheets.

As will be appreciated in the aforementioned U.S. Pat. No. 5,228,936, the strips are positioned between the sheets of material in contiguous side-by-side relationship with each other and the strips of material that form the vanes are, therefore, not overlapping as maybe desired. In other words, if the strips of material are only contiguous and do not overlap when secured in position between the opposing sheets of material, the vanes will not overlap when the resultant product is positioned in an architectural opening and the vanes are in a closed condition and, therefore, there will not be a total blockage of light and vision. Accordingly, a shortcoming with the apparatus and process described in the afore-noted patent resides in the fact that the vanes do not overlap but rather are in contiguous side-by-side relationship.

Another machine and process for making a product of the above-described type wherein a pair of opposed panels of material are connected by a plurality of parallel vanes extending therebetween is disclosed in U.S. Pat. No. 5,313,999. In that patent, a first web of material is fed in a first longitudinal direction and is intermittently driven so that individual strips of vane material can be fed transversely to the first direction and once desirably positioned, adhesively tack bonded to the first web of material in overlapping relationship with the previously bonded strip. This process continues in an intermittent stepped manner as a plurality of adjacent strips or vanes are connected to the first web of material. Subsequently the first web of material with the vanes having one edge connected thereto are fed to a juncture location where a second web of material is also fed in the first direction so as to be compressed against the vanes and the first web of material so that the vanes which had been pre-treated with beads of adhesive are secured to the webs of material in sandwiched relationship therewith. Of course, the strips of vane material are pre-treated with beads of adhesive with one bead of adhesive extending along one edge of the strip and on one face while the other bead of adhesive extends along the opposite edge and opposite face.

A drawback with the system disclosed in U.S. Pat. No. 5,313,999 resides in the fact that even though the process is generally continuous, the webs of material are intermittently driven while vanes are fed perpendicularly to the first web and adhesively secured thereto. Another disadvantage resides in the fact that the strips of material are not tensioned when being secured to the web and, therefore, it is possible not to obtain uniform tensioning of each strip or vane as it is connected to the first web of material.

It is to overcome the shortcomings in the prior art machines for making architectural covering products of this type that the present invention has been made.

SUMMARY OF THE INVENTION

The present invention relates to an apparatus for fabrication of a covering for an architectural opening wherein the covering product has a pair of opposed sheets or panels of material which are interconnected in spaced relationship by a plurality of parallel overlapped vanes extending therebetween. The vanes are made of a flexible material that is preferably opaque or translucent, while the sheet material may be a flexible sheer material that permits some level of passage of light and vision. The apparatus includes three main stations, namely (1) a vane/strip preparation station, (2) a vane/strip handling station, and (3) a laminating station. At the vane/strip preparation station, rolls or webs of material from which the vanes in the covering product are to be made are mounted so that the material can pass through the preparation station while being printed or coated a preselected color, dried, treated with lines or beads of adhesive, cut into elongated contiguous strips and finally re-rolled on a take-up roller stored on a mobile transport cart.

The material is printed with the use of a mobile and interchangeable print/roll cart that includes a self-contained supply drum or tank of liquid dye or ink, an ink flow-through reservoir through which ink from the tank is circulated by a circulating pump, a pick-up roller in communication with the flow-through reservoir, and a transfer roller for removing ink from the pick-up roller, with the transfer roller being designed to apply the ink to the web of material passing thereby. When the web of material is in engagement with the transfer roller, it is passing around a relatively large fabric or web control roller that is rotatably mounted on a framework for the vane/strip preparation station to which the print/roll cart is removably attached. The web of material passing around the fabric control roller is fed through a drying area within the framework of the preparation station so that the printed fabric can be subsequently treated with the application of elongated beads of adhesive.

After having been dried, the fabric is fed past a plurality of side-by-side adhesive applicators adapted to apply laterally spaced lines or beads of adhesive along the length of the web. The beads of adhesive are applied alternately on opposite faces of the web and at predetermined spacings according to the width of the strips from which the vanes in the finished product will be made. After the beads of adhesive have been applied to the web, the adhesive on the web of material is cooled to solidify the adhesive and render it inert so as not to be tacky and the web of material is thereafter passed through cutters which sever the web of material into a plurality of side-by-side strips running longitudinally of the web. The cuts are made in the material such that each strip will have a line of adhesive on one face adjacent one side edge of the strip and on the opposite face adjacent the opposite side edge of the strip.

The strips of material which are disposed contiguously are then fed onto a take-up roller on a mobile transport cart which continuously moves the contiguous strips laterally back and forth a slight distance as they are wound on the roller. The strips are thereby wound about the roller so that the beads of adhesive on overlying layers of strips are misaligned to obtain a relatively even or level wrap of the strips about the take-up roller.

The transport cart, subsequent to a completed wrapping of contiguous strips of material onto the take-up roller, is moved to the vane/strip handling station.

The vane/strip handling station is adjacent to and in longitudinal alignment with the laminating station. The vane/strip handling station is adapted to receive and releasably confine in side-by-side relationship a plurality of transport carts having take-up rolls full of wrapped strips of material. The strips of material from one or more of the carts, which depends upon the height of the window covering to be made as will be explained in more detail later, are fed into a vertical framework which includes a plurality of coordinated strip guide members or supports which allow the strips to pass through the strip handling station so that they emerge from a downstream end of the station in overlapped parallel relationship with each other and in longitudinal alignment with the laminating station.

At the laminating station, first and second supply rolls of sheet material are supported for lamination with strips of material emanating from the vane/strip handling station. The supply rolls of sheet material are mounted so that the material can be fed to a juncture location with the sheets and strips desirably converging at the juncture location in longitudinal alignment with each other. The laminating station includes heating and cooling sections for activating and subsequently curing, respectively, the adhesive that was previously applied to the strips to bond the strips to the first and second sheets of material.

The supply roll of the first sheet material is positioned upstream from the vane/strip handling station and is fed across an inverted U-shaped frame over the vane/strip handling station and downwardly to the juncture location where it is merged with the strip material emanating from the vane/strip handling station. The supply roll for the second sheet material is positioned near the downstream end of the laminating station and is fed upstream along a lower path so as to emerge beneath the strip material emanating from the vane/strip handling station and so as to converge with the strips and the first sheet material at the juncture location. In reality, the strip material is overlayed onto the second sheet material and subsequently this prelaminate is fed into underlying relationship with the first sheet material before the tri-layer laminate is fed into the heating sections of the laminating station.

The tri-layer laminate is confined between transfer belts in the laminating station that move the laminate initially through the heating sections where the beads of inert adhesive are activated to bond the strip material to the first and second sheets of material and subsequently through cooling sections where the adhesive is allowed to cure. The laminate emerging from the downstream end of the laminating station is wound onto a take-up roller on a movable cradle which can then be transferred in any suitable manner to another location where the laminate product can be cut to a desired size and integrated with operating hardware to complete the architectural covering product.

Other aspects, features and details of the present invention can be more completely understood by reference to the following detailed description of a preferred embodiment taken in conjunction with the drawings and from the appended claims.

BRIEF DESCRIPTION OF THE DRAWINGS

FIG. 19 is an enlarged fragmentary section with parts broken away taken along line 19—19 of FIG. 18.

FIG. 20 is a fragmentary section taken along line 20—20 of FIG. 19.

FIG. 21 is an enlarged fragmentary section taken along line 21—21 of FIG. 18.

FIG. 22 is an enlarged fragmentary section taken along line 22—22 of FIG. 18.

FIG. 23 is an enlarged fragmentary section taken along line 23—23 of FIG. 18.

FIG. 24 is an enlarged fragmentary section taken along line 24—24 of FIG. 23.

FIG. 25 is an enlarged fragmentary section taken along line 25—25 of FIG. 23.

FIG. 26 is a front elevation of a transport cart used in the vane/strip preparation station.

FIG. 27 is a section taken along line 27—27 of FIG. 26.

FIG. 28 is an enlarged fragmentary section taken along line 28—28 of FIG. 26.

FIG. 47 is an enlarged section taken along line 47—47 of FIG. 37.

FIG. 48 is an enlarged section taken along line 48—48 of FIG. 37.

FIG. 50A is a section taken along line 50A—50A of FIG. 50.

FIG. 51 is a diagrammatic fragmentary vertical section taken along line 51—51 of FIG.

FIG. 52 is a diagrammatic fragmentary vertical section taken along line 52—52 of FIG. 37.

FIG. 52A is an exploded section corresponding to FIG. 52.

FIG. 55 is a diagrammatic side elevation of the main section of t he laminating station.

FIG. 55A is an exploded view corresponding to FIG. 55.

DESCRIPTION OF THE PREFERRED EMBODIMENTS

Figure 1A:
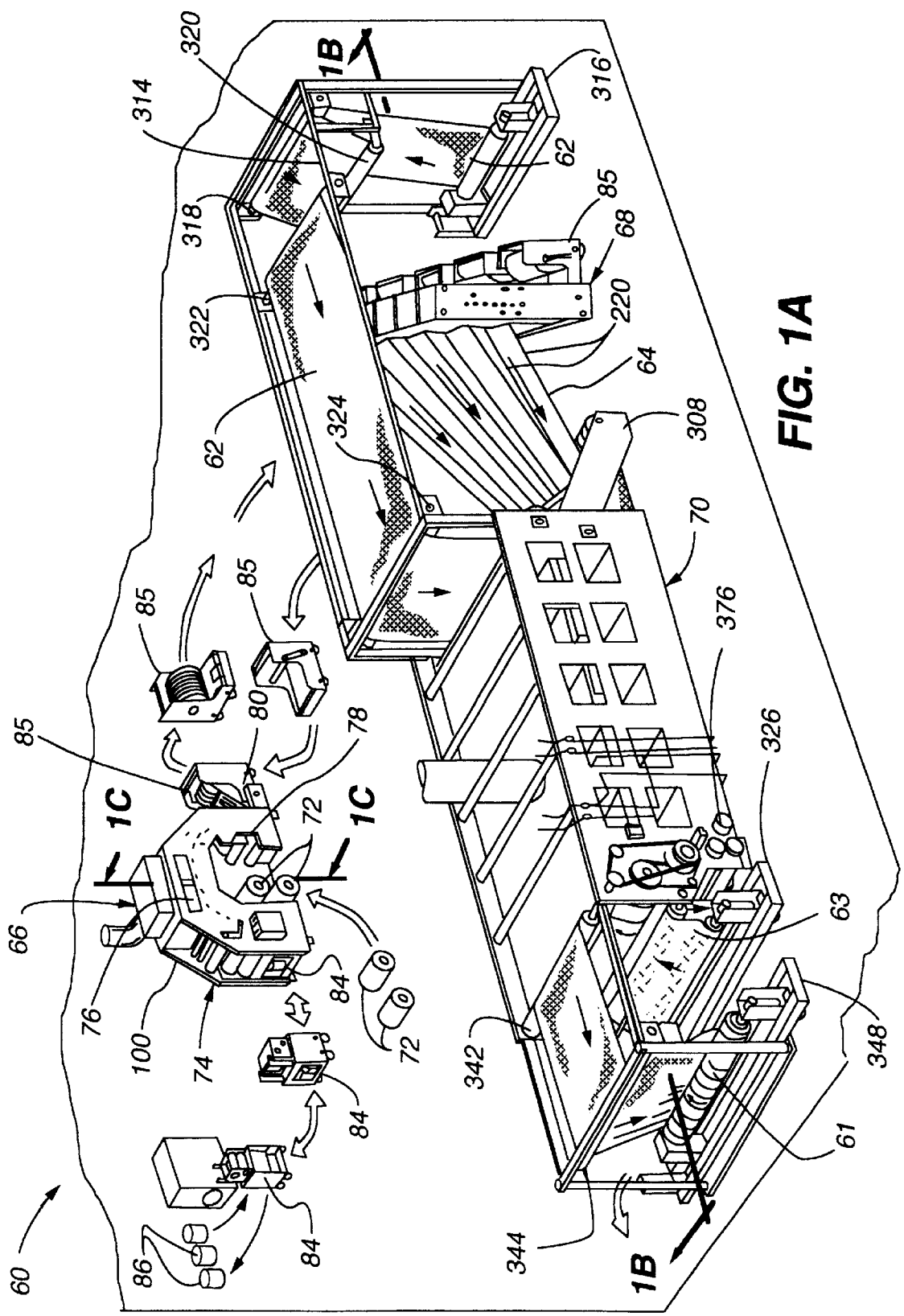
FIG. 1A is a diagrammatic isometric view of the apparatus of the present invention.

The apparatus 60 of the present invention as broadly seen in FIG. 1A has been designed to efficiently manufacture a product 61 (FIGS. 2 and 3) for use in a covering for an architectural opening. The manufactured product includes first and second flexible parallel panels or sheets of material 62 and 63 respectively, that are preferably sheer, which are interconnected by a plurality of parallel flexible vanes 64 that are preferably opaque or translucent. The vanes are caused to simultaneously pivot about longitudinal axes by planar movement of the parallel sheets 62 and 63 in opposite directions such that the vanes move between an open condition, wherein they extend parallel to each other and perpendicular to the architectural opening with a space defined therebetween, and a closed condition, wherein they are substantially coplanar with each other and in overlapping relationship to block the passage of vision and light. The apparatus and method described hereafter is accomplished at three processing stations with the first station being a vane/strip preparation station 66, the second station a vane/strip handling station 68, and the third station a laminating station 70.

General Overview of Apparatus

At the vane/strip preparation station 66, a web 72 of material from which the vanes 64 are to be formed is initially processed so as to print the web material any desired color or pattern. It is then treated to receive elongated parallel beads of adhesive on opposite faces thereof. Subsequently, the web material is cut or slit into a plurality of elongated strips which will form the vanes in the final product 61 and the strips are accumulated on a transport cart which is utilized to transfer the strips to the vane/strip handling station 68. At the vane/strip handling station, the strips of material are manipulated so that they are delivered to the laminating station 70 in parallel overlapping relationship for connection to the first and second sheets of material 62. The first and second sheets of material at the laminating station are merged on opposite sides toward the elongated strips so as to form a tri-layer laminate. The tri-layer laminate is advanced through the laminating station 70 where the adhesive that was previously applied to the strips is activated in heating sections and subsequently cured in cooling sections so as to form the desired product. The product 61 is ultimately cut to size and operatively joined with a control system to form a final covering for use in an architectural opening.

Vane/Strip Preparation Station

Figure 4:
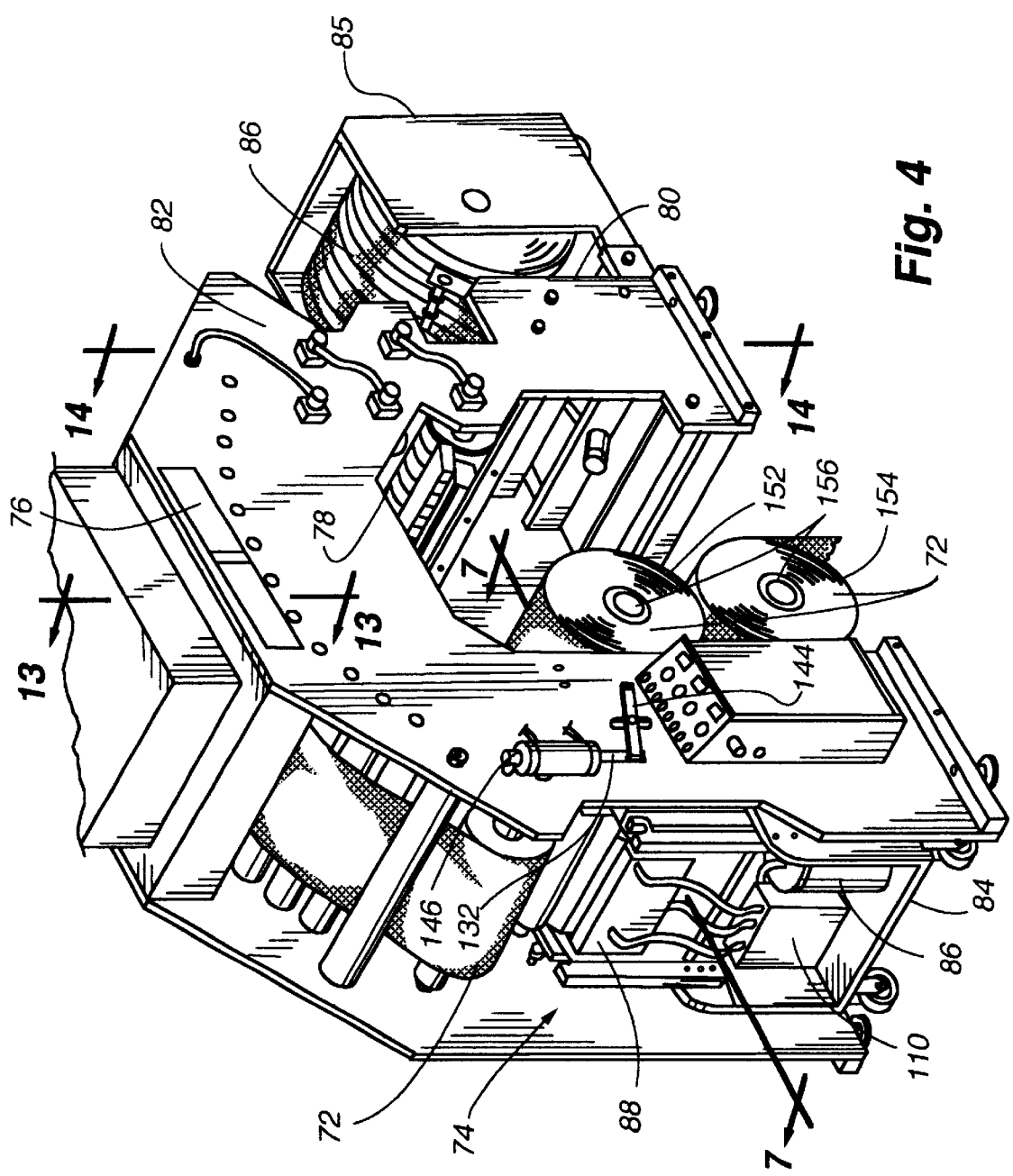
FIG. 4 is a fragmentary isometric view of the vane/strip preparation station of the apparatus of FIG. 1A.

The vane/strip preparation station 66 is illustrated in FIGS. 1 and 4 through 28. With initial reference to FIG. 4, the vane/strip preparation station can be seen to include an inking section 74, a drying section 76, an adhesive applicator section 78, a cutting or slitting section 80 and a take-up roller section 82. The inking section 74 includes a removable cart 84 with the cart having a tank or storage drum 86 for ink or other fluid dye material, a flow through or circulating fluid reservoir 88, a pump 90 for circulating ink from the tank through the reservoir, a battery-type power supply 92, a pick-up roller 94 in communication with the interior of the flow through reservoir, 88 and a transfer roller 96 in rolling engagement with the pick-up roller 94. A power supply cord 98 is connected to the pump and motors to drive the pick-up and transfer rollers, with the power cord being adaptable to be plugged either into the battery power supply 92 on the cart or a power outlet on a main or base frame 100 of the vane/strip preparation station.

The cart 84 itself has a lower framework 102 including support rollers 104 and a removable print head 106 mounted on the lower framework. The lower framework defines a compartment 108 for storage of an ink tank 86 and the pump 90, as well as a control box 110 for the operative components on the cart and the battery 92, while the removable print head 106 includes the flow through ink reservoir 88, the pick-up roller 94 and the transfer roller 96. The lower framework is recessed on its front side so as to accommodate a power supply box 112 mounted on the main frame 100 of the vane/strip preparation station which includes an outlet for connection to the power cord.

Figure 8:
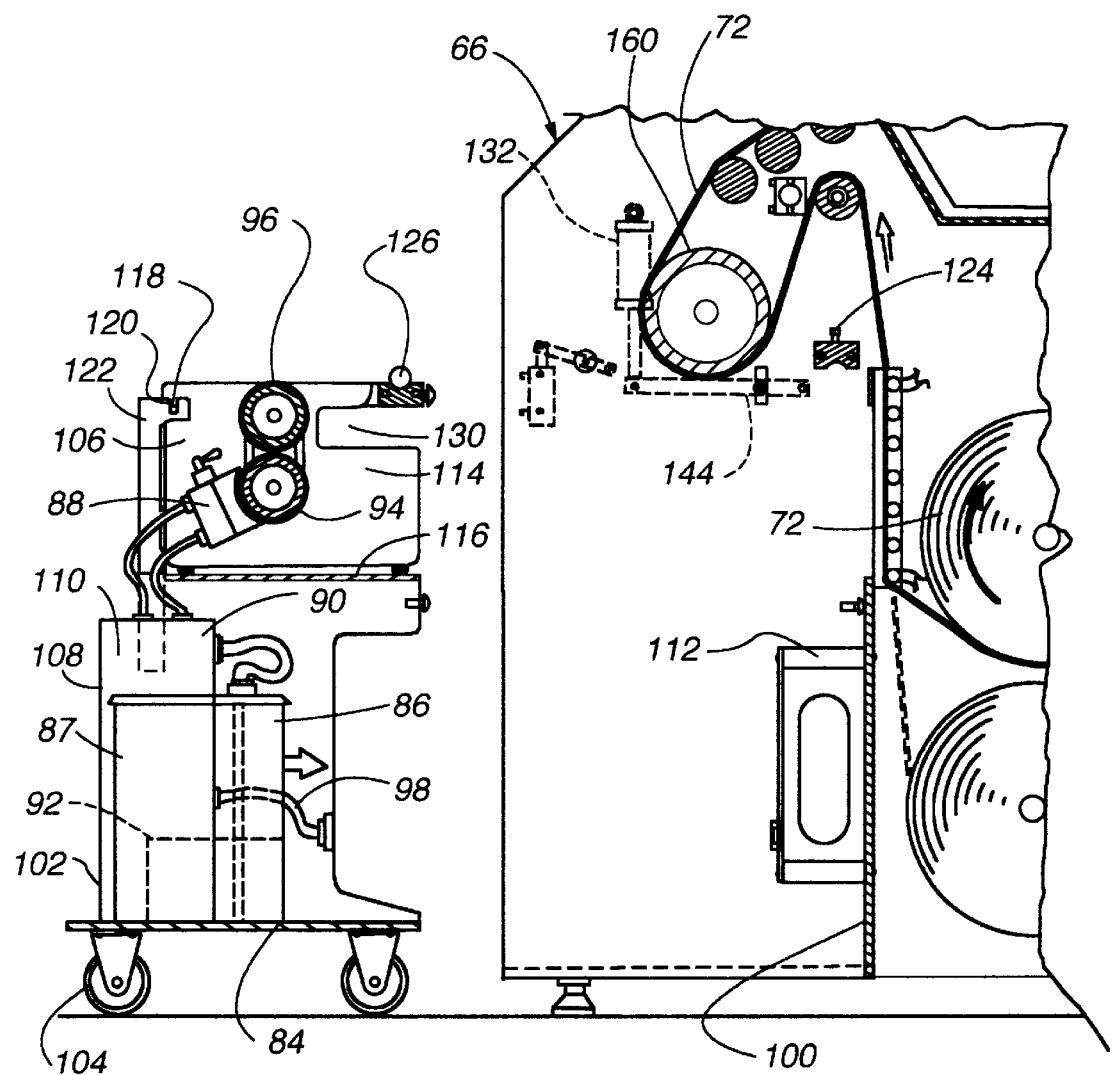
FIG. 8 is a fragmentary vertical section taken through the input end of the vane/strip preparation station with the print cart removed.
Figure 9:
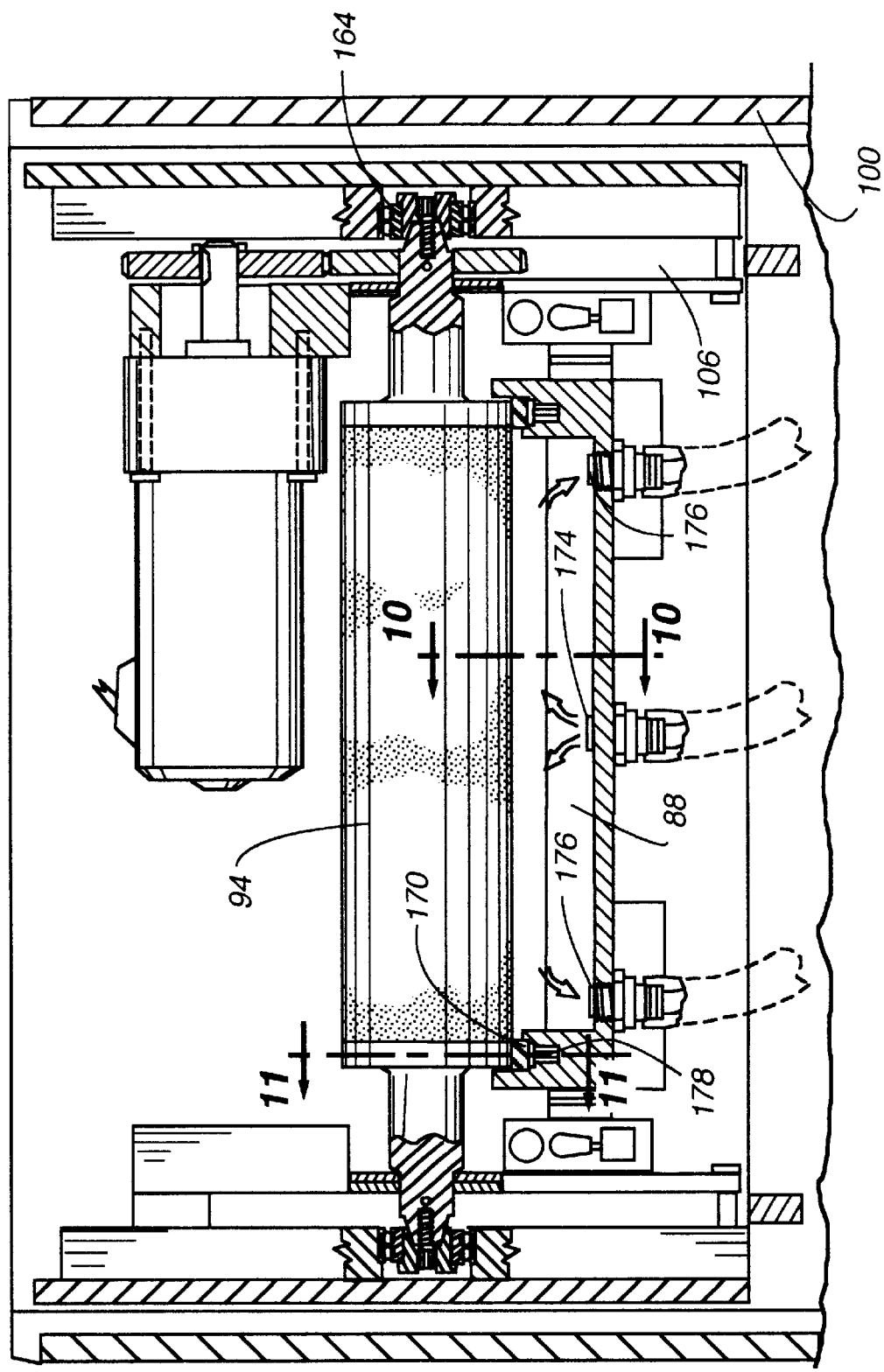
FIG. 9 is an enlarged fragmentary section taken along line 9—9 of FIG. 6.
Figure 12:
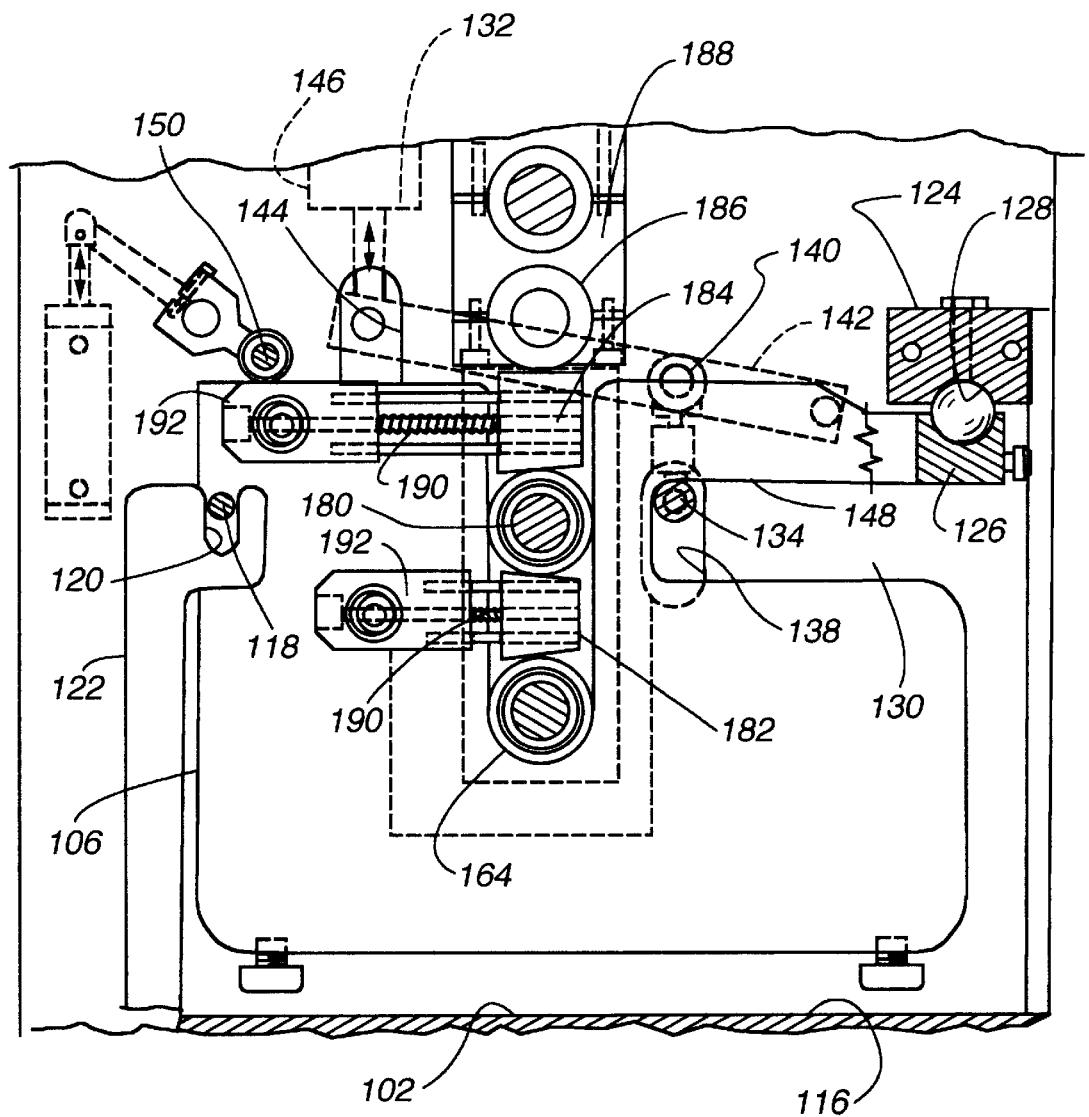
FIG. 12 is an enlarged fragmentary section taken along line 12—12 of FIG. 6.

As is best seen in FIG. 8, the removable print head 106 has an auxiliary frame 114 and normally sits on a top wall 116 of the lower framework 102 and is held in position by an engagement pin 118 (FIG. 12) which rests in a vertical slot 120 provided in a vertical wall 122 of the lower framework. The print head needs to be precisely or positively aligned with the main frame 100 of the vane/strip preparation station for purposes that will become more clear hereafter, and in order to accommodate this perfect alignment, the main frame, as best seen in FIG. 12, includes an engageable alignment or clamp system 124 including an operative component in the form of a ball stop 126 with the ball stop adapted to register with a recess 128 on the front face of the removable print head. In other words, as the cart is rolled into the recess of the main frame 100, a slot or recess 130 on the front side of the print head 106 is rolled into substantially vertical alignment with the ball stop so that the cart is substantially positioned laterally and longitudinally of the main frame at the desired location. The main frame also has a lift system 132 with a lift pin 134 which, as again best seen in FIG. 12, is moved into the open horizontal slot 130 in the front side of the print head as the cart is moved into position with the ball stop registered in the recess 128. The lift pin 134 is supported for vertical guided movement within oval slots 138 in the main frame 100 by a pair of transfer bars 140, one end of each transfer bar being pivotally connected to the machine at 142, and the other end being connected to a connector bar 144 that is vertically movable by a pair of power lift cylinders 146 mounted to the main frame on each side thereof. The lift cylinders are normally extended so as to lower the lift pin 134 when the cart is being inserted into the main frame of the vane/strip preparation station but retraction of the cylinders lifts the lift pin 134 against an engagement or lift surface 148 defined by the open horizontal slot 130 on the print head so as to lift the print head 106 off the lower framework 102 of the cart. The recess 128 in the print head will come into registry with the ball stop 126 and the print head will pivot slightly about the ball stop, but movement of the opposite or rear side of the cart is resisted by a spring-biased roller 150 which assures that the engagement pin 118 on the print head does not come out of the vertical slot 120 in the vertical arm of the lower frame of the cart. In this manner, the positioning of the print head relative to the main frame of the vane/strip preparation station is precisely controlled and once the cart has been positioned in the main frame and the power cylinders 146 activated, the working components on the cart are positioned as desired.

Figure 7:
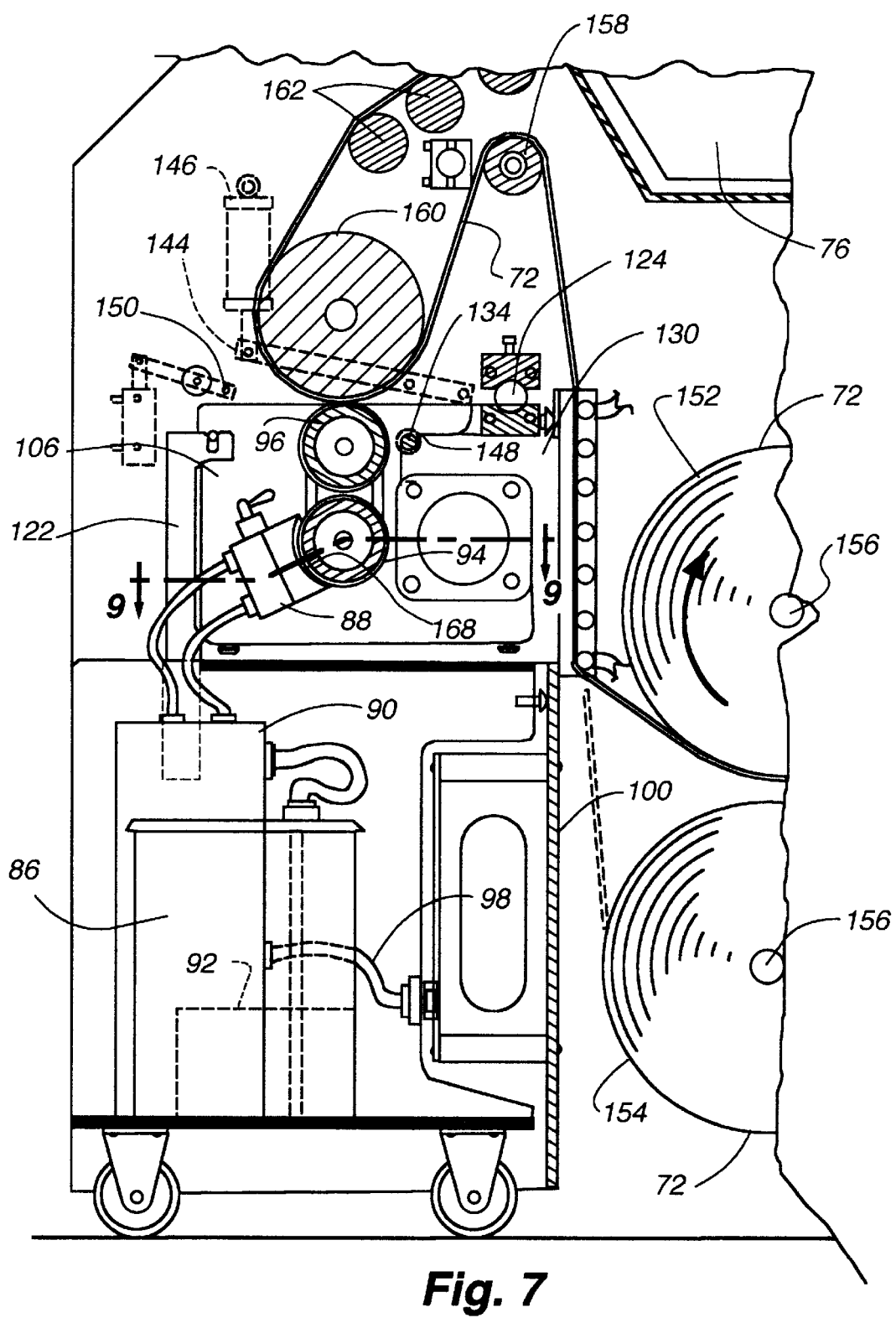
FIG. 7 is a vertical section taken along line 7—7 of FIG. 4.
Figure 7A:
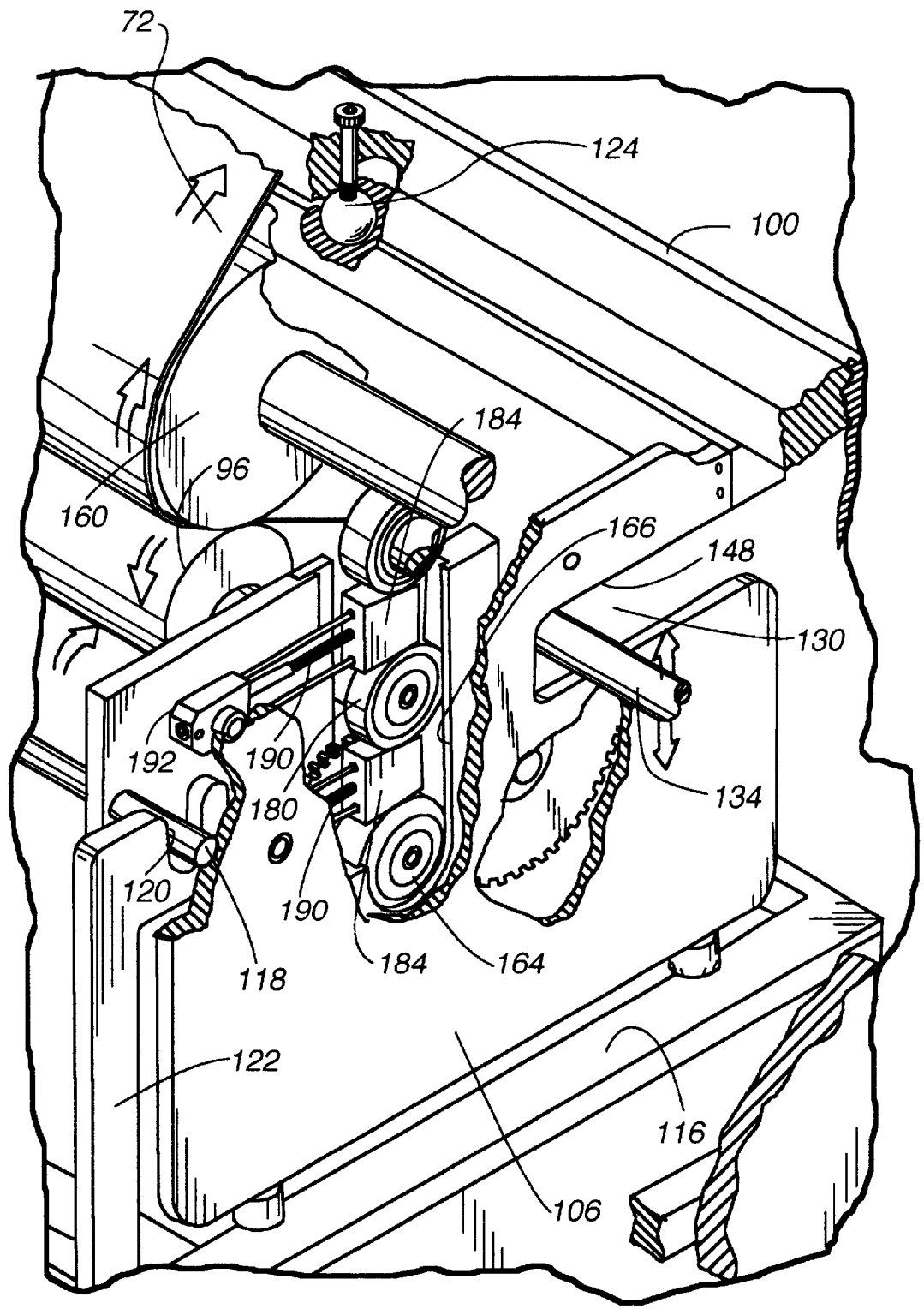
FIG. 7A is a fragmentary isometric of the printer.

With reference to FIG. 7, the inking section 74 of the vane/strip preparation station 66 can be seen to be positioned in the main frame 100 immediately adjacent to a pair of supply rolls 152, 154 of web material 72 from which the vanes or strips 64 to be used in the architectural covering product are to be made. FIG. 7 shows a primary roll 152 of the material and a secondary supply roll 154 positioned therebeneath, it being understood that only one roll of material is used at a time. Both supply rolls are rotatably mounted on transverse support rods 156 of the main frame. As illustrated, the upper supply roll 152 is being used and, as will be appreciated, the webbing 72 coming off the roll is drawn upwardly across a tensioning idler roller 158 before being passed downwardly and around a relatively large diameter driven fabric control roller 160 from which the fabric web again is directed upwardly across the first of a plurality of guiding idler rollers 162 before being fed into the drying section 76 of the vane/strip preparation station. The fabric control roller 160 at its lowermost extent is immediately adjacent and in diametric alignment with the transfer roller 96 on the print head 106 and, as will be explained hereafter, the transfer roller is adapted to engage and thereby print the fabric web with a predetermined color and/or print pattern as the fabric passes around the fabric control roller.

Figure 11:
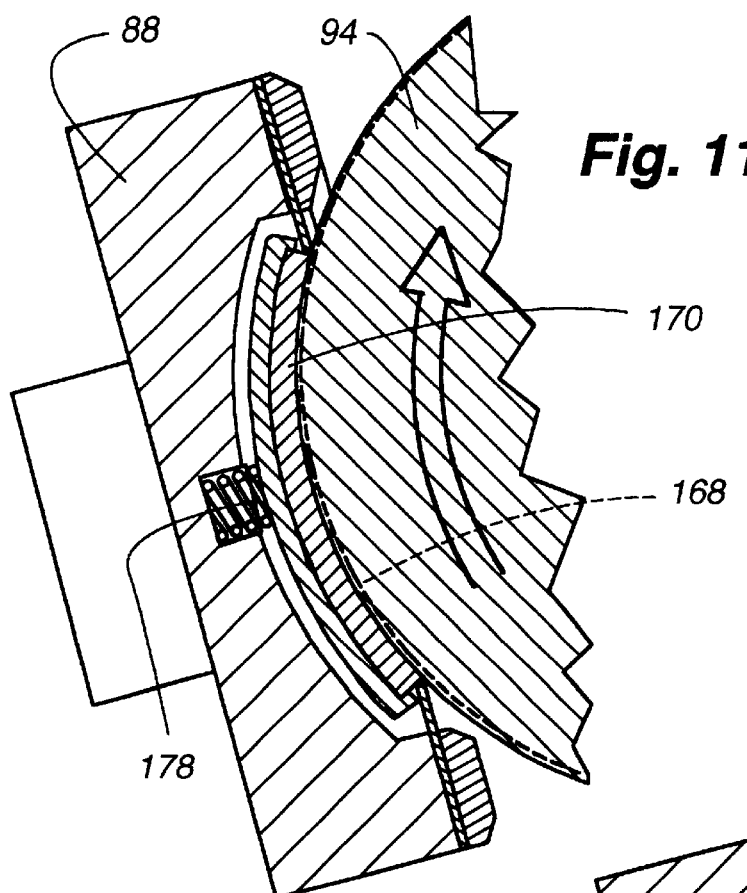
FIG. 11 is an enlarged fragmentary section taken along line 11—11 of FIG. 9.
Figure 10:
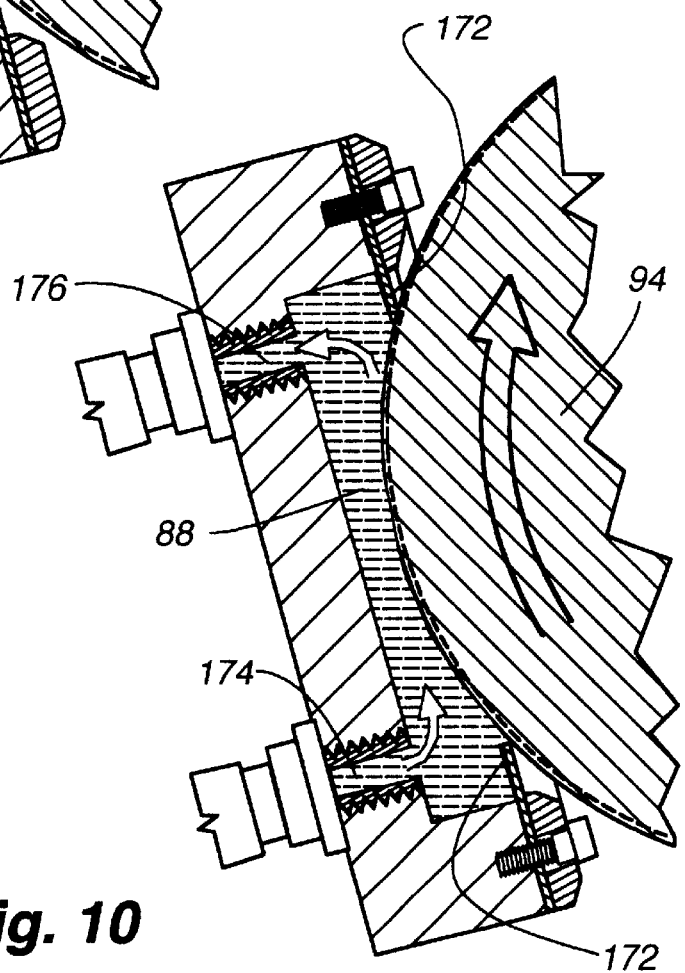
FIG. 10 is an enlarged fragmentary section taken along line 10—10 of FIG. 9.

The pick-up roller 94, which is preferably an anilox roller, is rotatably mounted in bearings 164 slidably supported on the frame 106 for vertical movement in slots 166 in the frame and so that a portion of its circumference is received in communication with the interior of the transfer flow-through reservoir 88 so as to have its cylindrical surface rotating through the ink in the reservoir. The flow-through reservoir is disposed at an angle to horizontal so that it has a substantially rectangularly shaped open side 168 that is directed toward the pick-up roller 94. The pick-up roller is positioned slightly above and to the side of the flow-through reservoir. Arcuate sliding seals 170 are positioned at opposite ends of the reservoir and straight sliding seals 172 in the form of doctor blades across the top and bottom to prevent ink from leaking from the reservoir while the pick-up roller is rotating therein. As probably best seen in FIG. 10, ink is supplied to the reservoir through a lower portal 174 (FIGS. 6 and 10) and is allowed to flow out of the reservoir through a pair of upper portals 176 and back to the supply tank 86. The pump 90 continuously circulates the ink from the tank 86 through the reservoir 88 so as to maintain a desired uniform mix of the ink. In FIG. 11, it can be seen that the sliding seals 72 at opposite ends of the transfer reservoir which engage the pick-up roller are biased outwardly by coil springs 178 to assure there is no leakage of ink from the reservoir.

The pick-up roller 94 is positioned to rotate in engagement with the transfer roller 96 so that the transfer roller can receive ink from the cylindrical surface of the pick-up roller and transfer the ink to the web 72 of fabric material against which the transfer roller remains in engagement. The transfer roller is also rotatably mounted in bearings 180 that are slidably connected to the frame 106 in the slots 166 for vertical movement. The lift cylinders 146 which raise the printing head off the lower framework of the cart in the process move the transfer roller 96 into engagement with the web 72 of fabric material as it passes around the fabric control roller 160.

The pressure between the pick-up roller 94 and the transfer roller 96 is controlled with pairs of frustoconical members 182 and 184 at each end of the rollers that are in engagement with the supporting bearings 164 and 180 on the ends of the rollers. Referring to FIG. 12, it will be seen that a lower set of horizontally aligned frustoconical members 182 are positioned between the support bearings 164 for the pick-up roller and the support bearings 180 for the transfer roller, with the frustoconical members being positioned at opposite ends of the rollers. An upper set of horizontally aligned frustoconical members 184 is positioned between the bearings 180 for the transfer roller and an engagement bearing 186 fixed on a mounting block 188 for the fabric control roller 160. As will be appreciated, axial movement of the frustoconical members will determine the spacing between the respective bearings and consequently the associated rollers. The frustoconical members are mounted on threaded shafts 190 so that they can be moved axially in and out of pivoted mounting blocks 192 thereby regulating the spacing between and, therefore, the engagement pressure between the respective rollers. It can be appreciated from the above that as the web 72 of fabric material is fed around the tensioning roller 158 and across the fabric control roller 160 it is engaged with a predetermined and desired pressure by the transfer roller which has been supplied with ink on its outer cylindrical surface by the pick-up roller that in turn received the ink from the flow-through reservoir.

The frustoconical members 182 and 184 are mounted on the pivoted mounting blocks 192 so that the transfer and pick-up rollers can be slidably removed and replaced by swinging the mounting blocks out of alignment with the bearings for the rollers within the vertical slots 166.

It should be appreciated with the system of the present invention that it is a very simple matter to change rollers, ink or to replenish the supplies of ink simply by exchanging carts 84 having the rollers and supply of desired ink thereon. Accordingly, the down time typically associated with systems for printing fabric of this type is substantially reduced.

Figure 5:
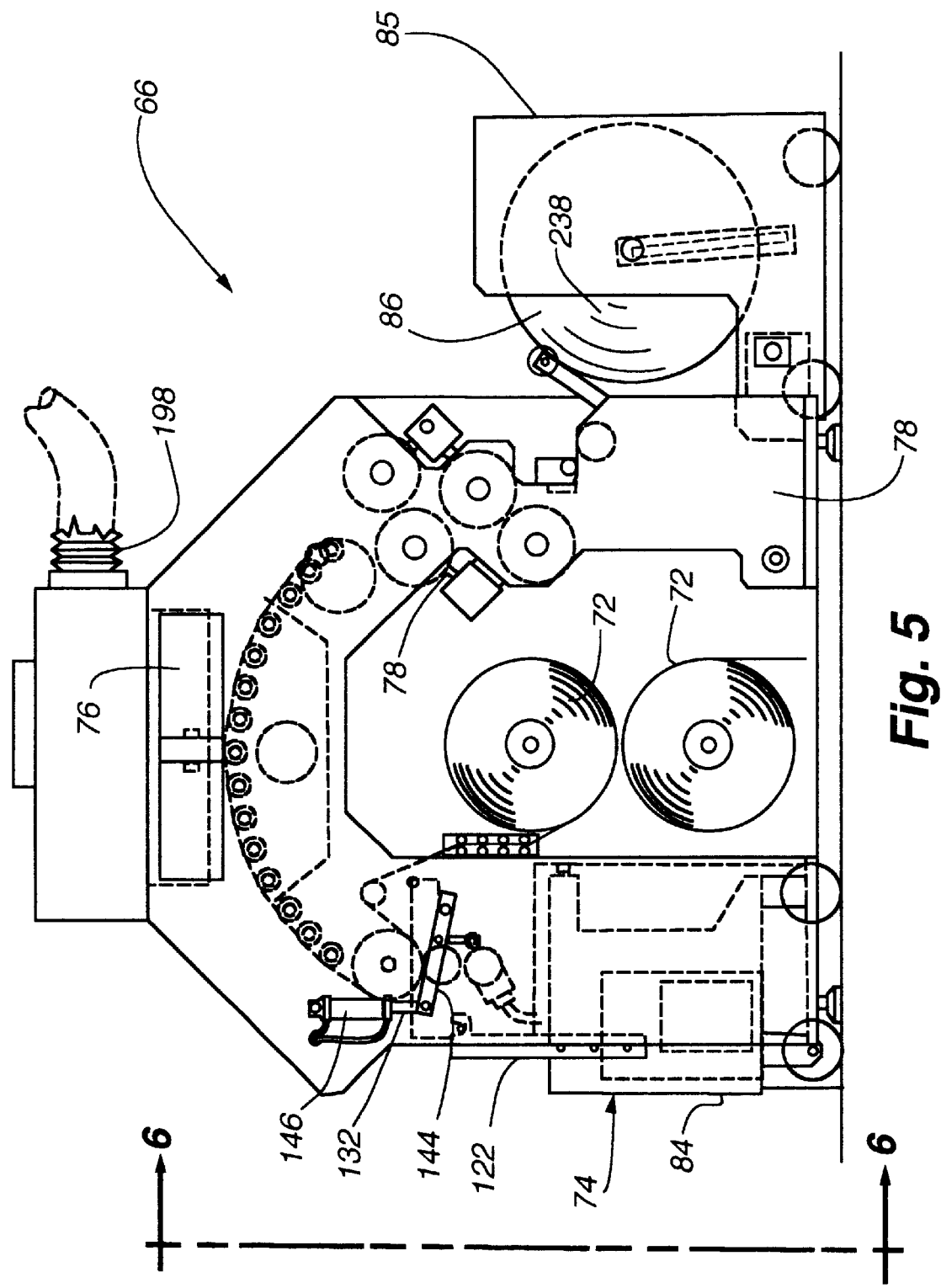
FIG. 5 is a diagrammatic side elevation of the apparatus shown in FIG. 4.
Figure 6:
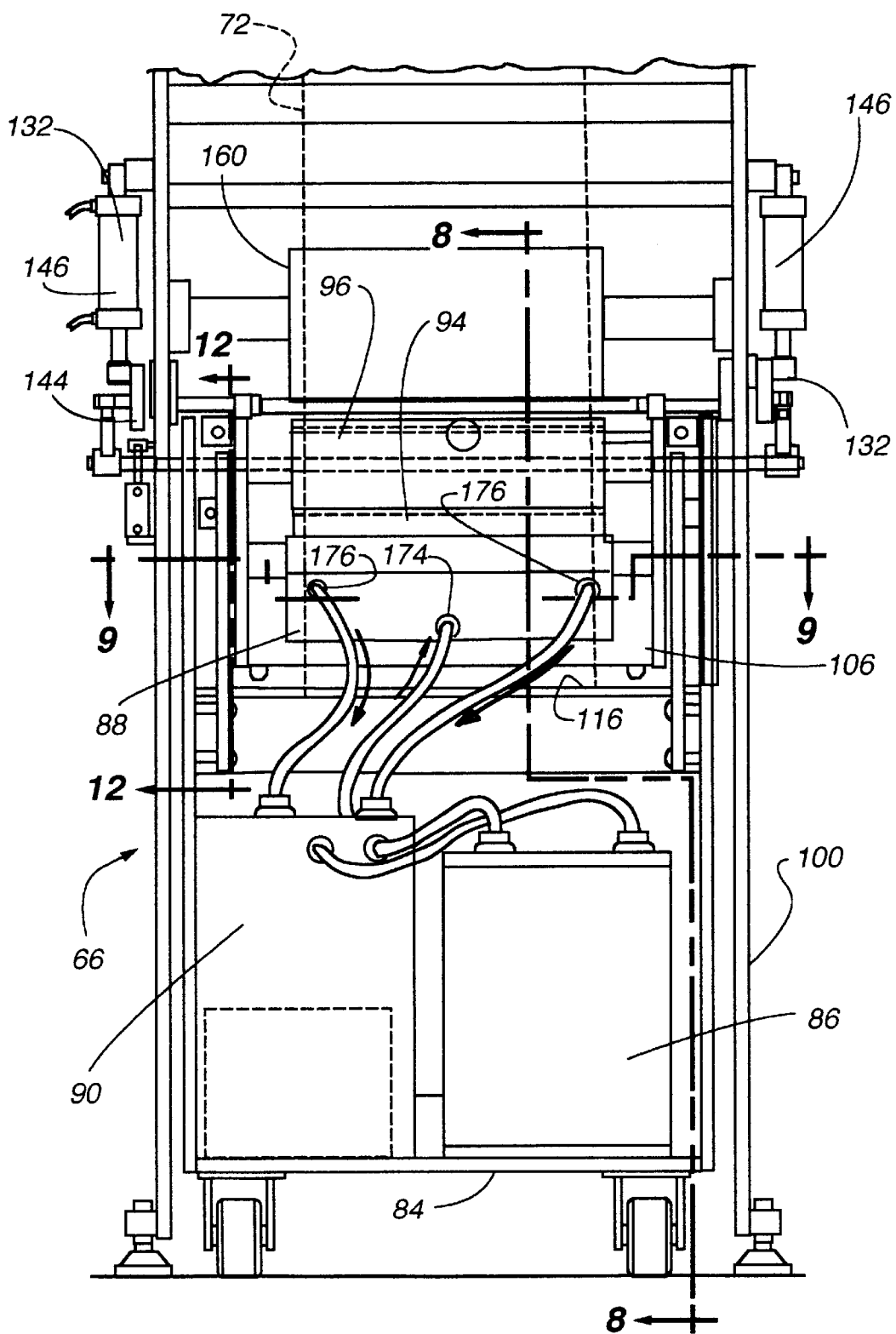
FIG. 6 is a front elevation taken along line 6—6 of FIG. 5.
Figure 13:
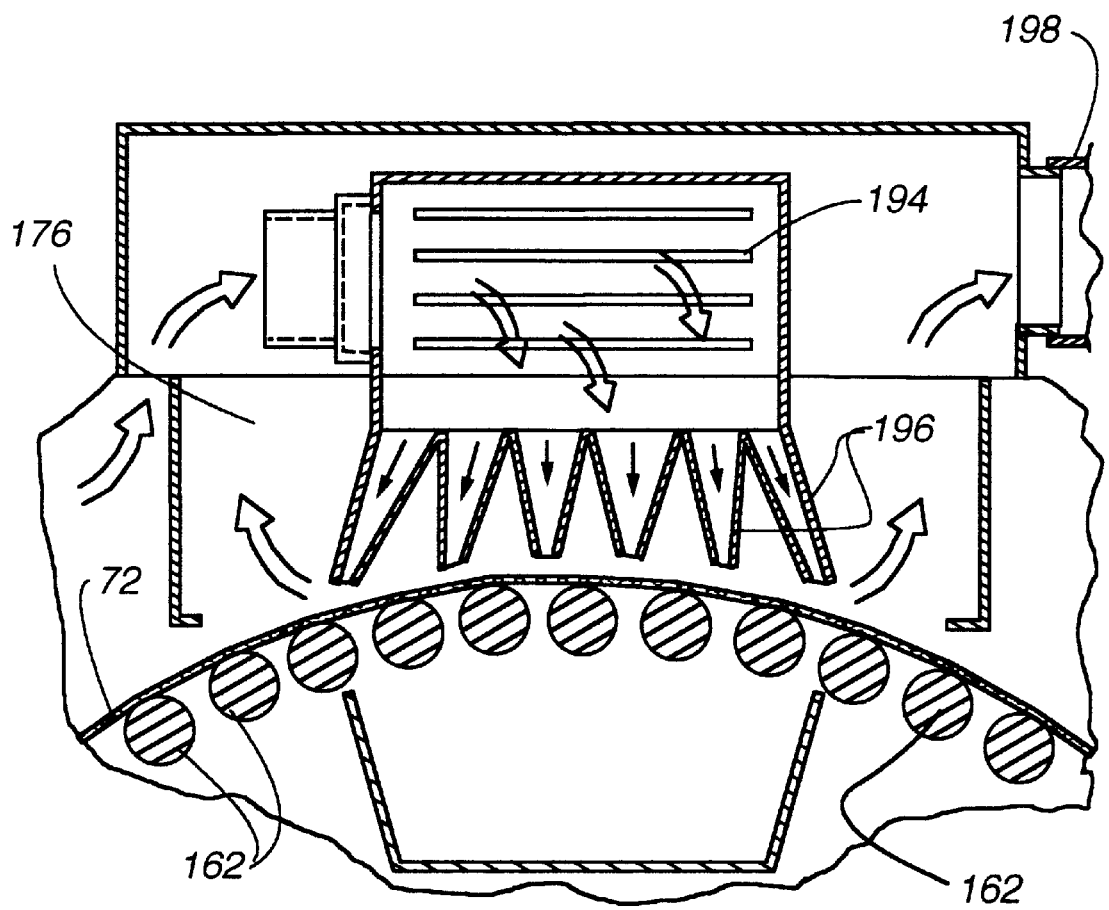
FIG. 13 is an enlarged section taken along line 13—13 of FIG. 4.

As the web of fabric material leaves the inking or printing section 74 of the vane/strip preparation station, it passes over the remainder of the guiding idler rollers 162 and into the drying section 76 as is possibly best seen in FIGS. 5 and 13. In the drying section, the plurality of transversely disposed guiding idler rollers 162 support the web of fabric on their upper surfaces with the rollers being disposed in an arch. A heater 194 is positioned above the rollers 162 so as to draw air in from the ambient environment, heat the air and direct it at the web 72 of fabric material. The heater directs the warm air downwardly through a plurality of longitudinally spaced manifolds 196. The air used to dry the ink on the fabric is then exhausted through an exhaust chute 198 in a controlled manner for environmental purposes.

The fabric web emanating from the drying section 76 of the vane/strip preparation station is passed around a first cooling control roller 200 and then in a reverse direction around a second cooling control roller 202 which are of a conventional type and which may include coolant that passes through the rollers to remove heat from the fabric. As the web passes partially around the second cooling control roller, it passes into the adhesive applicator section 78 in immediate adjacent relationship to a first set of adhesive applicators 204 (FIGS. 14 and 15) which are positioned in adjacent side-by-side relationship on a pressure manifold 206 and communicate with a supply of liquid hot melt adhesive that is delivered to the manifold under pressure.

Figure 14:
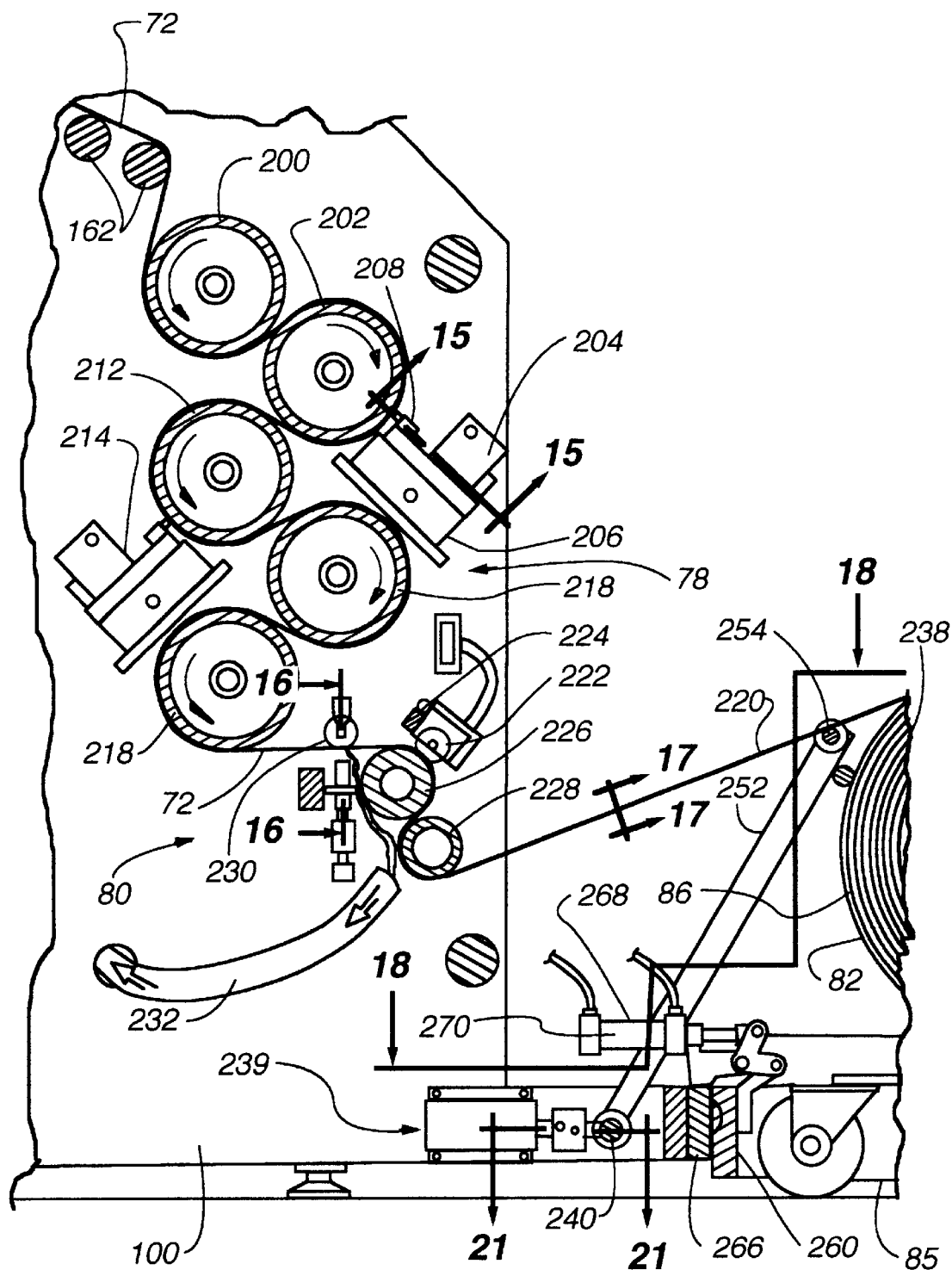
FIG. 14 is an enlarged fragmentary section taken along line 14—14 of FIG. 4.
Figure 15:
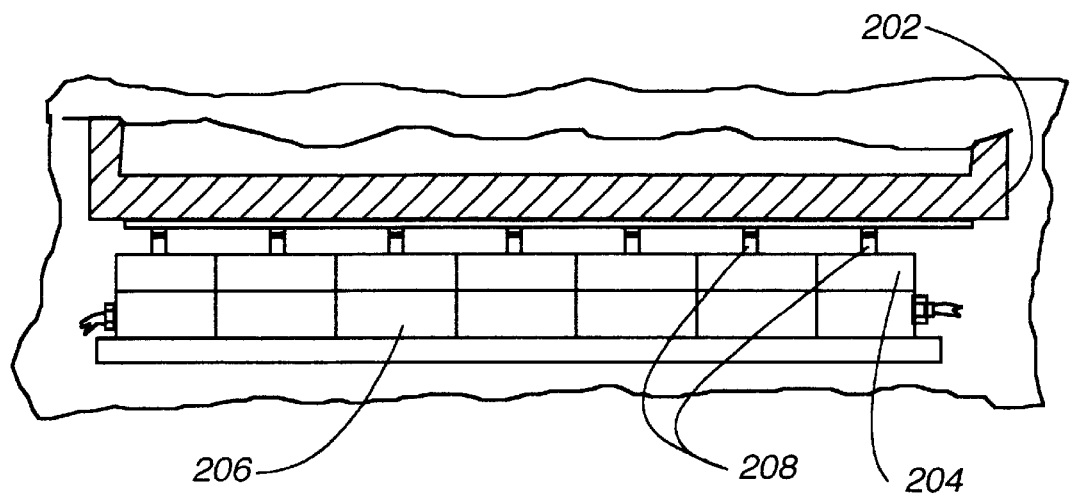
FIG. 15 is an enlarged fragmentary section taken along line 15—15 of FIG. 14.

The applicators 204 can be seen in FIGS. 14 and 15 to include a plurality of nozzles 208 all communicating with the pressure manifold of the hot melt adhesive which may be of the type manufactured by EMS American Grilon of Sumpter, South Carolina, and sold under model no. 6-G. The nozzles apply elongated beads or lines of adhesive 210 to one side of the web of material at predetermined spacings as the web passes thereby. The adhesive solidifies quickly on the second cooling roller 202 where it was applied and thereby becomes inert so as no not to be tacky or sticky. The beads or lines of adhesive are applied parallel with each other for a purpose that will become clear.

Figure 17:
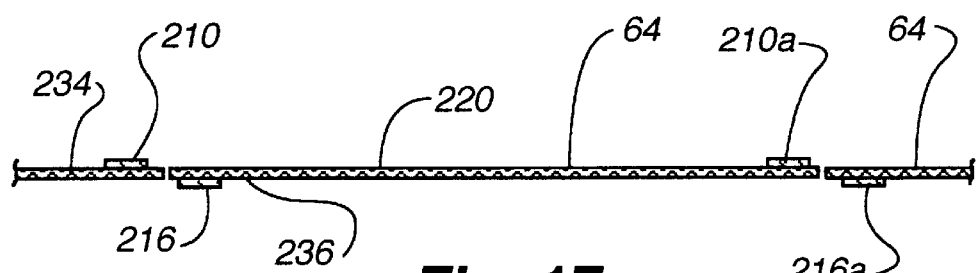
FIG. 17 is an enlarged section taken along line 17—17 of FIG. 14.

The surface of the fabric web 72 having the inert beads of adhesive 210 thereon moves into confronting relationship with a third cooling control roller 212 and after the web of fabric has passed partially around this third cooling roller, a second identical adhesive applicator 214 applies lines or beads of adhesive 216 to the opposite side of the web material again in parallel spaced relationship with the beads of adhesive 210 on one side being laterally offset a very small distance from the beads of adhesive 216 on the opposite side as seen in FIG. 17. Accordingly, there will be a bead of adhesive 210a on one side and an associated bead of adhesive 216a on the opposite side but the associated beads are spaced laterally of the fabric web a slight distance. The associated pairs of beads of adhesive are spaced laterally across the web of material a predetermined distance that corresponds with the width that is desired for the vanes or strips of material that will be used in the product 61 that will ultimately form part of the covering for an architectural opening.

As best seen in FIG. 14, after the fabric web 72 has received the adhesive on both sides, it passes around in a reversing manner two additional cooling rollers 218 so as to render the adhesive 216 applied to the second side of the fabric inert before the fabric web leaves the adhesive applicating section 78 of the vane/strip preparation station.

Figure 16:
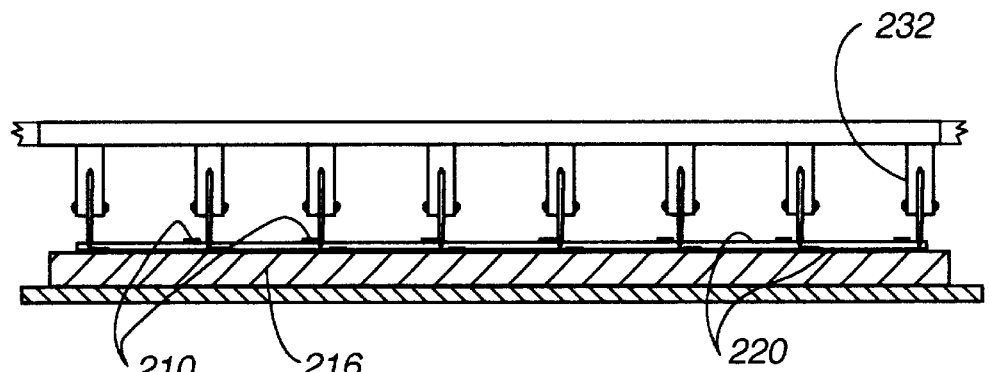
FIG. 16 is an enlarged fragmentary section taken along line 16—16 of FIG. 14.

As the fabric web 72 leaves the adhesive applicating section, it enters the cutting or slitting section 80 where the elongated web of fabric is cut into a plurality of side-by-side longitudinally extending strips 220 with suitable cutters 222. As seen in FIG. 14, normally the fabric would simply be cut with conventional roll cutters 222 rotatably mounted in laterally spaced relation on a common support beam 224 for cutting engagement with the web of material as it crosses over a first 226 of two support rollers 226 and 228. The support beam 224 is pneumatically mounted so that the pressure of the roll cutters against the web of material and back up support roller 228 can be regulated. If the web of material is a woven fabric, however, roll cutters might leave frayed edges so heat would then be applied along the cut edges to prevent fraying. In the alternative, ultrasonic cutters 230 could be used which would avoid fraying. While both types of cutters are illustrated in FIG. 14, it should be understood that only the ultrasonic or the roll cutter would be necessary, and not both. A vacuum line 232 is disposed adjacent to the support roller 226 so as to draw any loose strands, threads, or scrap fabric and remove them from the vane/strip preparation station. It should be appreciated that the web of fabric material is cut between associated beads of adhesive on opposite surfaces, as seen in FIG. 16, so that the resulting strips 220 of material formed from the web have one line or bead of adhesive in a marginal zone 234 adjacent one side edge of the strip on one face of the strip and a second line or bead of adhesive in a marginal zone 236 adjacent the opposite side edge and on the opposite face.

It will be appreciated that the web 72 of material leaving the cutting or slitting station 80 is, therefore, in a plurality of side-by-side strips and these strips are fed to the take-up roller section 82. The take-up roller section is possibly best seen in FIGS. 5, 14, and 18 through 28, and can be seen to include a transport cart 85 on which the drum 86 is disposed for receiving and wrapping the strips of material therearound. The drum is rotatably mounted on the cart and driven with a motor 240 in synchronized speed with the speed at which the fabric web passes through the vane/strip preparation station. The strips 220 are, therefore, wound on the drum but in a unique manner. If the strips were wound on the drum in a straight line as they leave the cutting or slitting section 80, the beads of adhesive 210 and 216 on overlying layers on the drum will be aligned with corresponding beads on adjacent layers thereby forming an uneven surface due to the fact that the beads of adhesive add thickness to the strips along the side edges of the strips and these thickened portions of the strips would all be aligned and stacked upon each other.

Figure 18:
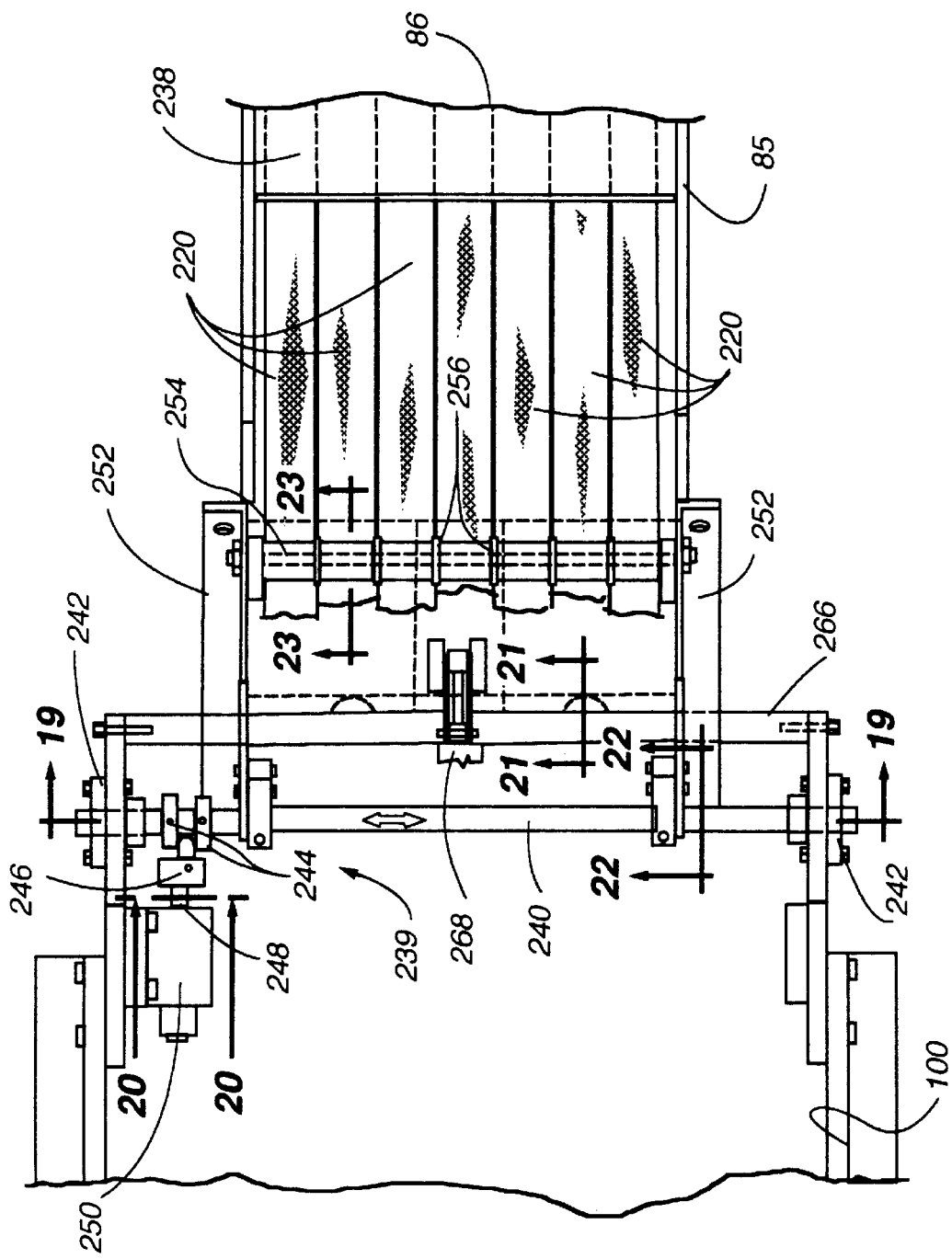
FIG. 18 is an enlarged section taken along line 18—18 of FIG. 14.

In order to obtain a relatively even rolled surface, the side-by-side strips 220 of material are continuously shifted laterally and reciprocally as they are fed to the take-up drum 86 through the use of a diverter system 239. The diverter system is mounted on the main frame 100 of the vane/strip preparation station with the diverter system probably being best seen in FIGS. 14 and 18 through 23. FIG. 18 is a top plan view showing the strips 220 as they are being wrapped on the take-up drum of the transfer cart which functions as a support frame for the take-up drum. Portions of the strips emanating from the cutting or slitting section 80 of the vane/strip preparation station having been removed for clarity. A traverse rod 241 is mounted on the main frame 100 in bearings 242 so as to be laterally slidable within the bearings. The traverse rod has a pair of spaced collars 244 at one end in alignment and engagement with an eccentric 246 mounted on the output shaft 248 of a drive mechanism in the form of an electric motor 250. As the motor rotates the eccentric, it sequentially applies lateral pressure to the collars 244 thereby shifting the traverse rod 241 laterally back and forth along its longitudinal axis. The traverse rod supports a pair of traverse arms 252 that extend upwardly and toward the transfer cart 85 and have a transverse comb 254 mounted on their distal ends. The traverse comb has a plurality of frictionally fixed circular fingers 256 that are mounted eccentrically on a transverse bar 258 with the circular fingers being adapted to slidably fit into the web 72 of fabric between the strips 220 that have been previously cut therein. The circular fingers are mounted eccentrically so that they can be manually rotated between an infinite number of fixed positions, by overcoming their frictional seating, relative to the traverse bar to change their circumferential position so as to vary the extent to which they extend through the fabric web of material for purposes of varying the degree to which they guide the fabric thereby.

As will be appreciated, as the electric motor 250 is driven to rotate the eccentric 246, the transverse rod 241 is reciprocated back and forth laterally thereby moving the transverse comb 254 back and forth laterally which in turn shifts the strips 220 of fabric material back and forth laterally as they are being wrapped on the take-up drum. In this manner, the fabric is wrapped on the drum as illustrated in FIG. 25 such that the beads of adhesive 210 and 216 are largely offset relative to each other so as to form a somewhat level wrapped surface on the drum.

With a predetermined quantity of webbing 72 wrapped onto the drum on the transfer cart, and with the webbing having been cut into a predetermined number of parallel side-by-side strips 220 with adhesive applied to opposite faces thereof, the transfer cart is disconnected from the main frame of the vane/strip preparation station and rolled to the vane/strip handling station.

As best seen in FIG. 14, the transfer carts 85 are releasably connected to the main frame 100 in a precise relation thereto so that the diverter system is desirably aligned with the transfer cart and the take-up drum. The cart has a lower front bumper bar 260 having a pair of horizontal cylindrical holes 262 therethrough which are adapted to be aligned with and receive a corresponding pair of horizontal guide pins 264 mounted on a bumper plate 266 on the main frame. The main frame also supports an over-center releasable clamp mechanism 268 that is pneumatically operated. The clamp mechanism includes conventionally operable linkage adapted to swing down behind the bumper bar 260 on the cart and pull the cart into tight engagement with the main frame 100 when a pneumatic cylinder 270 is activated. Of course, to release the cart the pneumatic cylinder is de-activated allowing the linkage to swing upwardly so that the cart can be manually withdrawn from the vane/strip preparation station 66 and rolled to the vane/strip handling station 68.

Vane/Strip Handling Station

The vane/strip handling station 68 includes a vertical frame 272 that incorporates a plurality of strip handling guides or members so that the strips are delivered in parallel overlapped relationship to the laminating station 70. The vertical frame 272 is disposed at an acute angle relative to the longitudinal axis of the laminating station and, therefore, also relative to the angle at which the strip material 220 is ultimately fed to and through the laminating station. This is probably best seen in FIGS. 1 and 29. The angular relationship is due to the fact that the strip material is delivered to an upstream side of the vertical frame on the transfer carts 85 which are in side-by-side contiguous relationship, but the strips are delivered to the laminating station in partially overlapped relationship so the aggregate width of the strips being handled is wider on the upstream side of the vertical frame than on the downstream side. Therefore, by arranging the vertical frame at an angle relative to the laminating station, the aggregate width of the strips of material being handled on the upstream side can be accommodated in spite of the fact that a relatively narrower aggregate width will be demanded on the downstream side. The aggregate width on the downstream side is determined by the width of the sheet material 62 and 63 that will be laminated to the strips as will be described later.

Figure 1B:
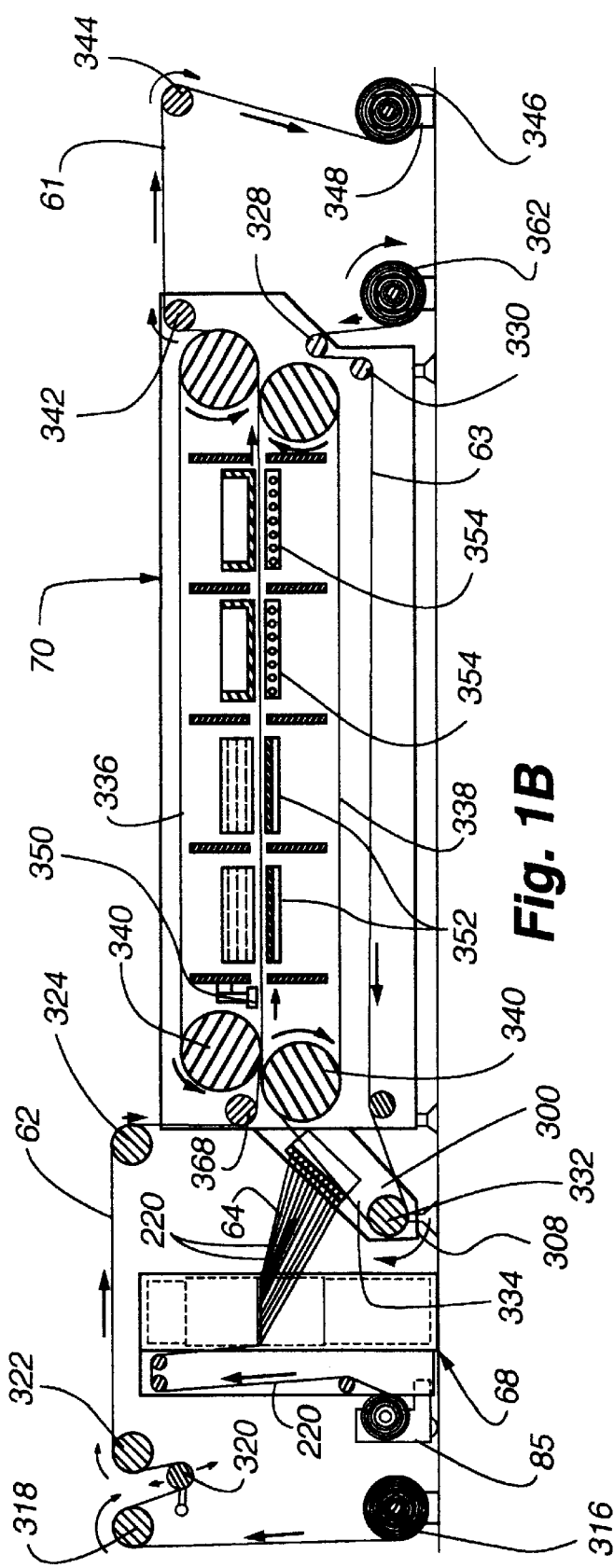
FIG. 1B is a diagrammatic longitudinal section taken through the vane/strip handling station and the laminating station of the apparatus of FIG. 1A.
Figure 1C:
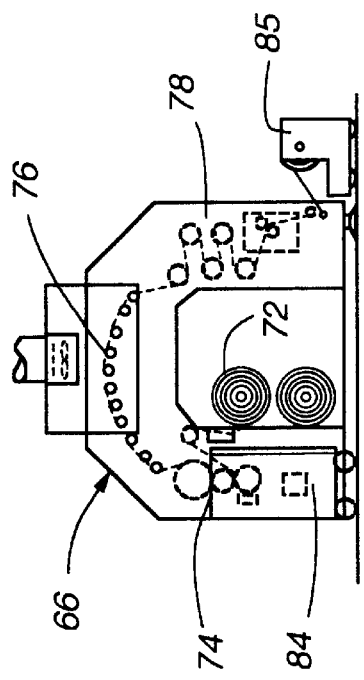
FIG. 1C is a diagrammatic longitudinal vertical section taken through the vane/strip preparation station of the apparatus of FIG. A.
Figure 29:
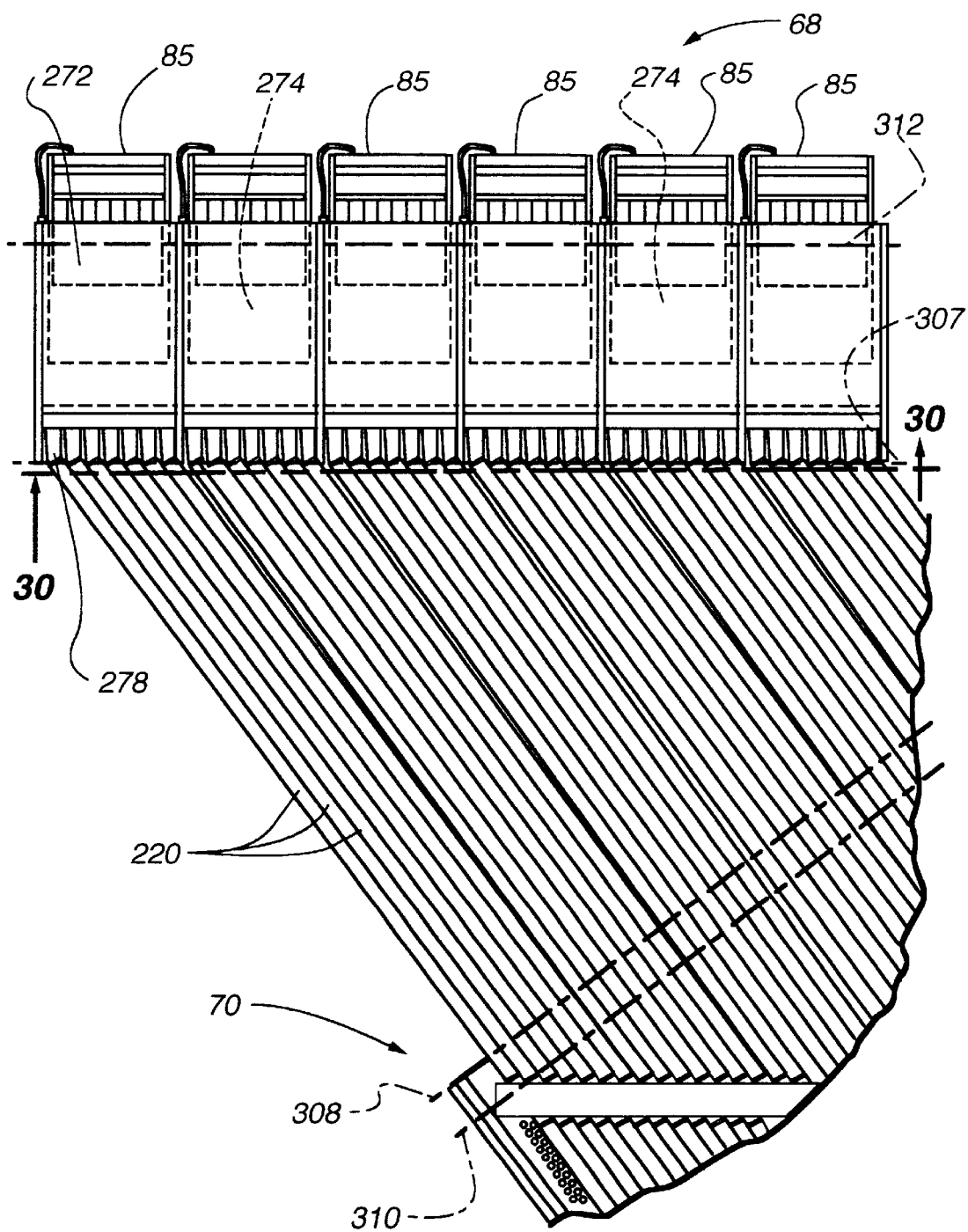
FIG. 29 is a fragmentary top plan view looking down on the vane/strip handling station of the apparatus of FIG. 1A.
Figure 30:
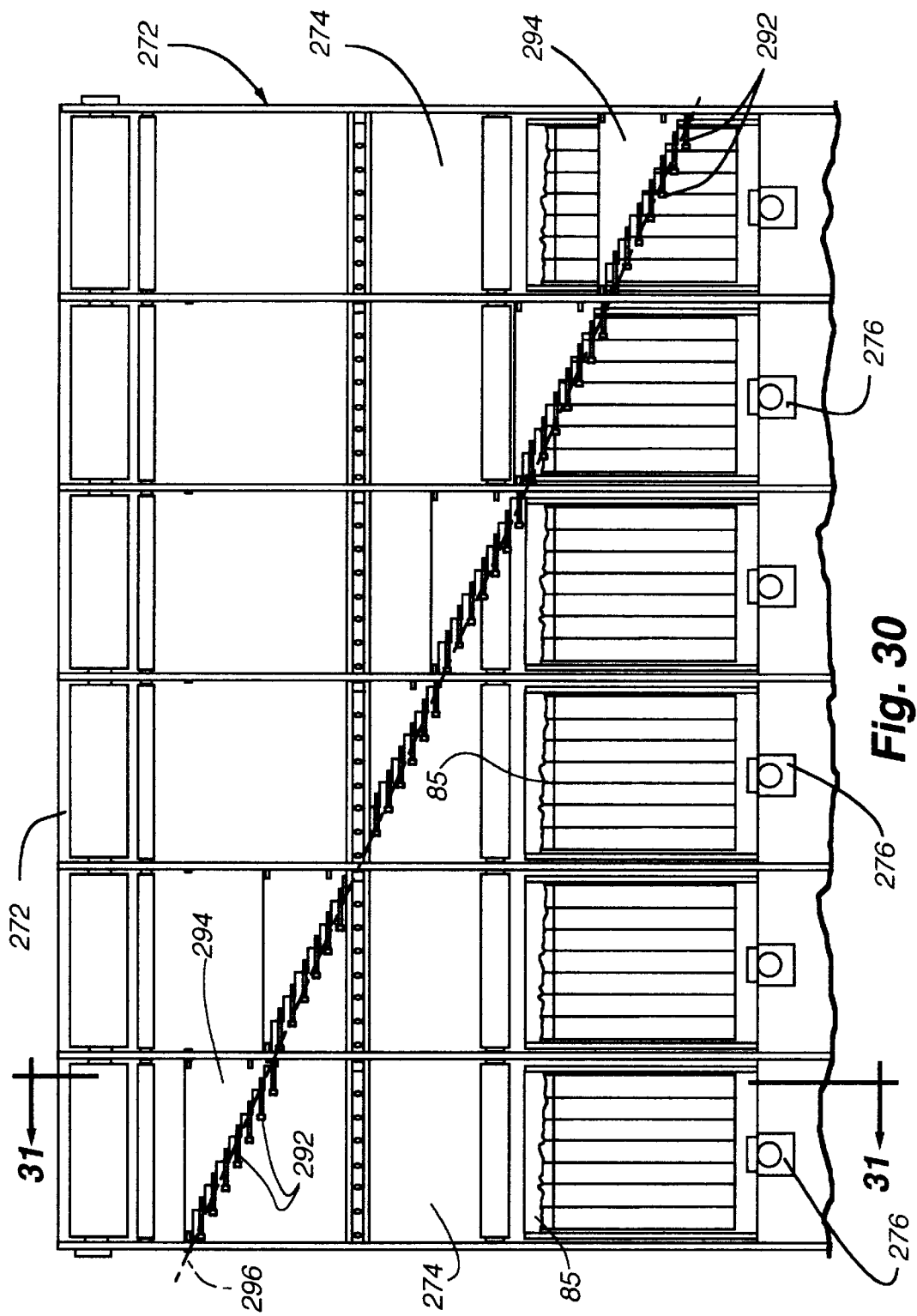
FIG. 30 is an enlarged vertical section taken along line 30—30 of FIG. 29.

As can also be appreciated by reference to FIGS. 1 and 29, the vertical frame 272 is adapted to receive and have connected to its upstream side a plurality of the transfer carts 85, with six of the carts being shown for illustrative purposes. Also for illustrative purposes, each cart is shown in FIG. 29 as having a web 72 of material that has been cut into seven side-by-side strips 220. Accordingly, the vane/strip handling station 68 in the illustrated embodiment is adapted to handle forty-two side-by-side strips 220 or any smaller number in increments of seven depending upon the height of the architectural covering product 61 that is being fabricated, as will be explained in more detail later.

Figure 31:
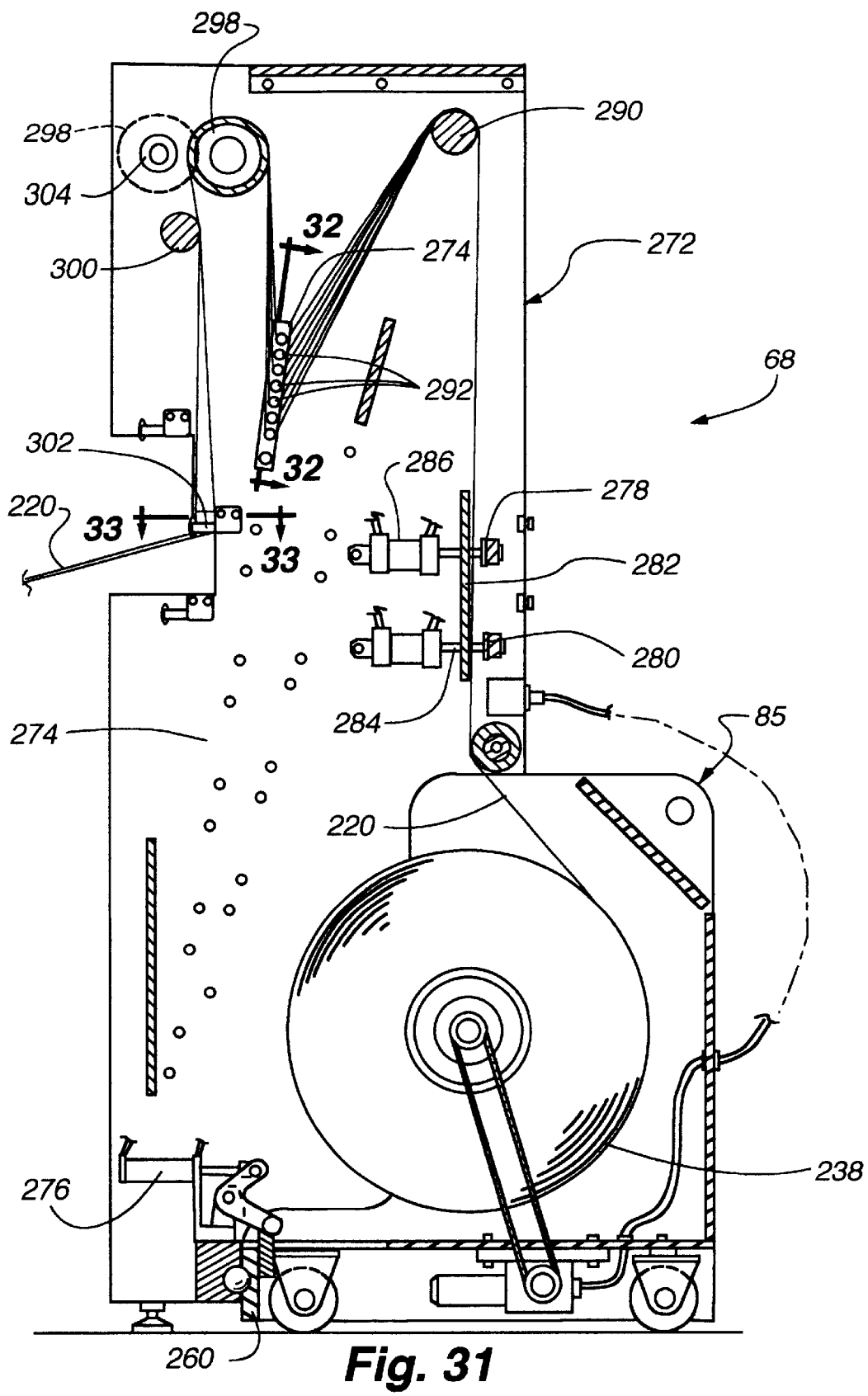
FIG. 31 is an enlarged section taken along line 31—31 of FIG. 30.

With particular reference to FIG. 31, the vertical frame 272 can be seen to include a cutout docking location 274 for each of the transfer carts 85 on its upstream side and with the vertical framework having along the bottom edge thereof a releasable clamp mechanism 276 associated with each cart that is identical to the clamp mechanism 268 described previously in connection with the vane/strip preparation station 66. In this manner, each of the transfer carts can be positioned in the docking location in the upstream side of the vertical frame and precisely positioned relative to the vertical frame with the clamp mechanism.

As will be appreciated with the description that follows, the vane/strip handling station 68 has a set of component parts for handling the individual strip material 220 on each of the six carts so that there are six sets of components being identical and interrelated in a manner to be described hereafter. To simplify the description, however, only the component parts associated with one of the carts 85 and thus the seven strips of material 220 carried thereby will be described.

Figure 36:
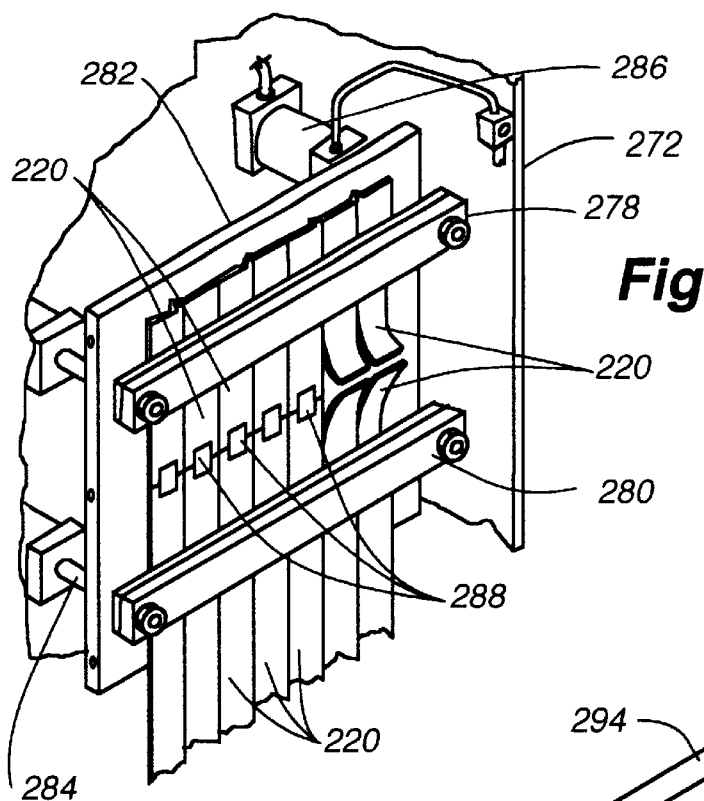
FIG. 36 is a fragmentary isometric view of a portion of the upstream side of the vane/strip handling station where strips of material are initially fed to the station and spliced with strips that have been previously processed in the vane/strip handling station.
Figure 34:
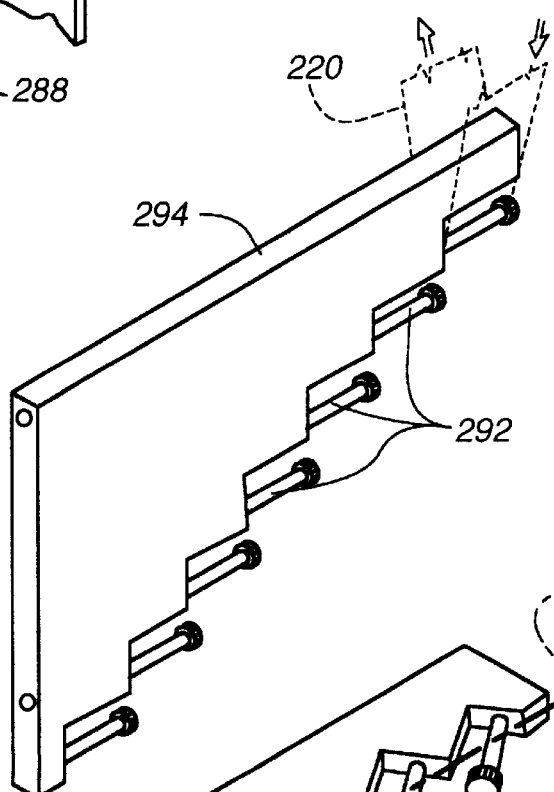
FIG. 34 is an isometric view of a first mounting plate for strip guide members used in the vane/strip handling station.

Looking at FIGS. 31 and 36, it will be appreciated that immediately above each cart 85 on the upstream side of the vertical frame 272 are upper and lower spaced horizontal strip confining bars 278 and 280 respectively which are mounted on a vertical guide plate 282 secured to the vertical frame with each of the strip confining bars being supported in spaced relationship from the guide plate. The confining bars are mounted on the ends of the piston rods 284 of a pair of associated power cylinders 286. The power cylinders are adapted to move the strip confining bars between extended and retracted positions. In the retracted position, the confining bars pinch the strips 220 against the guide plate 282 for splicing purposes to be explained hereafter. In the extended position, there is adequate space between the confining bars and the guide plate for the strips of material to slide freely.

FIG. 36 illustrates how an operator can splice the tail end of strips 220 from one transfer cart 85 that has just been depleted to the leading end of strips 220 on a new transfer cart 85 having a new supply of strip material. The tail ends of the strips from the prior cart are left suspended beneath the upper confining bar 278 while the lead end of the strips on the new transfer cart are fed upwardly between the lower confining bar 280 and the guide plate 282 so as to be in alignment and contiguous with the tail ends of the prior associated strips. The cylinders 286 are then retracted to pinch the strips against the guide plate to hold them in position. Strips of adhesive tape 288 or the like can then be applied to bridge the juncture between the tail ends of one set of strips 220 and the lead ends of the subsequent set of strips 220 so as to provide a continuous set of strips off the transfer carts.

Figure 32:
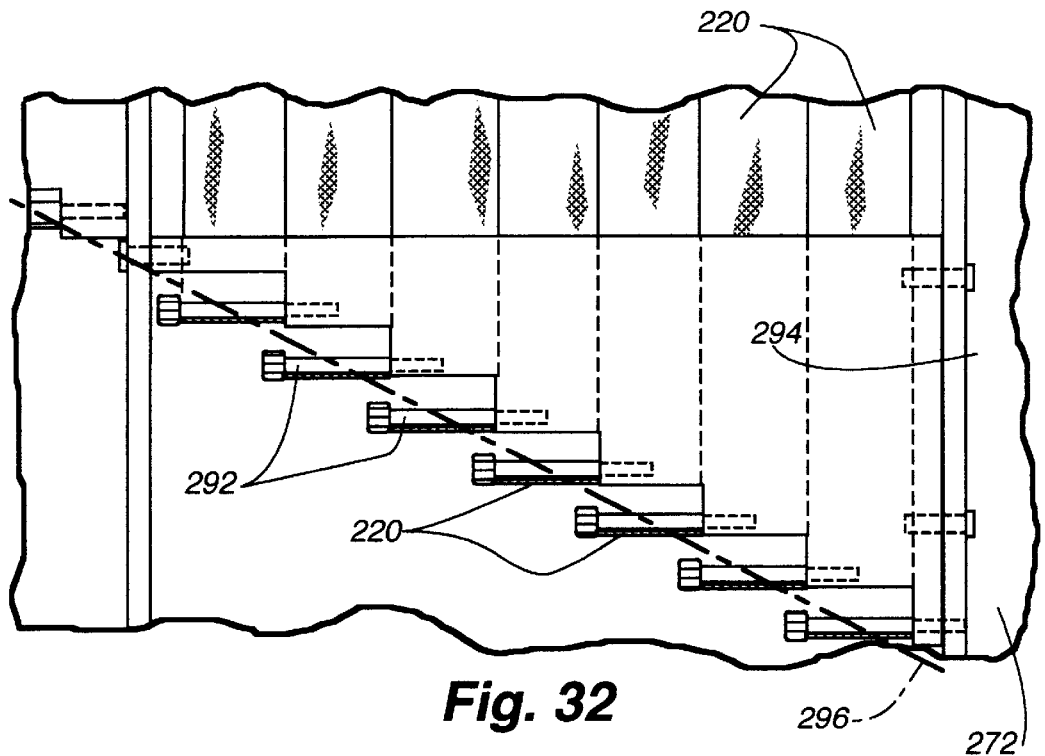
FIG. 32 is an enlarged fragmentary section taken along line 32—32 of FIG. 31.
Figure 33:
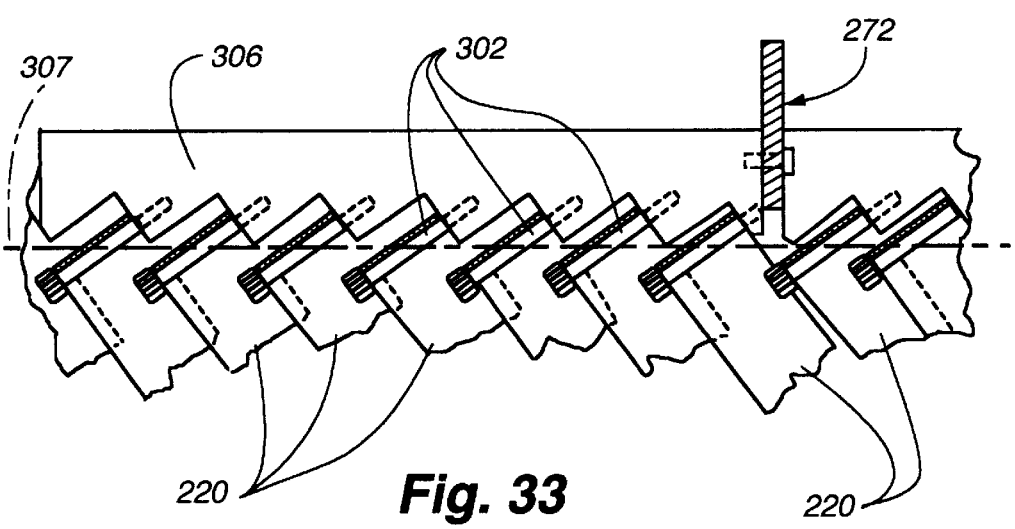
FIG. 33 is an enlarged fragmentary section taken along line 33—33 of FIG. 31.
Figure 36A:
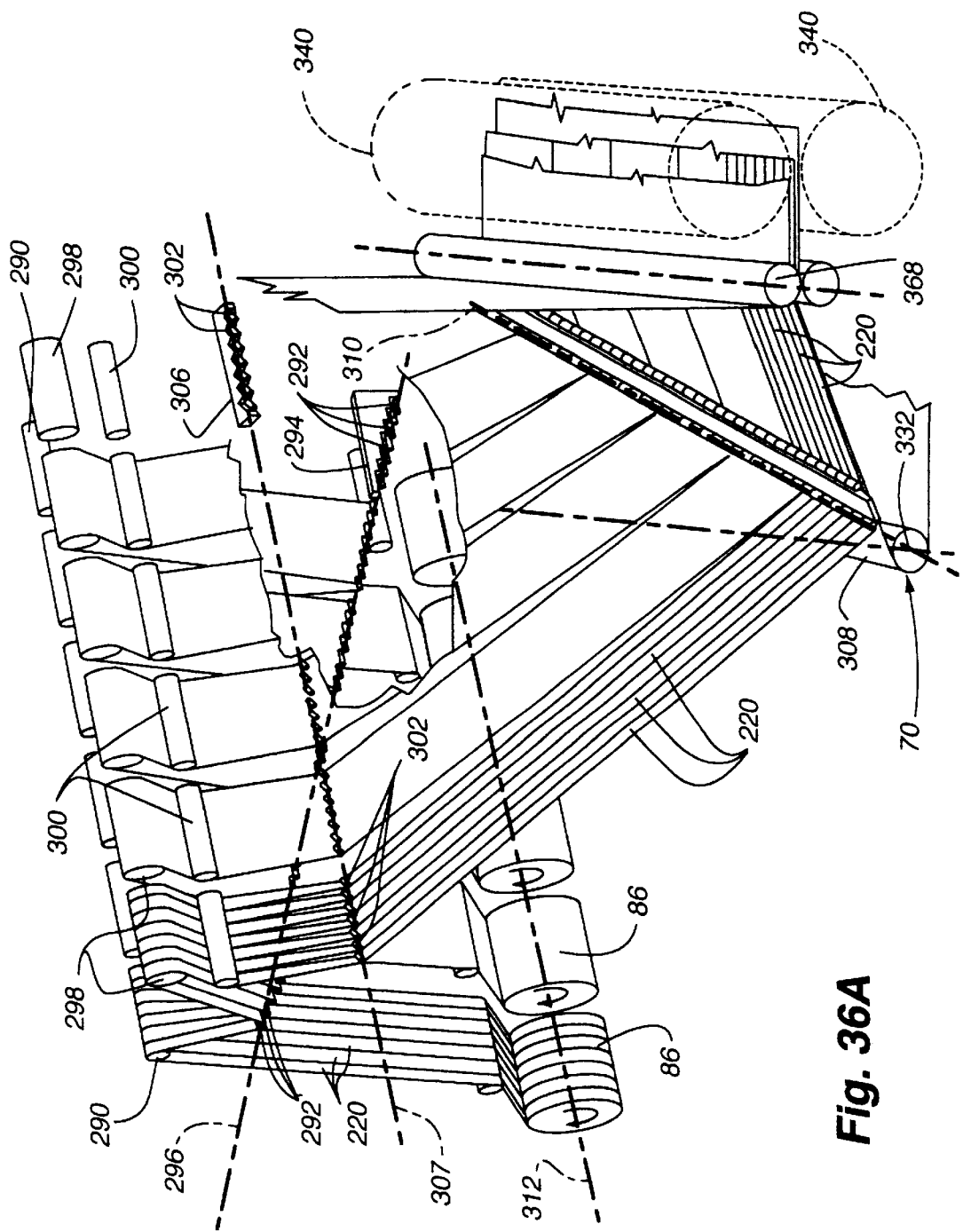
FIG. 36A is a fragmentary diagrammatic isometric view of portions of the vane/strip handling station illustrating the path of travel of strips of material through the station.
Figure 37:
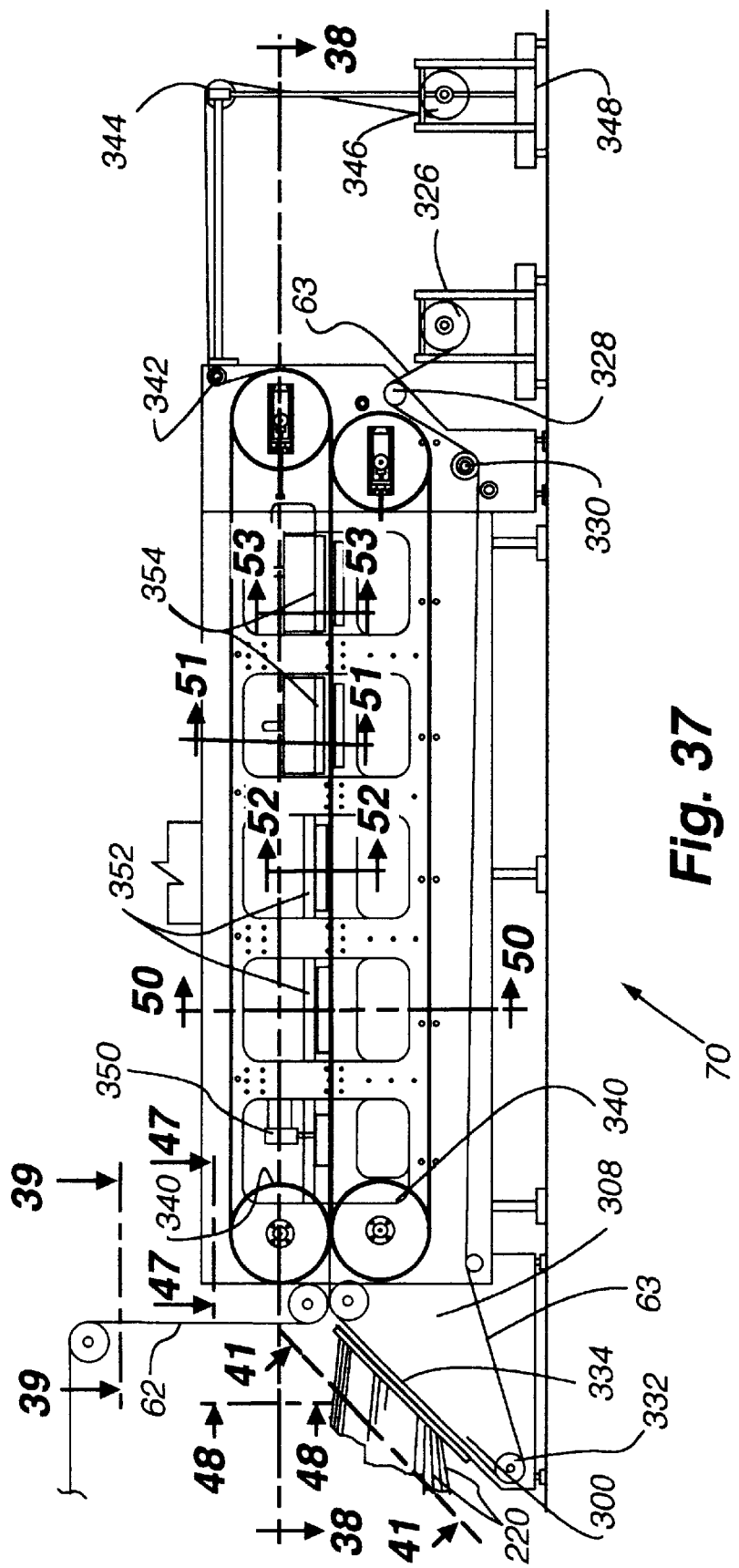
FIG. 37 is a diagrammatic side elevation of the main section of the laminating station of the apparatus of FIG. 1A.
Figure 38:
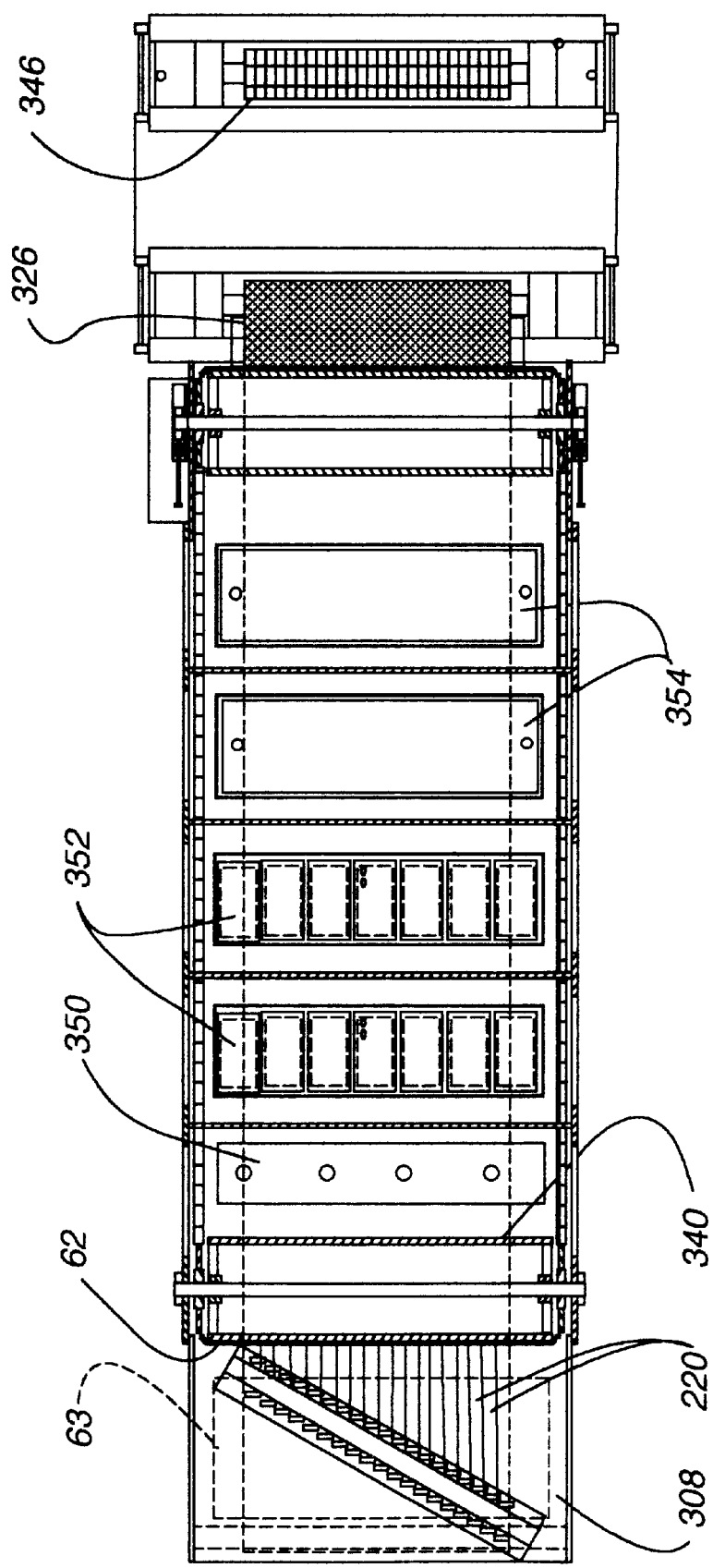
FIG. 38 is a horizontal section taken along line 38—38 of FIG. 37.

As best seen in FIGS. 31 and 36A, the strip material 220 is fed upwardly from the strip confining bars 278 and 280 over a tensioning roller 290 associated with each transfer cart 85 and subsequently the strips are passed downwardly in a downstream direction where they pass beneath a first set of strip guide or handling members 292. The strip guide members 292 can be seen in FIGS. 31, 32 and 36A to be cylindrical rollers having a length dimension sufficient to accommodate the width of a strip 220 of material. The strip guide members of the first set are mounted on a somewhat triangularly shaped plate 294 that is secured in the vertical framework 272 so that the strip guide members individually extend in a horizontal direction but are disposed relative to each other along a line 296 that forms an acute angle with horizontal. There are a plurality of the triangular plates 294 mounted on the vertical framework, one associated with each transfer cart, and they are each offset slightly vertically relative to each other so that the first set of strip guide members are disposed along the line 296 across the width of the vertical frame with the strip handling member 292 that is furthest left on the vertical frame, as viewed in FIG. 36A, being at the highest elevation, and the strip handling member 292 that is furthest right being at the lowest elevation. The angle that the line 296 forms with horizontal is equal to the angle of the vertical frame relative to the longitudinal direction or axis of the laminating station 70 for a purpose to be described later.

After the strips 220 pass beneath the first set of strip guide members 292, they pass upwardly again over a second tensioning roller 298 that can be a driven roller but is not necessarily driven. After passing over the second roller 298, the strips extend downwardly around an idler roller 300 and then further to a second set of strip guide or handling members 302. As probably best seen in FIGS. 29 and 31, the second tensioning rollers 298 associated with each cart are adjacent to each other but alternately offset upstream and downstream from each other but only for the purpose of providing space for their mounting bearings 304.

Figure 35:
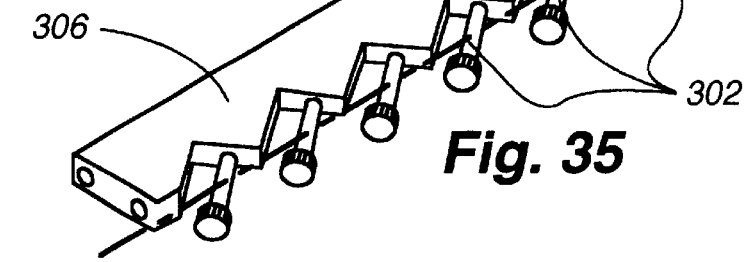
FIG. 35 is an isometric view of a second mounting plate for strip guide members used in the vane/strip handling station.

The second set of strip guide members 302 are probably best seen in FIGS. 35 and 36A. Each strip guide member in the second set is structurally identical to the strip guide member 292 in the first set, i.e., a cylindrical roller having a length adequate to accommodate the width of a strip 220 of material, and the guide members 302 are mounted on a generally rectangular block 306 that is in turn mounted on the vertical frame 272. The strip guide members in the second set are individually mounted with their longitudinal axes perpendicular to the longitudinal axis of the laminating station 70 and in a slightly overlapped relationship relative to the longitudinal axis of the laminating station. As a group, however, they are mounted in a horizontal line 307 across the width of the vertical frame. It will, therefore, be appreciated that each strip is twisted slightly along its length as it passes around an associated strip guide member 302 in the second set, as probably seen best in FIG. 36A.

Since the longitudinal axes of the strip guide members 302 in the second set are perpendicular to the longitudinal axis of the laminating station 70, the strips 220 of material emanating from the second set of strip guide members are aligned with the longitudinal axis of the laminating station. The strips are also caused to partially overlap an adjacent strip after the direction of travel is changed by the second set of strip guide members and, therefore, the strips 220 are delivered to the upstream end of the main portion 308 of the laminating station 70 in longitudinally overlapped relationship and in alignment with the longitudinal axis of the laminating station.

The upstream end of the main portion 308 of the laminating station 70, which is perpendicular to the longitudinal axis of the laminating station, defines a first reference line 310 and the upstream end of the vertical frame 272 of the vane/strip handling station 68 along which the transfer carts 85 are aligned, defines a second reference line 312 that if it were in a horizontal plane with the first reference line 310 would form an acute angle therewith. The first set of strip guide members are disposed along a third reference line 296 that if it were in a vertical plane with the second reference line 312 would form an acute angle equal to the angle defined between the first and second reference lines. The second set of strip handling members are disposed along a fourth reference line 307 which is parallel to the second reference line 312.

With the above relationship of the vertical frame 272 to the first reference line, it will be seen that strips 220 leaving a cart 85 on the left side of the upstream end of the vane/strip handling station 68, as viewed in FIG. 36A, have to travel a greater horizontal distance to the first reference line 310 on the laminating station than strips on the right side of the vane/strip handling station. For reasons which will be discussed hereafter, it is important that corresponding or laterally aligned hypothetical reference points on the strips leaving the transfer carts arrive at the first reference line 310 of the laminating station at the same time, and in order to make up for the different horizontal distance that the laterally adjacent strips have to travel from their associated transfer cart to the first reference line, the first set of strip guide members 292, as mentioned previously, are disposed along the line 296 at an acute angle to horizontal which compensates for the horizontal differences in distance that the laterally adjacent strips have to travel. In this manner, it will be appreciated that while a strip on the left side of the vertical frame has a greater horizontal distance to travel than a strip on the right side, the strips on the right side have a greater vertical distance of travel than those on the left side and the differences offset each other so that corresponding or laterally aligned hypothetical reference points on the strips of material as they leave the transfer carts arrive at the first reference line 310 at the same time.

It is important that the aligned reference points leaving a transfer cart are aligned when arriving at the first reference line so that in the event a web 72 of material on a transfer cart from which a plurality of strips 220 have been cut has a horizontal or transverse blemish, this blemish will arrive at the first reference line still in lateral or transverse alignment so that if it needs to be cut from the final window covering product to be formed from the strip material, only a small segment of the product needs to be removed. If the reference points on the strip material leaving a transfer cart did not arrive at the receiving location in synchronism or transverse alignment, it will be appreciated that the blemish in the strip material would be spread longitudinally of adjacent strips 220 thereby requiring a significant length of the product formed in the laminating station to be removed to remove a very small blemish that existed on the web 72.

Laminating Station

The laminating station 70 includes the main portion or section 308 in addition to an inverted U-shaped frame 314 for the feed supply of the first sheet 62 of material that is to be laminated to the strips 220. The feed for the second sheet 63 of material forms a part of the main section 308 of the laminating station near the downstream end of the station. With particular reference to FIG. 1A, the feed supply for the first sheet 62 of material can be seen positioned upstream from the vane/strip handling station 68. As mentioned previously, the feed for the first sheet material 62 is in the form of the inverted U-shaped frame 314 that extends over the vane/strip handling station and has a cradle 316 at its upstream end adapted to rotatably receive and support a roll of the first sheet material which, as mentioned previously, is preferably a sheer fabric. The first sheer fabric sheet material extends upwardly from the supply roll and across an idler roller 318 at the top of the frame 314 and subsequently passes downwardly around a dancer roller 320 before again extending upwardly across a second idler roller 322. The dancer roller places a desired tension in the sheet material. The first sheet material then extends horizontally across the vane/strip handling station 68 and passes downwardly across a third idler roller 324 at the downstream end of the frame and from the idler roller 324 is delivered to the upstream end of the main section 308 of the laminating station in a manner to be described hereafter.

The supply roll for the second sheet of material 63, as best seen in FIG. 1B, is also rotatably supported on a cradle 326 but near the downstream end of the main section 308 of the laminating station and the second sheet material, which, again, is preferably a sheer fabric material, extends upwardly around an idler roller 328 and then subsequently downwardly around a lower idler roller 330 before extending horizontally upstream. At the upstream end of the main section 308 of the laminating station 70, the second sheet of material passes around a third idler roller 332 before being delivered upwardly for lamination to the strips 220 and the first sheet material 62 in a manner to be described hereafter.

The main section 308 of the laminating station 70 receives the three components of the laminate covering product 61, namely the first and second sheets of material 62 and 63 respectively, and the strips of material 220 which are disposed therebetween, and bonds the three components into the tri-layer laminate product from which the covering for an architectural opening can be made. As will be appreciated from the above description of the vane/strip preparation station 66, the strip material 220 passing through the vane/strip handling station 68 has lines or beads of adhesive 210 and 216 thereon which are inert until they are heat activated and the laminating station 70 serves to activate the adhesive to bond the strips in a desired manner to the first and second sheets 62 and 63 of material and to subsequently cool the adhesive to thereby cure the adhesive to form the laminate product.

FIG. 1B diagrammatically illustrates the cooperation between the vane/strip handling station 68 and the laminating station 70. As mentioned previously, the first sheet 62 of fabric material is fed from its supply roll across the top of the vane/strip handling station 68 to the upstream end of the main section 308 of the laminating station. At that location it is fed across an idler roller 324 that is positioned above the strip material 220 and the second sheet of material 63. The second sheet of material, as mentioned above, has been fed upstream beneath the main section of the lamination station and is passed upwardly around the idler roller 332. Subsequently, the second sheet material is passed downstream across an inclined vacuum table 334 so as to underlie the strips of material 220 also fed to the vacuum table. The second sheet of material with the strips 220 laid on top thereof is then fed beneath the first sheet of material 62 so that the three component parts are then desirably layered at the aforenoted first reference line 310 or receiving location for further processing.

An upper and lower transfer belt 336 and 338 respectively are supported on driven rollers 340 within the main section 308 of the laminating station 70 with the upper drive belt 336 moving counterclockwise and the lower drive belt 338 moving clockwise as viewed in FIG. 1B. The lower horizontal run 336L of the upper drive belt and the upper horizontal run 338U of the lower drive belt are in confronting engagement so as to frictionally grip and allow the three layer laminate of material to be positioned therebetween and carried through the main section of the laminating station. As the completed laminated product 61 emerges from the downstream end of the transfer belts, it is passed upwardly around a first idler roller 342 and then horizontally to the downstream end of the laminating station where it passes around a second idler roller 344 and from there downwardly to a driven take-up roller 346 that is mounted in a cradle 348. The cradle for the driven take-up roller is on rollers so as to be easily removed from the laminating station and replaced with an empty take-up roller on a similar cradle.

As the laminate is being transferred through the main section of the laminating station, it first passes beneath a press 350 to positively position the three components of the laminate between the transfer belts 336 and 338 and then through a pair of side-by-side identical heating sections 352 which activate or melt the lines of adhesive 210 and 216 on the strip material 220 to adhesively bond the strips of material to the sheets of material 62 and 63 on opposite sides thereof. After passing through the heating sections 352, the laminate product is passed through a pair of side-by-side identical cooling sections 354 where the adhesive is cured. It is important to appreciate that due to the face-to-face engagement of the two transfer belts, the laminate is held in place during the heating and cooling processes so that the laminate product is uniform and dependably fabricated.

Figures 39, 40:
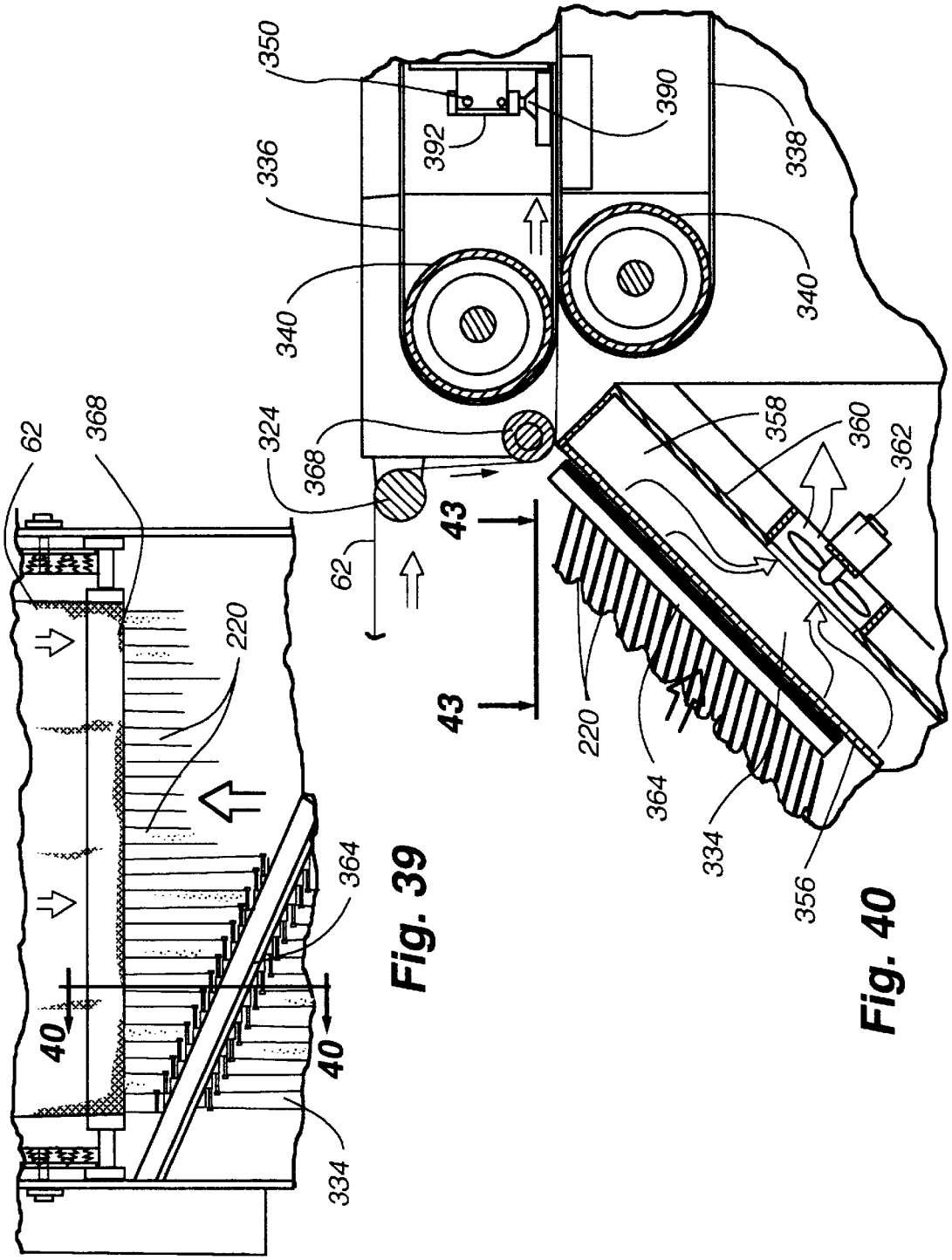
FIG. 39 is an enlarged fragmentary section taken along line 39—39 of FIG. 37.
FIG. 40 is an enlarged fragmentary section taken along line 40—40 of FIG. 39.
Figure 41:
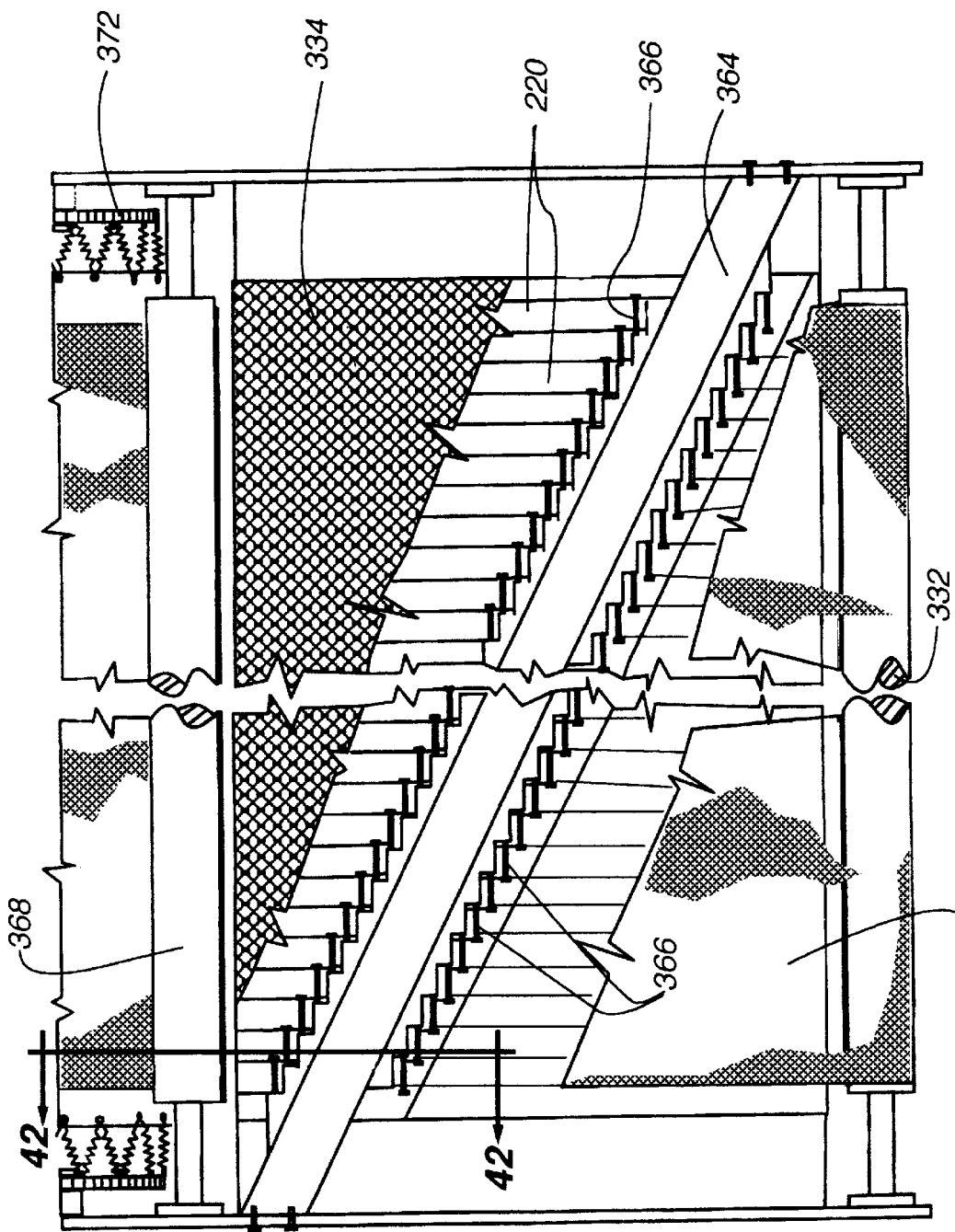
FIG. 41 is an enlarged fragmentary section taken along line 41—41 of FIG. 37.
Figure 42:
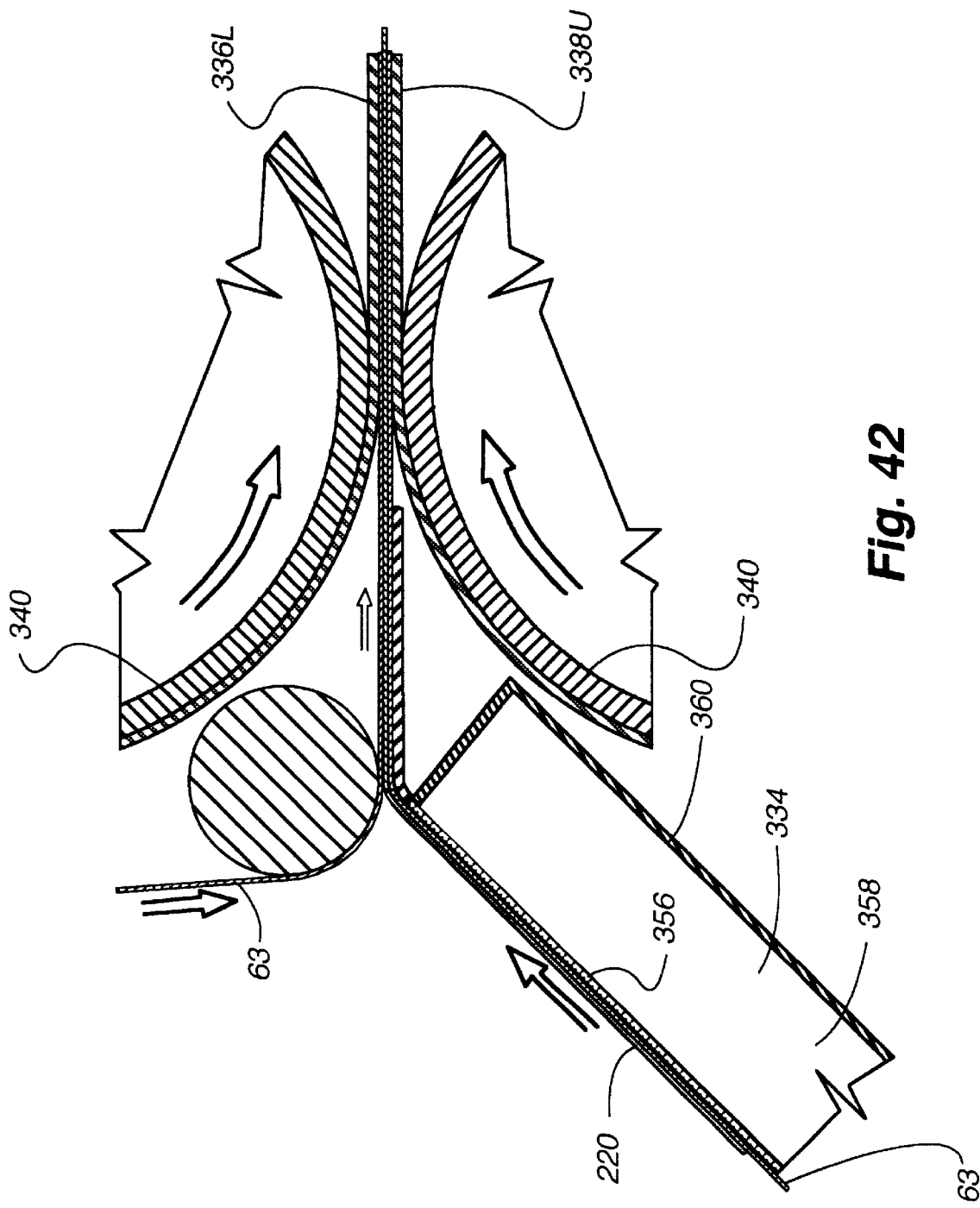
FIG. 42 is a section taken along line 42—42 of FIG. 41.
Figure 43:
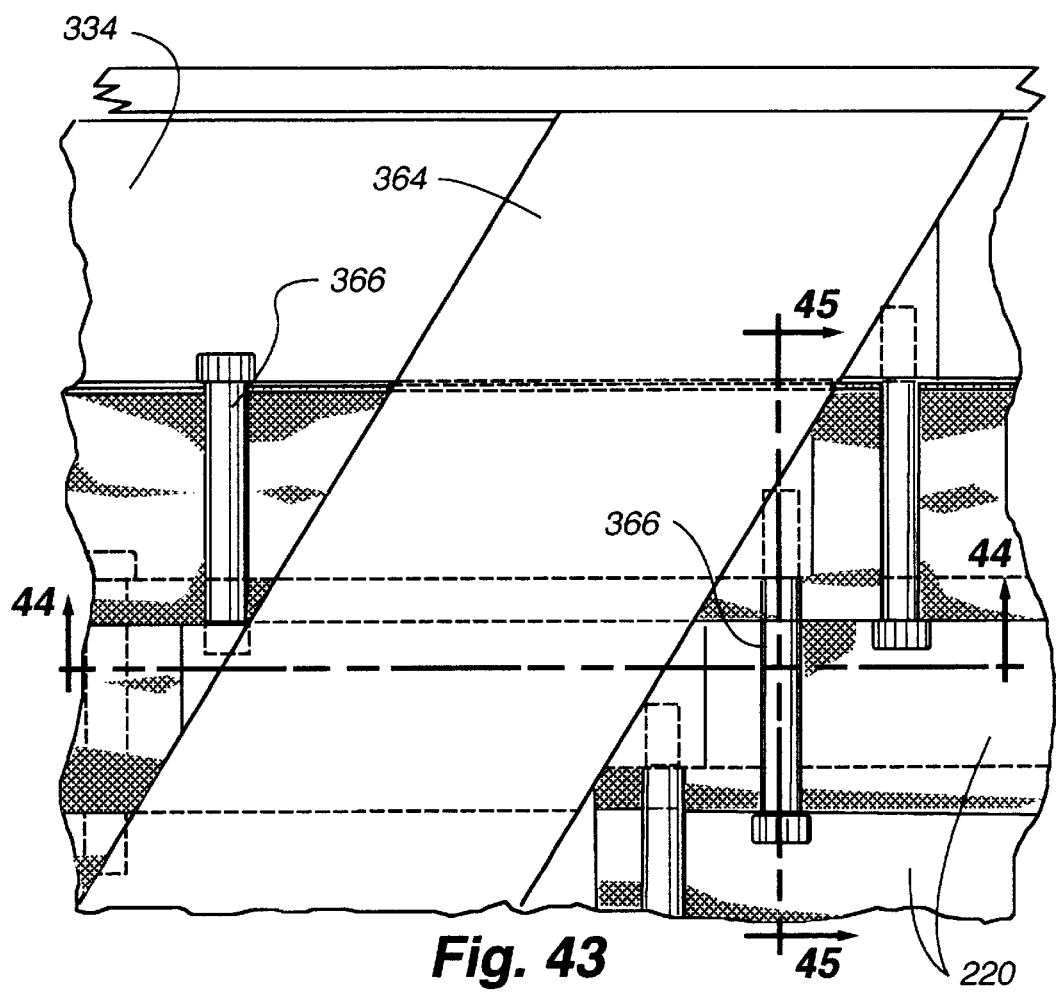
FIG. 43 is an enlarged fragmentary view taken along line 43—43 of FIG. 40.
Figure 44:
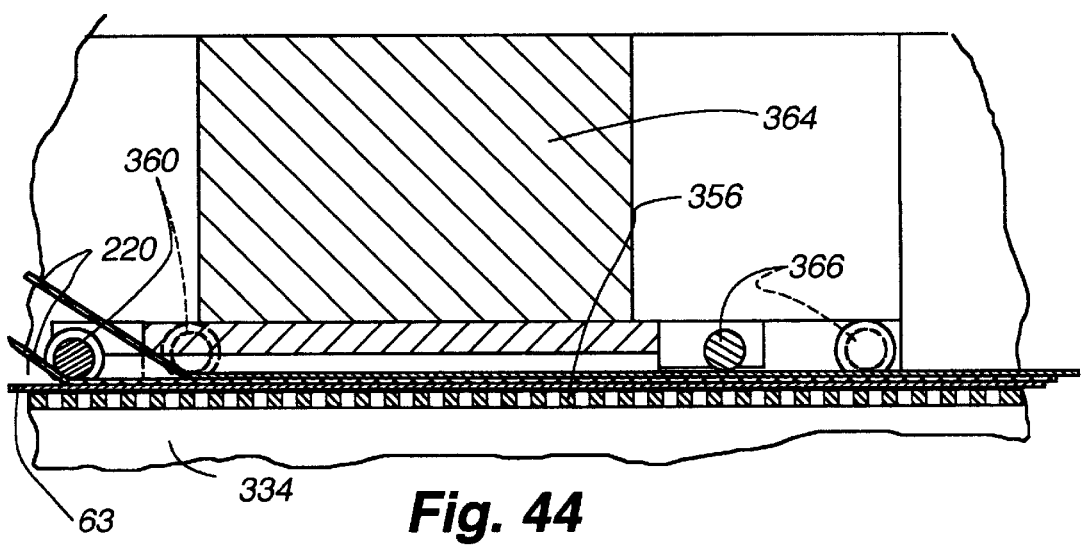
FIG. 44 is an enlarged fragmentary section taken along line 44—44 of FIG. 43.
Figure 45:
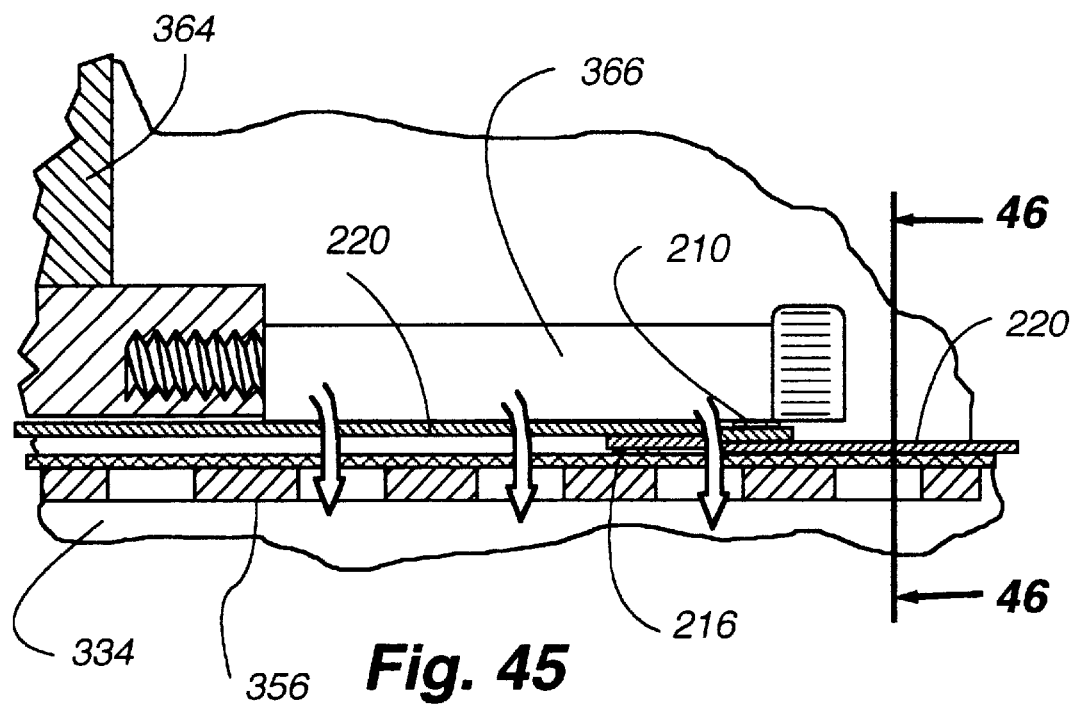
FIG. 45 is a section taken along line 45—45 of FIG. 43.
Figure 46:
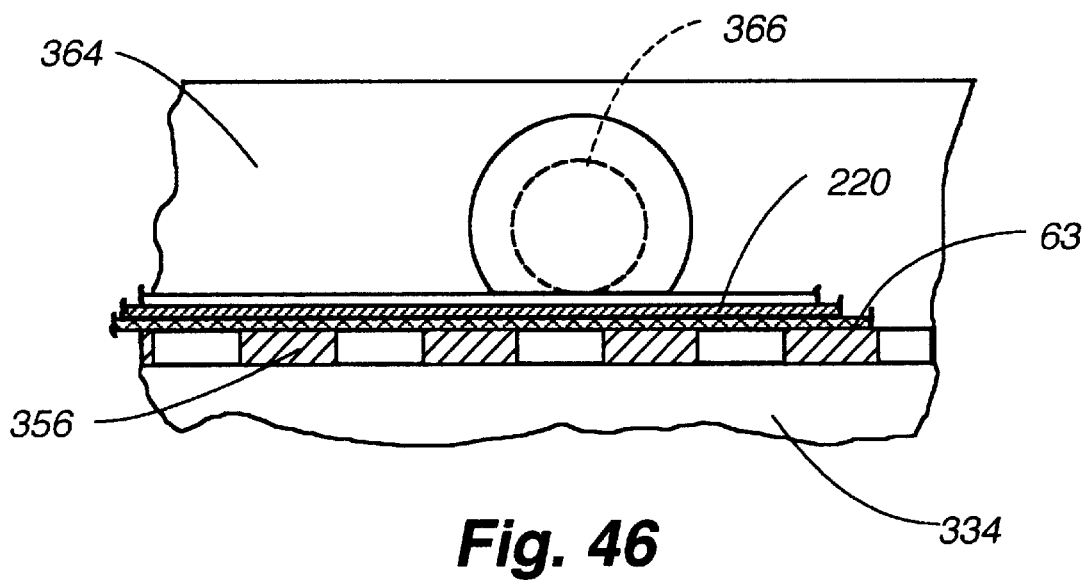
FIG. 46 is an enlarged fragmentary section taken along line 46—46 of FIG. 45.
Figure 49:
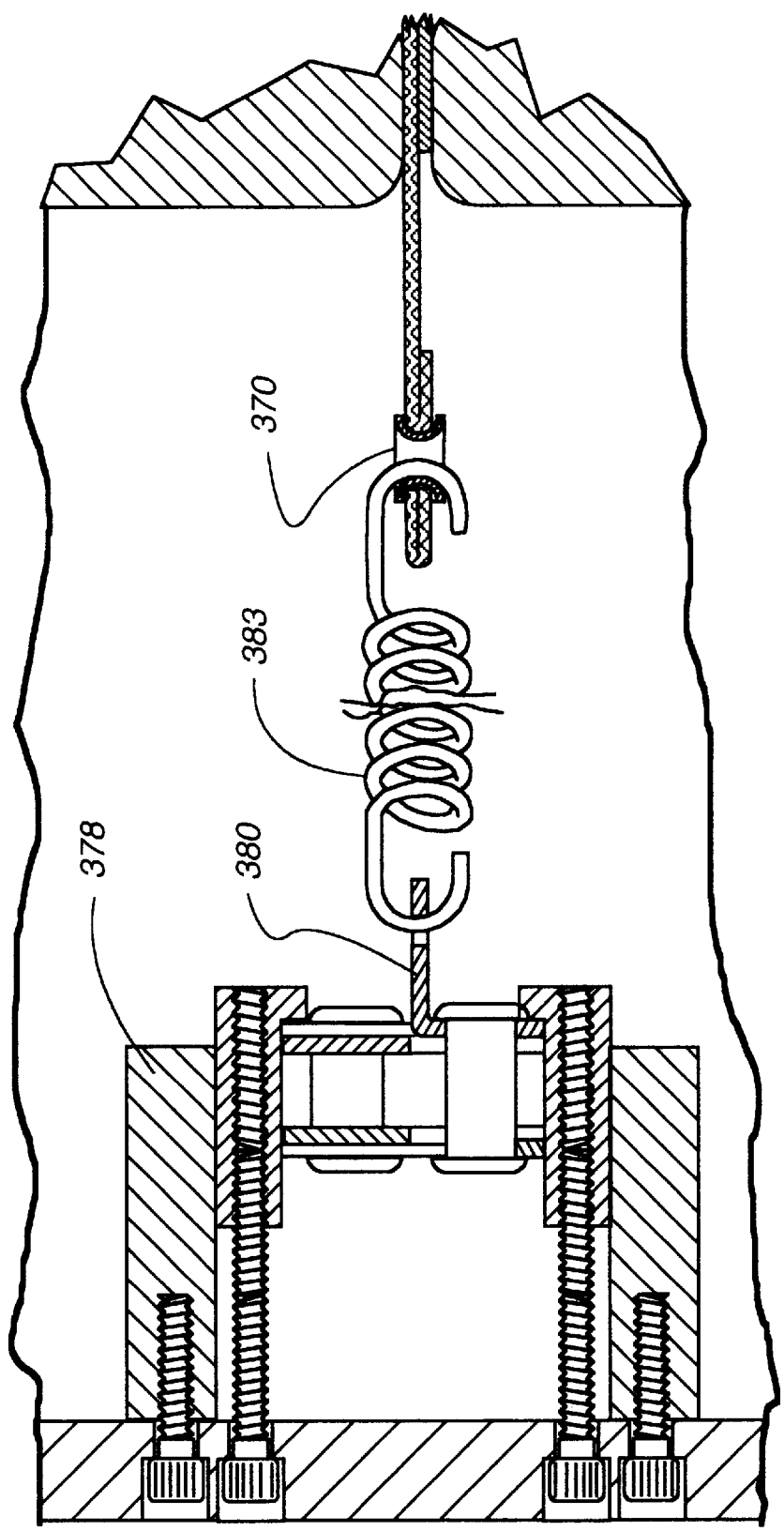
FIG. 49 is an enlarged section taken along line 49—49 of FIG. 47.
Figure 50:
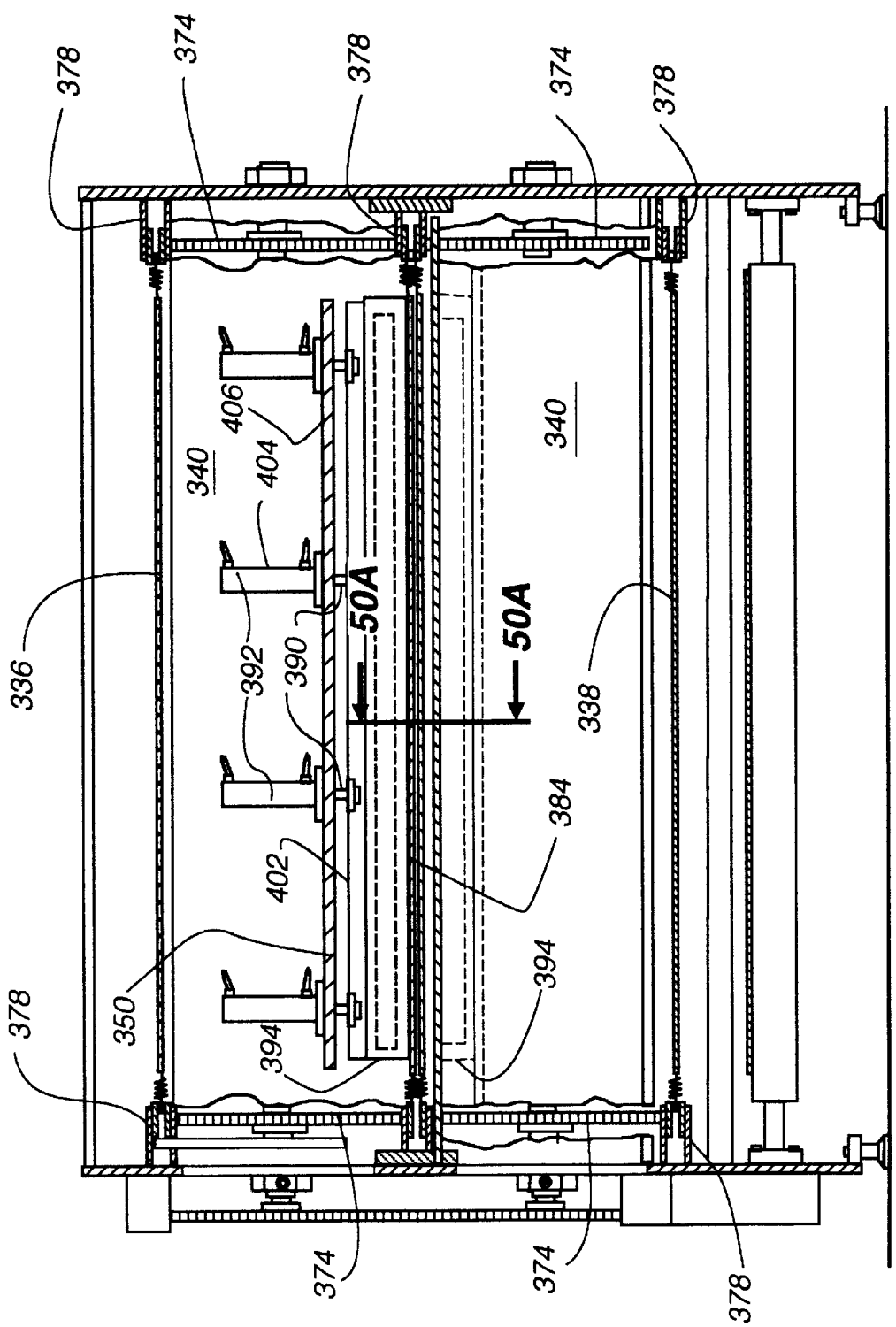
FIG. 50 is a fragmentary vertical section taken along line 50—50 of FIG. 37.
Figure 53:
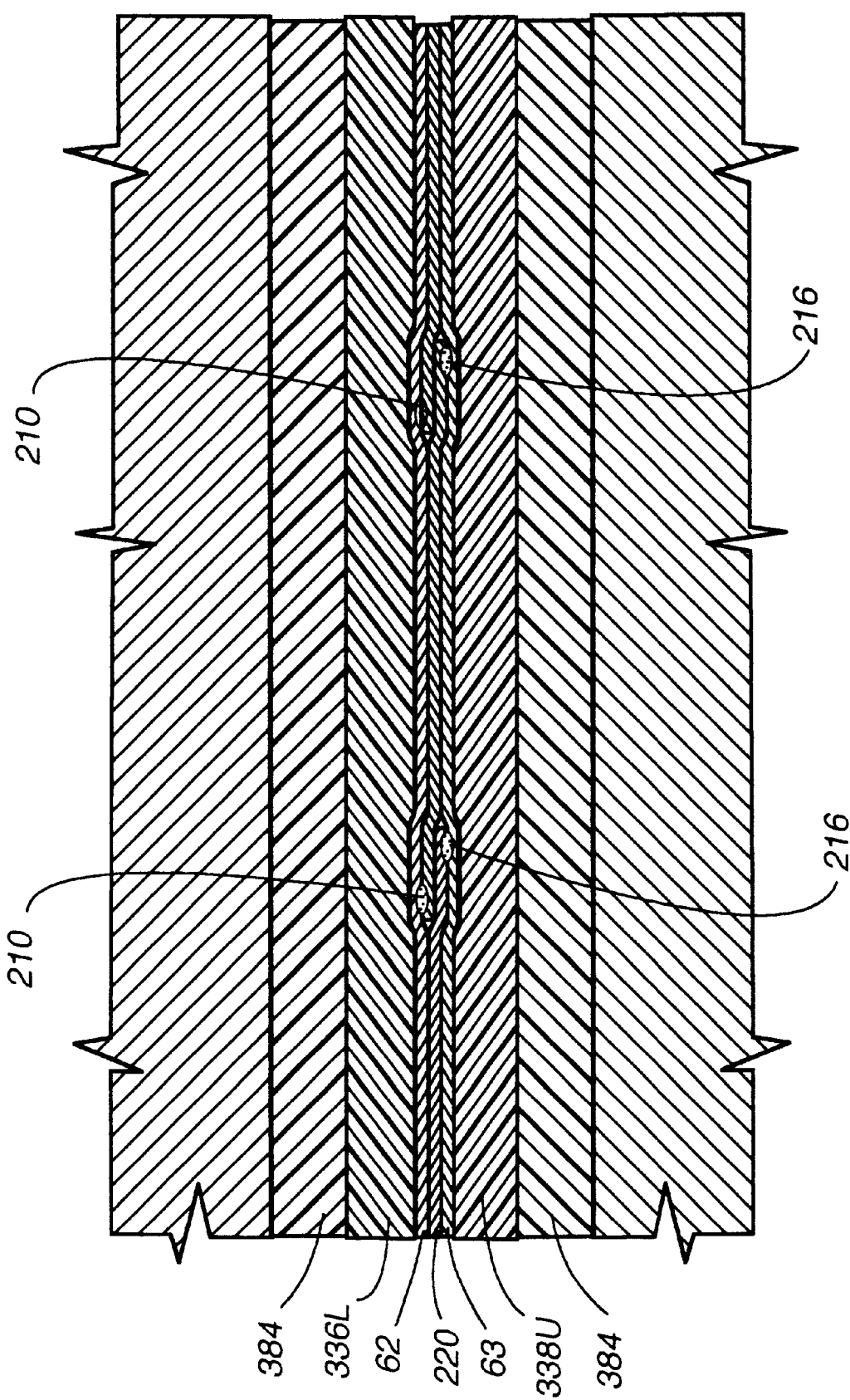
FIG. 53 is an enlarged diagrammatic transverse section taken through part of a heating section showing the tri-layer laminate positioned between the transfer belts.
Figure 54:
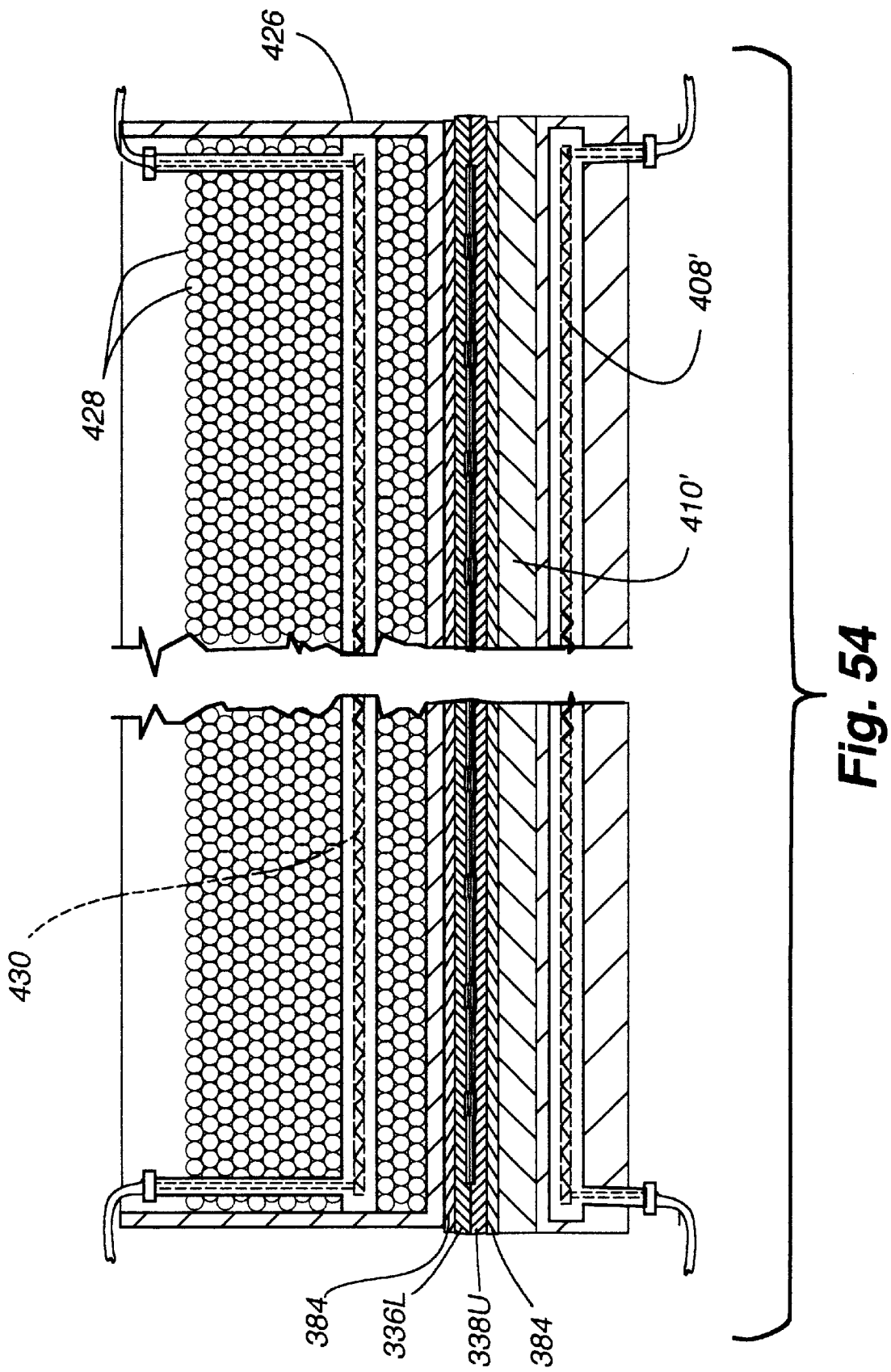
FIG. 54 is a transverse section with parts removed through an alternative heating section.

Looking more particularly at the main section 308 of the laminating station 70, the vacuum table 334 at the upstream end of the main section, as probably best seen in FIGS. 39 and 40, is inclined upwardly and downstream and comprises a rectangular box having a perforated upper plate 356 and closed side walls 358 and a bottom wall 360. A fan 362 is mounted in the bottom wall so as to draw air through the perforated plate 356 and exhaust the air beneath the vacuum table. A vane/strip control bar 364 extends diagonally across the vacuum table, as been seen in FIG. 39, with the control bar having a plurality of strip guide members 366 in the form of rollers identical to those found in the vane/strip handling station 68, on both sides thereof, so that strips of material 220 emanating from the vane/strip handling station are fed beneath the control bar 364 and guided by the strip guide members 366 to be positioned in slightly spaced and superimposed relationship relative to the top surface of the vacuum table. The control bar 364 is spaced slightly above the top surface of the vacuum table to provide a space through which the strip material can pass.

The second sheet material 63, as described previously, passes upstream beneath the main section 308 of the laminating station then passes around the idler roller 332 and upwardly across the top surface of the vacuum table. The strips 220 of material are, therefore, fed onto the top of the second sheet material along the path of movement of the second material so that the second sheet of material and the strips are in superimposed, parallel alignment as they are assembled on the vacuum table. The vacuum table, of course, draws the second sheet material and the strips downwardly onto the top of the table to maintain the desired alignment. It should also be appreciated that since the second sheet of material is preferably a sheer fabric having some porosity, the vacuum is effective not only on the second sheet material but also on the strips of material that are overlaid thereon.

As best seen in FIG. 40, as the first sheet of material 62 passes over the idler roller 324 and downwardly toward the vacuum table 334, it is passed beneath an idler roller 368 positioned at the downstream end of the vacuum table so that the first sheet material is laid onto the top of the strips 220 of material at that location. The three component parts of the product 61 from which an architectural covering will be made are, therefore, assembled for the first time at this location which has been previously referenced as the first reference line 310 or receiving location. The tri-layer laminate is fed downstream between the transfer belts 336 and 338 which grip the laminate and advance it through the main section 308 of the laminating station. As will be appreciated from the earlier description of the vane/strip preparation station 66, the strips of material 220 are provided with two beads of adhesive with one bead 210 being on the top surface and the other bead 216 on the bottom surface of each strip and along opposite side edges of the strips. The beads are applied along marginal zones on each face of the strips that are adjacent to the side edges of the strips. Accordingly, one bead of adhesive 216 is faced downwardly toward the second sheet of material and the other bead of adhesive 210 is faced upwardly toward the first sheet of material as the laminate enters the main section of the laminating station.

The transfer belts 336 and 338 are identical and are preferably made of a fiberglass-Teflon composite with the glass fibers giving the belts desired strength and the Teflon providing a low friction surface so that the laminate product will not adhere to the belts as it is passing rough or leaving the main section of the laminating station. The belts could also be made of silicon rubber with a coating of the fiberglass-Teflon composite. The transfer belts have a plurality of longitudinally aligned grommets 370 along each side edge of the endless belts. There are also endless non-elastic drive chains 372 adjacent to each side of each belt which are supported and driven on sprockets 374 positioned at opposite ends of the main section 308 of the laminating station. The sprockets 374 at the downstream end of the main section are driven by a motor 376 at a predetermined speed.

As best seen in FIGS. 47 through 51, the drive belts are guided in tracks 378 that extend along the sides of the path of travel of the transfer belts with periodic links in the drive chain having connection tabs 380 protruding inwardly toward the associated transfer belt. Each tab has an opening therethrough adapted to receive and retain one end of a pair of resilient coil spring connectors 382 with the opposite ends of the coil springs being connected to adjacent grommets on the transfer belt. The coil springs are therefore disposed in a zig-zag pattern to provide a desired tension in the transfer belt and assure a straight path of travel for the transfer belt as it passes through its endless loop from one end of the main section of the laminating station to the other.

As mentioned previously, as the transfer belts move the tri-layer laminate through the main section of the laminating station, the product is exposed to heating and cooling sections to melt and subsequently cure the beads of adhesive 210 and 216. As will be explained hereafter, the heating and cooling elements are positioned within the interior of the transfer belts and to minimize friction or drag between the belts and the heating and cooling elements, slip sheets 384 of Teflon/fiberglass sheeting are positioned immediately above the lower run 336L of the upper transfer belt and immediately below the upper run 338U of the lower belt.

As the tri-layer laminate enters the main section of the laminating station, it first passes through the press 350 (FIG. 40) which is simply a lower back-up transverse plate 386 disposed beneath the upper run 338U of the lower transfer belt and an upper pressure plate 388 disposed above the lower run 336L of the upper transfer belt. The pressure plate is suspended on the lower ends of the plunger rods 390 of a plurality of vertically oriented hydraulic cylinders 392 positioned within the upper transfer belt 336. The hydraulic cylinders enable the pressure applied by the pressure plate 388 against the upper transfer belt 336 to be regulated. After passing through the press, the laminate is passed through the two heating sections 352 which extend transversely of the main section and are slightly spaced from each other longitudinally of the main section. Each heating section is identical having a heat system positioned within the loop of the upper transfer belt 336 and another heat system positioned within the loop of the lower transfer belt 338. The heat systems are positioned immediately adjacent to the slip sheets 384 so as to apply heat through the slip sheets and the belts to the laminate to activate the adhesive on the strips of material to thereby bond the strips of material to the sheets of material on opposite sides thereof.

The heater in the upper transfer belt 336 includes a stainless steel box 394 having an open bottom across which is disposed the upper slip sheet 384 of Teflon/fiberglass or other low friction material. This slip sheet engages the inner surface of the upper transfer belt 336 which, as will be recalled, also includes a Teflon material so that the transfer belt slides easily across the bottom of the upper heater. Within the interior of the stainless steel box, and immediately above the slip sheet is a flexible resistive-type heater 396 with encapsulated electrically resistive wires 398 connected with suitable wiring to an electrical power source (not shown). On top of the flexible heater 396 is a layer of insulation 400 which is preferably a flowable-type foam insulation which not only serves to confine the heat in a downward direction toward the transfer belts but also accommodates the slight degree of unevenness in the laminate product caused by the overlap of the strips 220 and the beads of adhesive on the strips. A rigid plate 402, which may be aluminum, is disposed in the stainless steel box above the insulating foam material 400 and is connected to a pressure cylinder system 404 that includes a plurality of pressure cylinders whose plungers extend through a mounting plate 406 and are connected to the rigid plate 402 so that predetermined pressure can be applied to the insulating material through the rigid plate whereby the slip sheet 384 is desirably pressed against the inside surface of the upper transfer belt.

The heating system in the lower transfer belt 338 includes a plurality of longitudinally extending, but side-by-side conductive heater bars 408 which are also connected to a suitable electrical supply (not shown) and which have bolted on their upper surface an aluminum plate 410 through which the heat is transferred. The heater bars are elongated and have their longitudinal dimension extending longitudinally of the laminating station 70. Each heater bar is connected to its own rheostat (not shown) so that through proper adjustment, uniform heat is applied across the width of the lower transfer belt. The slip sheet 384 of Teflon/fiberglass is positioned on top of the aluminum plate 410 to provide a low friction surface between the lower heating system and the underside of the transfer belt 338 disposed immediately thereabove. Beneath the bar heaters is an insulation layer of foam 412 or the like so as to confine the heat in an upward direction.

It will, therefore, be appreciated that a heating system is disposed above and below the laminate product in its confinement between the transfer belts, with the heat being adequate to activate the adhesive which was inert prior to the laminate being introduced to the heating sections of the laminating station. As mentioned previously, there are two heating sections disposed longitudinally of the laminating station so that the laminate being transferred through the laminating station passes successively through each heating station.

After passing beneath the second heating section, the transfer belts 336 and 338 move the tri-layer laminate product through the cooling section 354 of the laminating station 70, which similarly to the heating section has two cooling sections that extend transversely of the apparatus but are spaced slightly from each other longitudinally of the main section of the laminating station. Each cooling section is identical and has coolers positioned within the upper transfer belt and within the lower transfer belt.

The cooling system within the lower transfer belt includes an aluminum block 414 having a plurality of fluid channels 416 therethrough that are connected to an inlet supply 418 of cooling liquid which could be water or the like. The coolant emanating from the channels in the aluminum block is pumped with a pump (not shown) outside the lower transfer belt and upwardly for use in the cooling system within the upper transfer belt. The aluminum block is positioned immediately adjacent to the slip sheet 384 in the lower transfer belt.

The cooling fluid emanating from the lower cooling system is transferred upwardly to the upper cooling system within the upper transfer belt and this cooling system includes a stainless steel pan 420 having a neoprene or other waterproof lining. The bottom of the pan is immediately adjacent to the slip sheet 384 in the upper transfer belt 336. The liquid emanating from the lower cooling system is allowed to pass into the pan in the upper system and exit lines 422 are provided to remove liquid from the upper pan and transfer it to a remote discharge location or to a heat exchanger 424 to remove the heat from the liquid so that it might be reused in the system.

In this manner, the heat which was applied to the tri-layer laminate product is removed thereby curing the adhesive so that the strips 220 of material are positively and desirably secured to the sheets of material 62 and 63 on the opposite sides thereof.

In an alternative embodiment of a cooling system shown in FIG. 52, like parts have been given like reference numerals with a prime suffix and as will be appreciated, the cooling system in the lower transfer belt is identical to that previously described with the cooling system in the upper transfer belt being identical to the cooling system in the lower transfer belt. In other words, the upper and lower cooling systems include an aluminum block 414' having passages 416' therethrough for the movement of cooling liquids, with the cooling liquids being removed to a heat exchanger (not shown). The upper and lower systems can have their own heat exchangers or can be part of a common system.

An alternate heating system is shown in FIG. 55 with like parts having been given like reference numerals with a prime suffix. The bottom heater can be the same as that previously described with a plurality of heating bars 408' having an aluminum plate 410' thereabove. The upper heating element is a pan 426 fall of heat conductive stainless steel balls 428, such as gun shot, and a heating element 430 extending through the balls. The heating element, of course, heats the metal balls which transfer the heat downwardly into the transfer belt and since the balls are spherical in configuration they accommodate any unevenness that may be caused between the transfer belts by the laminate product.

As mentioned previously and as probably seen best in FIG. 1B, the laminate product leaving the main section 308 of the laminating station is passed upwardly around an idler roller 342 and subsequently horizontally downstream across a second idler roller 344 before being directed downwardly and around a take-up roller 346. Of course, the adhesive is totally cured by the time the laminate product emanates from the downstream end of the main section of the laminating station so that there is no problem with undesired adhesive bonding of layers of the product as it is wrapped on the take-up roll.

Figures 2, 3:
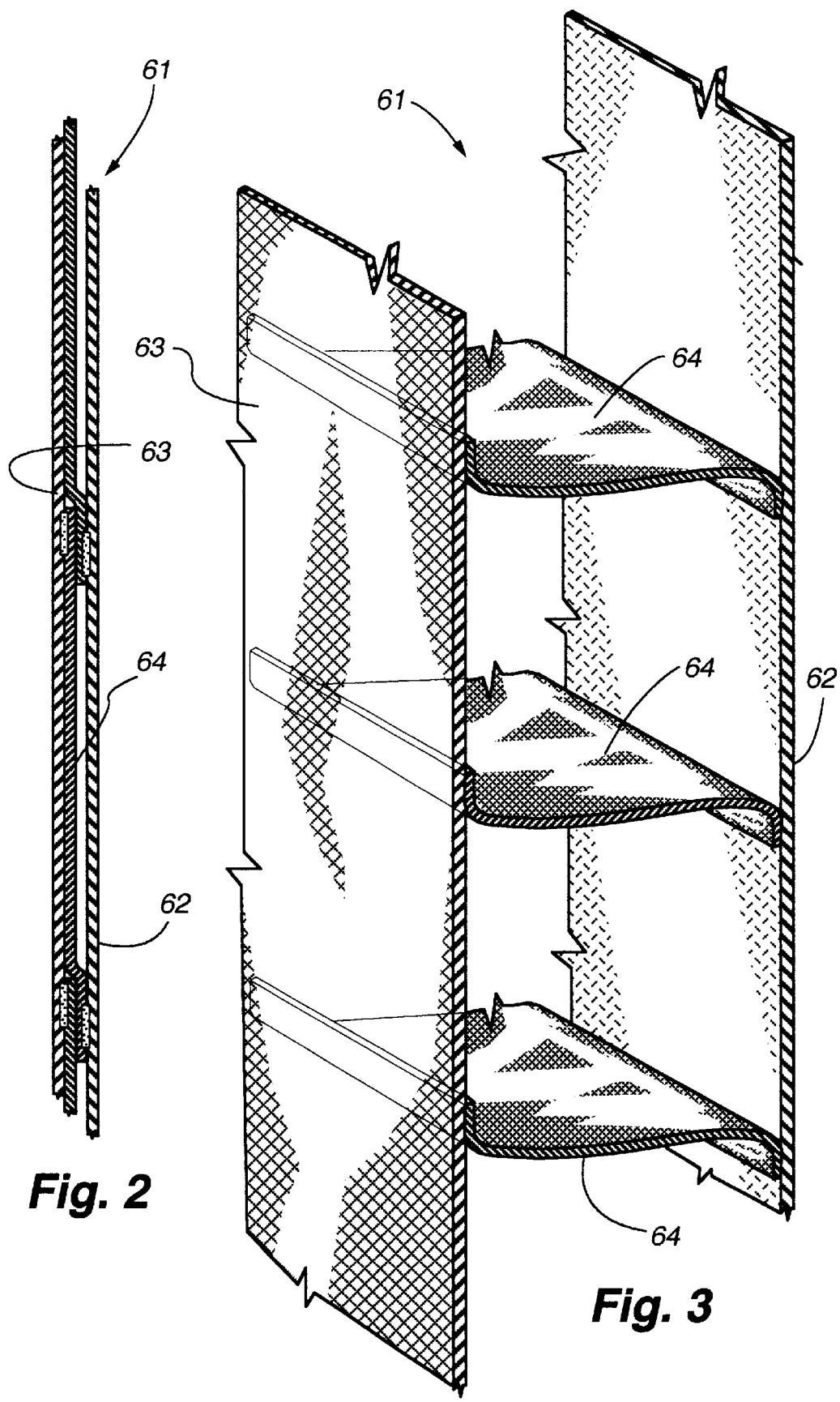
FIG. 2 is a fragmentary longitudinal section taken through the product formed with the apparatus of FIG. 1A with the product being shown in a closed position.
FIG. 3 is a fragmentary isometric view of the product of FIG. 2 with the product in an open condition.

The laminate product 61, as shown in FIGS. 2 and 3 formed with the aforedescribed apparatus, and as mentioned previously, can be cut to any desired size and operably connected to an operating system for use in an architectural opening. The functioning of the product so mounted was described previously.

Normally, the parallel vanes in the product will extend horizontally in an architectural opening and, accordingly, the width of the first and second sheets of material 62 and 63 will define the height of the product 61 that will ultimately form the covering for the architectural opening.

It will be appreciated from the afore-noted description that a unique system has been described for fabricating a laminate product that can be used in a covering for architectural openings, and as can be appreciated from the description of the apparatus, it is a continuous process so as to have minimal down time and so as to optimally produce the product in a given period of time with minimum waste.

Although the present invention has been described with a certain degree of particularity, it is understood that the disclosure has been made by way of example, and changes in detail or structure may be made without departing from the spirit of the invention as defined in the appended claims.

What is claimed is:

1. An apparatus for treating a continuous web of flexible material having opposite faces so as to form a plurality of side-by-side continuous strips of material, each strip of material having opposite faces and marginal zones on each face along opposite side edges thereof, and elongated beads of adhesive along opposite marginal zones thereof and on opposite faces thereof, said apparatus comprising in combination:
   a frame;
   a support rod rotatably supporting a roll of said flexible material;
   at least one control roller about which said flexible material extends;
   adhesive applicators adjacent to said at least one control roller for applying spaced elongated beads of adhesive to at least one of said faces of material;
   at least one cutter adjacent to said flexible material for severing said material along at least one line parallel to said beads of adhesive; and
   a take-up roller around which the resulting strips of material with adhesive beads thereon can be wound.

2. The apparatus of claim 1 wherein said beads of adhesive are applied to opposite faces of said material.

3. The apparatus of claim 1 wherein said cutter is an ultrasonic cutter.

4. The apparatus of claim 1 wherein said cutter is a roll cutter.

5. The apparatus of claim 4, further comprising mean for applying heat to an edge of the resulting strips of material to eliminate fraying.

6. An apparatus for treating a continuous web of flexible material having opposite faces so as to form a plurality of side-by-side continuous strips of material, each strip of material having opposite faces and marginal zones on each face along opposite side edges thereof, and elongated beads of adhesive along opposite marginal zones thereof and on opposite faces thereof, said apparatus comprising in combination:

a frame;

a support rod rotatably supporting a roll of said flexible material;

at least one control roller about which said flexible material extends;

adhesive applicators adjacent to said at least one control roller for applying spaced elongated beads of adhesive to at least one of said faces of material;

at least one cutter adjacent to said flexible material for cutting said material along at least one line parallel to said beads of adhesive;

a take-up roller around which the resulting strips of material with adhesive beads thereon can be wound;

wherein said beads of adhesive are applied to opposite faces of said material; and wherein said beads of adhesive on one face of said material are offset from the beads of adhesive on the other face of said material.

7. The apparatus of claim 6, wherein said at least one line of cut is adjacent to at least one of said beads of adhesive.

8. The apparatus of claim 2 or 7, wherein said at least one line of cut is between said beads of adhesive on one face of said material and said beads of adhesive on the other face of said material.

9. The apparatus of claim 8, wherein said at least one line of cut form a resulting strip of material having said beads of adhesive on one face of said material adjacent to a first edge and said beads of adhesive on the other face of said material adjacent to a second edge.

10. The apparatus of claim 7, wherein said at least one cut is further adjacent to a side edge of said flexible material.

11. An apparatus for treating a continuous web of flexible material having opposite faces so as to form a plurality of side-by-side continuous strips of material, each strip of material having opposite faces and marginal zones on each face along opposite side edges thereof, and elongated beads of adhesive along opposite marginal zones thereof and on opposite faces thereof, said apparatus comprising in combination:

a frame;

a support rod rotatable supporting a roll of said flexible material;

at least one control roller about which said flexible material extends;

adhesive applicators adjacent to said at least one control roller for applying spaced elongated beads of adhesive to at least one of said faces of material;

at least one cutter adjacent to said flexible material for cutting said material along at least one line parallel to said beads of adhesive;

a take-up roller around which the resulting strips of material with adhesive beads thereon can be wound, wherein said beads of adhesive are applied to opposite faces of said material;

wherein said beads of adhesive on one face of said material are offset from the beads of adhesive on the other face of said material; and wherein said at least one line of cut is between bead of adhesive on the opposite faces of said material.

* * * * *